US011841889B1

(12) United States Patent
Anand et al.

(10) Patent No.: US 11,841,889 B1
(45) Date of Patent: Dec. 12, 2023

(54) GENERATING VISUALLY SIMPLIFIED CALCULATION EXPRESSIONS CORRESPONDING TO USER MANIPULATION OF TEXTUAL DATA ELEMENTS

(71) Applicant: Tableau Software, LLC, Seattle, WA (US)

(72) Inventors: Anushka Anand, Seattle, WA (US); Michael John Arvold, Seattle, WA (US); Hailei Chen, Mercer Island, WA (US); Daniel Philip Cory, Seattle, WA (US); Daniel William Deklotz, Seattle, WA (US); Abhishek Joshi, Seattle, WA (US); John Diaa Fahmy Morcos, Lynnwood, WA (US); Randall Moss, Seattle, WA (US); Miranda Rose Rensch, Seattle, WA (US); Koichi Tsunoda, Seattle, WA (US)

(73) Assignee: Tableau Software, LLC, Seattle, WA (US)

( * ) Notice: Subject to any disclaimer, the term of this patent is extended or adjusted under 35 U.S.C. 154(b) by 0 days.

(21) Appl. No.: 17/575,581

(22) Filed: Jan. 13, 2022

(51) Int. Cl.
*G06F 16/34* (2019.01)

(52) U.S. Cl.
CPC .................................... *G06F 16/34* (2019.01)

(58) Field of Classification Search
CPC ........ G06F 16/34; G06F 16/258; G06F 16/86; G06F 16/211; G06F 16/215; G06F 16/254; G06F 16/27; G06F 40/103; G06F 40/151

(Continued)

(56) References Cited

U.S. PATENT DOCUMENTS

2016/0125057 A1* 5/2016 Gould ................. G06F 16/2465 707/756
2022/0318194 A1* 10/2022 Ireifej ................... G06F 16/256

OTHER PUBLICATIONS

Kandel et al., Article: "Wrangler: Interactive Visual Specification of Data Transformation Scripts"; CHI '11: Proceedings of the SIGCHI Conference on Human Factors in Computing Systems, May 2011 pp. 3363-3372 (Year: 2011).*

* cited by examiner

*Primary Examiner* — Evan Aspinwall
(74) *Attorney, Agent, or Firm* — Morgan, Lewis & Bockius LLP

(57) ABSTRACT

A user interface displays: a first column comprising non-editable input strings retrieved from a data field; a second column comprising editable output strings initialized from the data field; and an expression window displaying a transformation function $f$. The computer iteratively processes user inputs, each user input i providing a sample row transformation to edit an ith output string $t_i$. Some user inputs i designate a contiguous substring $ss_i$ of the corresponding input string $s_i$. The contiguous substring expresses a causal basis for transforming the input string $s_i$. into the output string $t_i$. The computer updates the transformation function $f$ according to the provided sample row transformations so that: $f(s_1)=t_1, \ldots, f(s_i)=t_i$; the transformation function $f$ specifies text or string position of at least one contiguous substring; and $f$ has minimal branching among possible transformation functions that satisfy the samples. The computer displays the updated transformation function $f$ in the expression window.

20 Claims, 45 Drawing Sheets

(58) Field of Classification Search
USPC .......................................................... 707/756
See application file for complete search history.

230

Figure 6K
230
Transform Your Data
Transformed Values
Original Values (Job)
Calculation
504-8

Figure 6L
230
Transform Your Data
This application learns from changes you make to values in the Transformed Values column and generates a calculation to transform your data.
Provide more examples of correct values to produce better results.
Transformed Values
Original Values
Calculation
628
320

230

708

| Original Values (In) 702-1 | Output (Transformed) Values 704-1 |
| --- | --- |
| Email (Company A) | Email (Company A) |
| Invoice (Company A) | Invoice (Company A) |
| Email (Company B) | Email (Company B) |
| Email (Company C) | Email (Company C) |
| Product List (Company A) | Product List (Company A) |
| Receipt (Company C) | Receipt (Company C) |
| E-mail (Co. A) | E-mail (Co. A) |
| Letter (B Corporation) | Letter (B Corporation) |
| Invoice (Company C) | Invoice (Company C) |
| Correspondence (A Corp.) | Correspondence (A Corp.) |

Figure 7B

GENERATING VISUALLY SIMPLIFIED CALCULATION EXPRESSIONS CORRESPONDING TO USER MANIPULATION OF TEXTUAL DATA ELEMENTS

TECHNICAL FIELD

The disclosed implementations relate generally to data transformation, and more specifically to inferring rules for data transformation based on user-provided samples. Some implementations apply the data transformations in the context of data visualization, including systems, methods, and user interfaces that enable users to interact with data visualizations to analyze data.

BACKGROUND

Data visualization applications enable a user to understand a data set visually, including distribution, trends, outliers, and other factors that are important to making business decisions. Some data sets are very large or complex and include many data fields. Various tools can be used to help understand and analyze the data, including dashboards that have multiple data visualizations. However, some functionality may be difficult to use or hard to find within a complex user interface.

Additionally, some data visualization applications enable the user to transform the data sets by inputting code in a programming language (e.g., an expression or calculation language). However, this requires the users to learn the programming language, which can be difficult to use and hard for users to identify the appropriate function, or set of functions, for a desired data transformation.

SUMMARY

Programming by example (PBE) is a technique involving a computer generating code based on examples from a user. In the context of data transformation (e.g., string transformations), PBE may be used to generate transformation code for a data set based on user input-output examples. For example, a PBE system generates a transformation from a set of example input-output pairs. The PBE system then applies that transformation to all remaining inputs to generate the complete set of transformed outputs. In some circumstances, this approach is faster, easier, and more efficient than having the user write out the transformations in an expression language.

In some circumstances, a large set of user examples are needed for a PBE system to generate the user's desired transformation for a complete data set. For example, a user wants inputs that start with an 'A' to output a '1', inputs that start with a 'B' to output a '2', and inputs that start with 'C' to output '2.' In this example, the user supplies a user example of: "input 'Apple' outputs '1'." However, the PBE system doesn't know whether the user intended a condition such as "starts with 'A'," or "ends with 'e'," or "contains two 'p's," or "doesn't contain a space" or any of the many other possible ways to describe the input term 'Apple.' If the user gives another example starting with 'A,' it may still not be sufficient for the PBE system to identify the desired transformation. For example, if the user's next example is "input 'Apricot' outputs '1'." The PBE system still won't know if the user intended a condition "starts with 'A'," or "contains at least one 'p'," or "doesn't contain a space;" even if other possible conditions can no longer be correct.

With heterogenous data in particular, there are multiple differences between the user examples that a PBE system can identify and use for generating a transformation. However, many of the generated transformations would be undesirable for the user. Therefore, many user examples may be needed before a PBE system generates the user's desired transformation for the complete data set.

In accordance with some implementations, the PBE systems and methods described herein enable a user to supply additional information (e.g., a hint or condition) for a given user transformation example. This additional information alleviates the need for a large set of user examples, thereby reducing the number of human-machine interactions and improving the efficiency of the PBE system.

An example PBE system includes a hints feature that enables the user to indicate input characters in their user transformation examples. The example PBE system prefers transformation conditions that utilize the indicated input characters. Referring again to the example above, if the user supplies the user transformation example of "input 'Apple' outputs '1'" and includes a hint of "A," the PBE system is able to identify "starts with 'A'" as the transformation condition, without the need for many additional user examples (e.g., at least 20% less user examples are needed as compared to a PBE system without the hints feature).

Thus, the hints feature enables a user to identify one or more characters in the input. The user isn't required to know the corresponding condition (e.g., "contains" or "starts with"). With the hints feature, the PBE system is able to identify more complex conditions such as "contains more than one" or "after the second occurrence of," without the user having to know or input them.

In the previous example, if the user intended a transformation condition of "contains 'a'," then the user could provide a second user transformation example of "input 'Banana' outputs '1'" and include a hint of "a." In this example, the PBE system recognizes that "starts with 'A'" is invalid in light of the second user example and is likely to identify the desired "contains 'a'" condition as the most appropriate. Without the user hints, many more user examples may be needed before the PBE system is able to identify "contains 'a'" as the desired condition. Thus, the user is able to simply identify an important aspect of the input for the transformation, rather than needing to know the necessary programming functions and syntax to drive the transformation.

In accordance with some implementations, a method executes at a computing device with a display. For example, the computing device can be a smart phone, a tablet, a notebook computer, or a desktop computer. In some implementations, the method is performed by a PBE application executing on the computing device. The method includes displaying a user interface including: (i) a first set of input data retrieved from a data field from a data source; (ii) a second set of output data initialized from the data field so that each input datum (string) has a respective matching output datum (string); and (iii) an expression window displaying a transformation function $f$ that transforms each input datum into the corresponding output datum. The method further includes iteratively processing a plurality of user example transformations and a user hint corresponding to one of the example transformations, the user hint expressing a causal basis for the corresponding example transformation. The method further includes updating the transformation function $f$ according to the provided plurality of user example transformations and the user hint. The method further includes displaying the updated transformation function $f$ in the expression window. In some implementations, the method further includes receiving a user action to save the transformation function $f$ shown in the expression window; and storing the transformation function $f$ in accordance with the user action. In some implementations, the method further includes transforming the second set of output data using the updated transformation function $f$ and storing the transformed second set of output data.

In some implementations, a computing device includes one or more processors, memory, a display, and one or more programs stored in the memory. The programs are configured for execution by the one or more processors. The one or more programs include instructions for performing any of the methods described herein. In some implementations, the method is performed by a PBE program executing on the computing device.

In some implementations, a non-transitory computer-readable storage medium stores one or more programs configured for execution by a computing device having one or more processors, memory, and a display. The one or more programs include instructions for performing any of the methods described herein.

Thus, methods, systems, and graphical user interfaces are disclosed that enable users to easily interact with data sets to define data transformations according to user provided examples and hints. Such methods may complement or replace conventional methods for data visualization and transformation.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIGS. 7A-7E illustrate example graphical user interfaces in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Users who are not familiar with expression programming can find it difficult to apply transformations to their data sets. Programming by example (PBE) systems enable users to describe their desired transformation by examples instead of requiring knowledge of the programming language. However, in some circumstances PBE systems require a large set of user examples to identify the desired transformation for the data set. The systems, methods, and user interfaces described herein enable users to supply hints and/or conditions along with their examples, thereby improving efficiency and alleviating the need for a large set of user examples.

Figure 1:
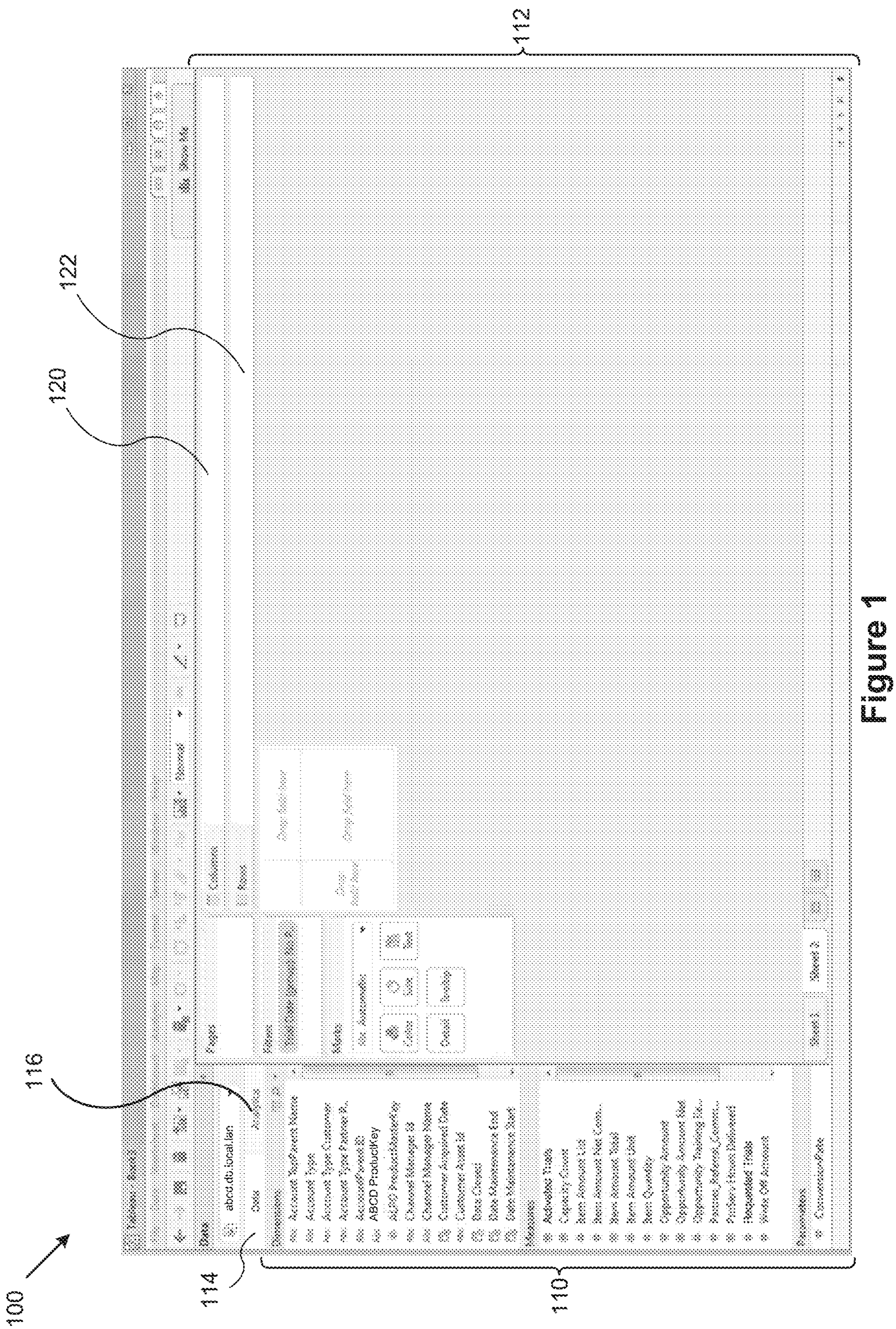
FIG. 1 illustrates a graphical user interface used in some implementations.

FIG. 1 illustrates a graphical user interface 100 for interactive data analysis in accordance with some implementations. The user interface 100 includes a Data tab 114 and an Analytics tab 116. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic. Because no data elements have been selected yet, the space initially has no visual graphic. In some implementations, the data visualization region 112 has multiple layers that are referred to as sheets.

Figure 2:
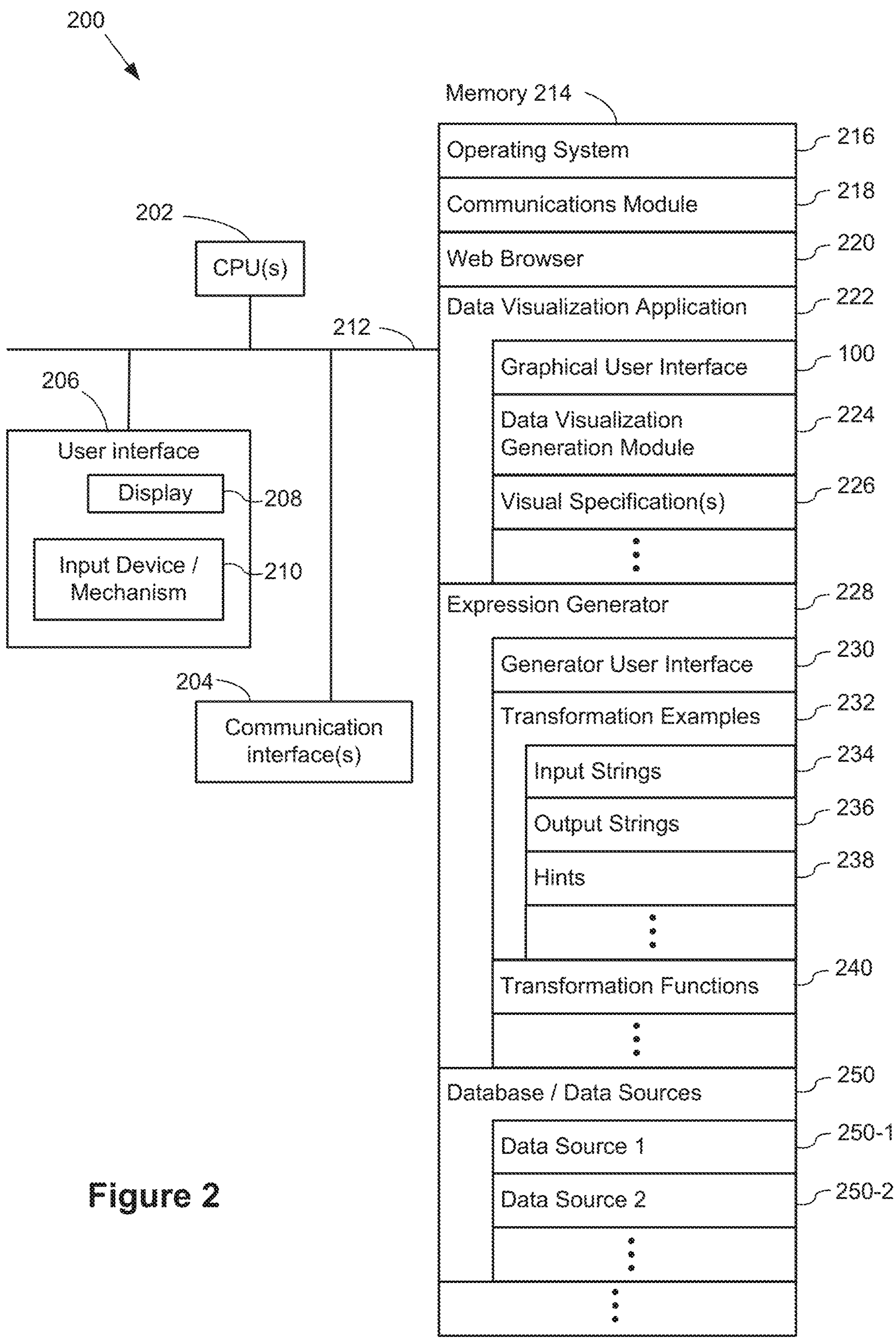
FIG. 2 is a block diagram of an example computing device in accordance with some implementations.

FIG. 2 is a block diagram illustrating a computing device 200 that can display the graphical user interface 100 in accordance with some implementations. Various examples of the computing device 200 include a desktop computer, a laptop computer, a tablet computer, and other computing devices that have a display and a processor capable of running a data visualization application 222. The computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components.

The computing device 200 includes a user interface 206 comprising a display device 208 and one or more input devices or mechanisms 210. In some implementations, the input device/mechanism includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternatively the non-volatile memory devices within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other application capable of displaying web pages), which enables a user to communicate over a network with remote computers or devices;
- a data visualization application 222, which provides a graphical user interface 100 for a user to construct visual graphics. For example, a user selects one or more data sources 250 (which may be stored on the computing device 200 or stored remotely), selects data fields from the data sources, and uses the selected fields to define a visual graphic. In some implementations, the information the user provides is stored as a visual specification 226. The data visualization application 222 includes a data visualization generation module 224, which takes the user input (e.g., the visual specification 226), and generates a corresponding visual graphic (also referred to as a "data visualization" or a "data viz"). The data visualization application 222 then displays the generated visual graphic in the user interface 100. In some implementations, the data visualization application 222 executes as a standalone application (e.g., a desktop application). In some implementations, the data visualization application 222 executes within the web browser 220 or another application using web pages provided by a web server;
- an expression generator 228, which generates programming expressions for data transformations. In some implementations, the expression generator 228 generates expressions based on transformation examples 232 provided by a user or other application. For string transformations, the transformation examples include input strings 234, output strings 236, and, in some cases, hints 238. In some implementations, the expression generator 228 provides a generator user interface 230 for a user to construct programming expressions (e.g., by providing transformation examples 232 and/or transformation functions 240). In some implementations, the transformation functions 240 are generated by the expression generator 228 based on the transformation examples 232; and
- one or more databases or data sources 250 (e.g., a first data source 250-1 and a second data source 250-2), which are used by the data visualization application 222. In some implementations, the data sources are stored as spreadsheet files, CSV files, XML files, or flat files, or stored in a relational database.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3A:
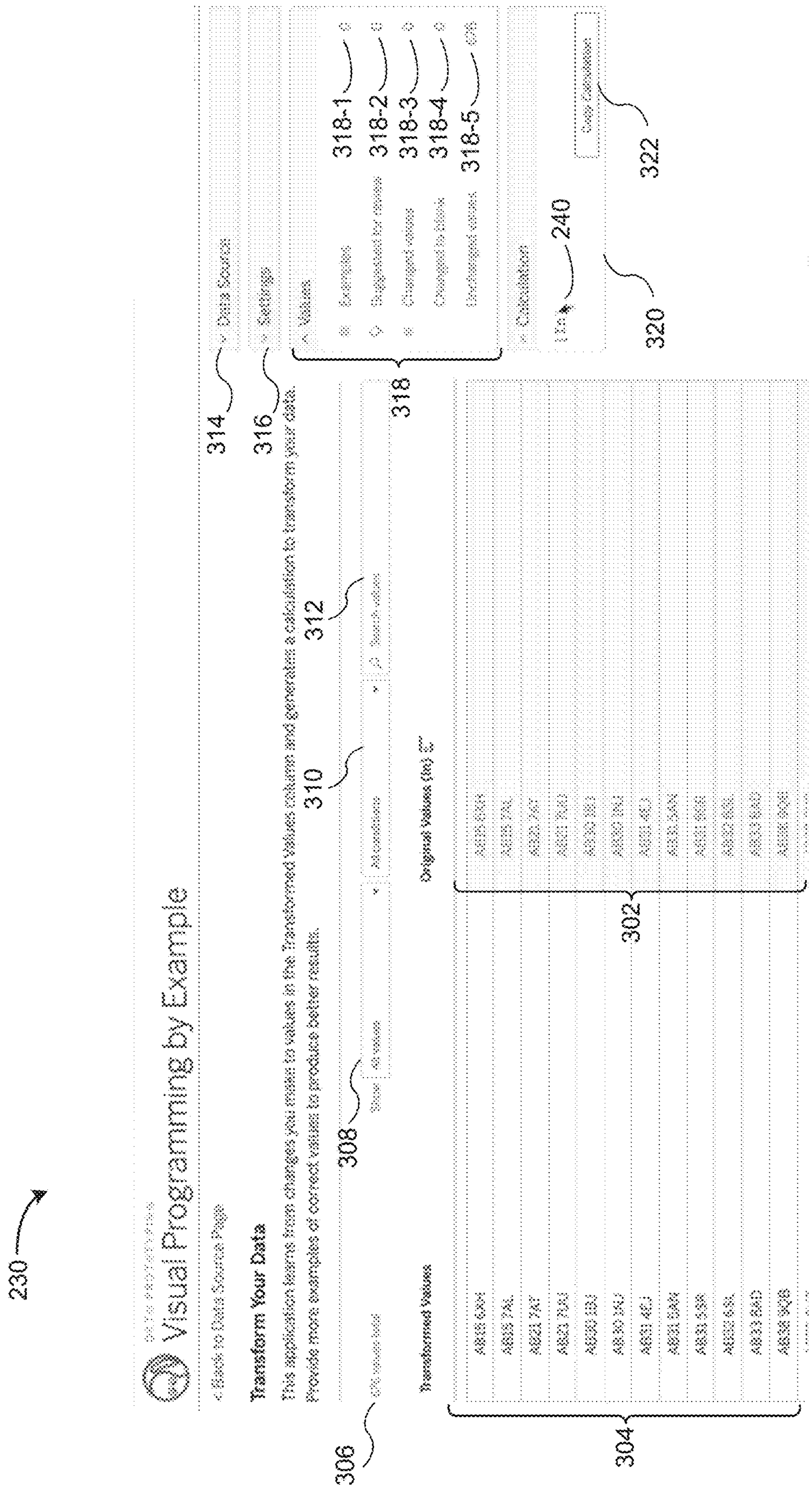
FIGS. 3A-3C illustrate example graphical user interfaces in accordance with some implementations.
Figure 3B:
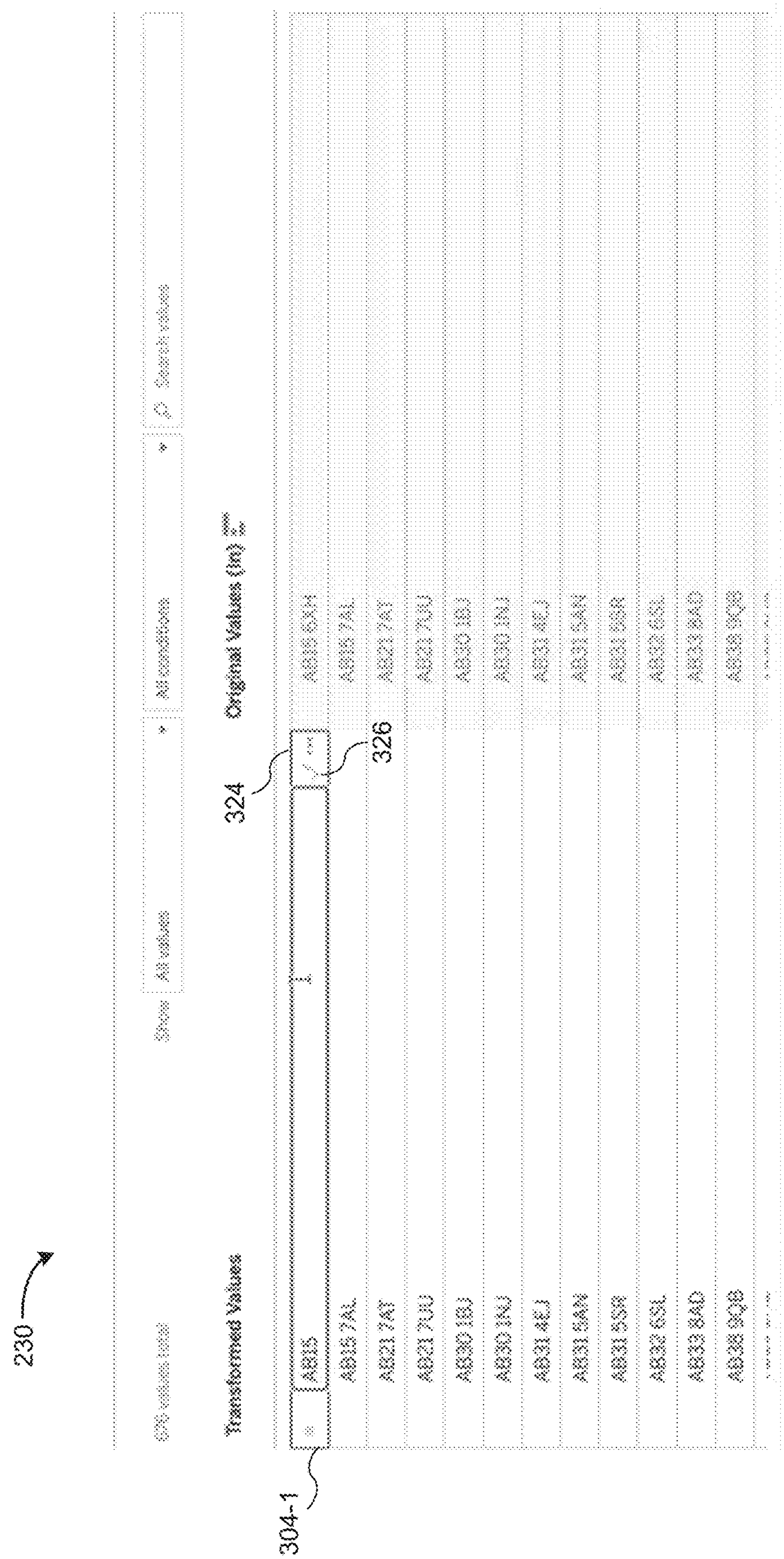
Figure 3C:
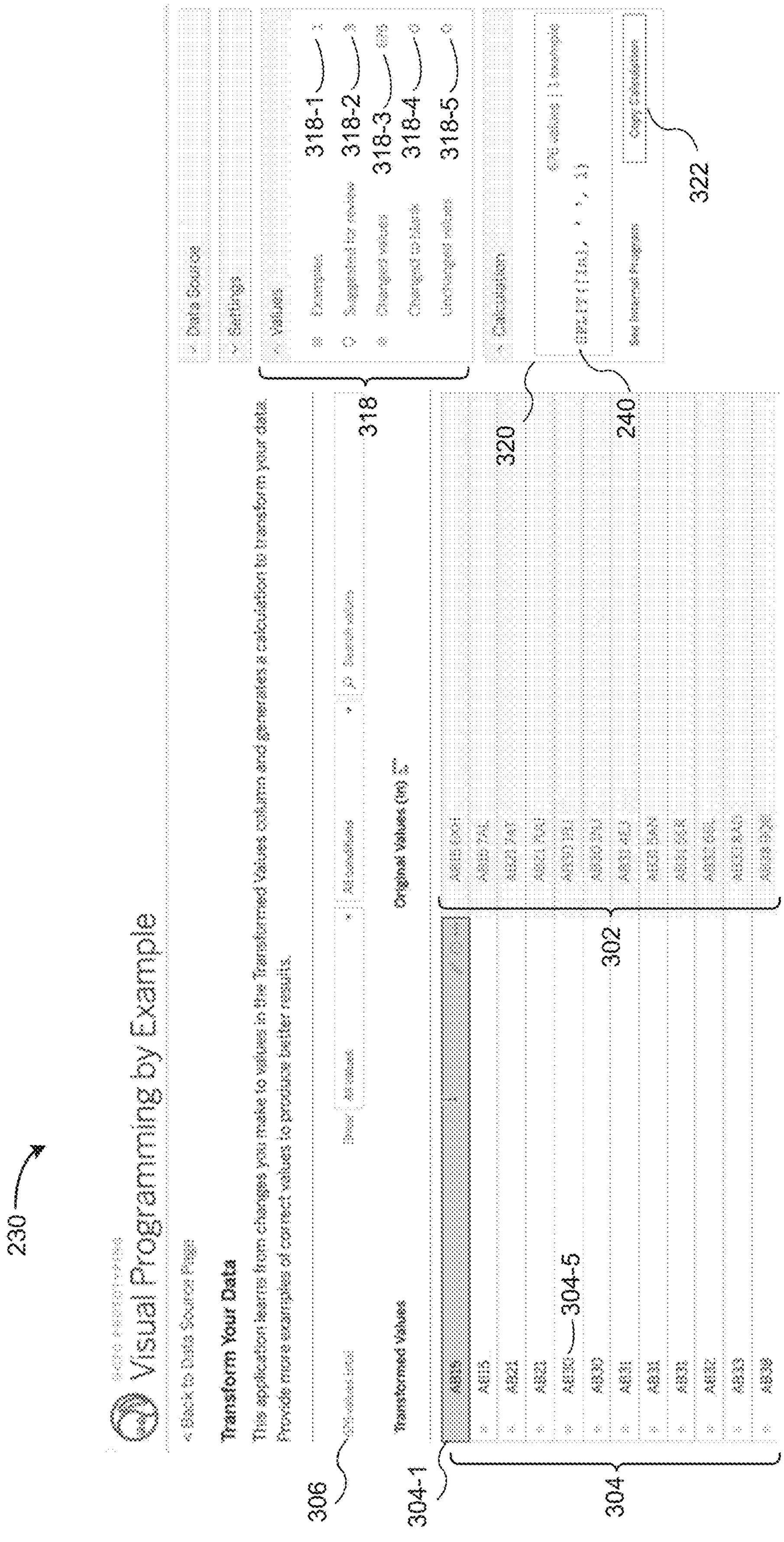

FIGS. 3A-3C provide a graphical user interface 230 used in some implementations. The user interface 230 includes an original dataset arranged as a first column 302 and an output dataset arranged as a second column 304. As illustrated here, some implementations display the first column to the right of the second column. Although the user interface 230 shows the datasets arranged in columns, in some implementations, the original dataset is arranged in a first section of the user interface 230 (e.g., as a first row) and the output dataset is arranged in a second section of the user interface 230 (e.g., as a second row). The first column 302 has non-editable input strings $s_1, s_2, \ldots, s_n$ retrieved from a data field (e.g., as specified by a data selector 314). The second column 304 has editable output strings $t_1, t_2, \ldots, t_n$, initialized from the data field so that each row comprises a respective input string and a respective matching output string (e.g., the data value "AB15 6XH" for both the input and the output are in the first row). The first column 302 displays the original data values 234 from the data field. The second column 304 displays output values 236, which can be changed by the user to create a transformation example. In FIG. 3A, none of the output values 236 have been changed. The set of rows is scrollable whenever the number of rows exceeds the allocated space. In some implementations, the graphical user interface 230 includes an indicator 306 to specify the total number of data values present in the data source.

The user interface 230 includes an expression window 320 displaying a transformation function $f$ (sometimes referred to as a calculation or expression) that transforms each input string into the corresponding output string. In some implementations, the expression window 320 initially displays a transformation function $f$ specifying that the output string is equal to the input string (e.g., [In]). In some implementations, before a transformation function has been generated, the displayed expression is blank. That is, the expression window displays no transformation function prior to receiving user inputs to specify transformations.

The user interface 230 includes a user-selectable icon 322 to save the transformation function $f$ 240 shown in the expression window 320. In some implementations, the user-selectable icon 322 copies a string representation of the transformation function $f$ 240 to an operating system clipboard (or application-specific clipboard) and enables the user to paste the function 240 into another location. In some implementations, the copy operation can be initiated in other ways as well, such as highlighting the function 240 and pressing CTRL+C. In some implementations, saving the transformation function ƒ comprises selecting a save icon or button from a pop-up window.

The user interface 230 also includes a values region 318 with a menu (e.g., a drop down menu) of information about the data values being transformed. For example, the values region 318 specifies the number of examples 318-1 that the user has provided. In FIG. 3A, the user has not yet provided any examples, so the number 318-1 shows "0". The values region 318 includes a "Suggested for Review" quantity 318-2, which is the number of rows that the expression generator recommends for the user to review. Because the user has not yet specified any examples in FIG. 3A, the number recommended for review is "0". In some implementations, the values region 318 is interactive to allow a user to select an element to filter the displayed datasets based on the selected element. For example, a user can select the "Suggested for Review" element 318-2, and the user interface 230 updates to display the rows recommended for review.

In some implementations, the values region 318 specifies a quantity 318-3 of output values that have changed. Note that the quantity 318-3 of changed values is generally greater than the quantity 318-1 of examples because the function 240 is applied to the entire dataset of column 302. In FIG. 3A, the quantity 318-3 of changed values is zero because the user has not yet provided any transformation examples.

In some implementations, the values region 318 specifies the quantity 318-4 of values that have been changed to blank. In some implementations, the values region 318 specifies the quantity 318-5 of unchanged values. The unchanged values are the ones for which the transformation function 240 makes no change. In FIG. 3A, the number 318-5 of unchanged values is 676, which is the same as the total number of rows 306. In some implementations, the sum of the changed values quantity 318-3 and the unchanged values quantity 318-5 equals the total number of rows 306, whereas in other implementations, NULL or blank values are counted separately.

In some implementations, the user interface 230 displays a settings menu 316, which enables the user to configure how elements of the user interface 230 are displayed (e.g., how the columns and data are displayed).

In some implementations, the user interface 230 enables the user to limit what rows are displayed. The user interface illustrated in FIG. 3A enables the user to filter 308 by data values or filter by specified conditions 310. A user can also specify one or more search values 312, in which case only rows matching the search are displayed. For example, a row is displayed if it contains any one of the search values anywhere within the input string or the output string. In some implementations, a row must satisfy all three of the criteria 308, 310, and 312 to be included. If no search values are specified, all rows are considered to satisfy the search. In some implementations, a row must satisfy at least one of the three criteria to be included. Some implementations allow the user to specify Boolean combinations of the criteria.

Thus, the user interface 230 allows the user to provide examples 232 of transforms for individual data values, and the expression generator 228 infers a function 240 based on the examples 232 provided. A user can assist with the generation of the function 240 by providing hints 238 for some (or all) of the examples. A hint 238 identifies a portion of an input data value 234 that is relevant to making the transformation. In some implementations, the hints are treated as a soft constraint and the computing device generates, and may propose, options that don't match the hints. For example, if a user mistakenly supplies inaccurate hint information, or the hint results in a suboptimal transformation function, the computing device may identify a transformation function that does not use the hint information (e.g., the hint information is not included in a conditional statement of the transformation function).

In some implementations, the hint 238 allows a user to provide an intended condition for a program with multiple domains and/or cases. For example, the hint 238 is optionally a condition using one or more of the following operators: CONTAINS( ), STARTSWITH( ) FINDNTH( ), or REGEXP_MATCH( ). Thus, in some implementations, rather than using a substring of original input values as a hint 238, the hints are defined as spans of input values that the PBE system considers when generating conditions. An example span is an index range of some input value, with a start index and an end index (inclusive or exclusive).

In some implementations, users are allowed to provide multiple spans of an original input for the PBE system to consider. For example, the user could select the starting character for a STARTSWITH condition and an ending character for an ENDSWITH condition. This can be helpful in cases where the user's intended conditional statement is a conjunction of multiple conditions. For example, a user wants to find all data values that start and end with a number character.

In some implementations, the hint 238 is case sensitive by default. In some implementations the hint 238 is case insensitive by default. In some implementations, a user affordance (e.g., a checkbox) is provided to the user at the time they enter the hint, where the user affordance allows the user to specify whether the hint is case sensitive.

The computing device iteratively processes the examples 232 provided by the user. Each user input provides a sample row transformation 232 to edit an output string $t_i$ 236. In some instances, the user designates a hint (e.g., a contiguous substring 238 of the corresponding input string $s_i$ 234). The contiguous substring 234 expresses a causal basis for transforming the input string 234 into the output string 236. The user interface 230 updates the transformation function ƒ 240 in the expression window 320 according to the provided sample row transformations 232. If the examples provided by the user are labeled as 1, 2, . . . , n, then the expression generator creates a function ƒ 240 so that:

(1) $f(s_1)=t_1, \ldots, f(s_n)=t_n$, (2) the transformation function ƒ specifies text or string position of at least one of the contiguous substrings, and (3) ƒ has minimal branching among possible transformation functions that satisfy the sample row transformations.

In some implementations, the updating occurs automatically after each user input, including updating the expression window 320 with the latest transformation function ƒ 240. In some implementations, the updating occurs after a user has confirmed a user transformation example 232 (e.g., by pressing the ENTER key or selecting a confirmation icon for the transformation example). In some implementations, the updating occurs in response to user activation of a user-interface affordance (not illustrated). In some implementations, the updating occurs after a preset amount of time has passed since the last user input.

FIG. 3B shows an example of a user transforming an input value in the second column 304. In this example, the user selects the output data value 304-1. In some implementations, the user can click (or double click) on the data value 304-1 to edit it. In the example shown in FIG. 3B, the user transforms the data to keep only the first four characters of the original data value. In this way, the user has provided the example to transform "AB15 6XH" to "AB15". In some implementations, the user selects a confirmation icon 326 (e.g., a checkmark) in the action menu 324 in order to save/confirm the example. In some implementations, the user can save/confirm the example by pressing the ENTER key.

FIG. 3C shows an example transformation result based on the user's transformation example. Based on this one example, the expression generator 228 updates the function 240, which is displayed in the expression window 320. The updated function 240 splits the input at the first space encountered in the input (the "[In]" specifies the input string, the "' '" specifies a single space, and "1" specifies the first occurrence). This function is applied to all of the rows, so all of the rows in the second column 304 are updated. For example, the fifth row 304-5 had a previous output value of "AB30 1BJ" and has been transformed to the new output value of "AB30".

As a result of the user-provided example, the values region 318 is also updated. Now the quantity 318-1 of examples is "1", the quantity 318-3 of changed values is "676", the quantity 318-4 of values changed to blank is "0", and the quantity 318-5 of unchanged quantities is "0" (all of the rows have changed). In this case, the system has also identified three rows of data that the system recommends for review (the quantity 318-2 is "3"). These suggested rows for review assist the user to quickly figure out if the function is correct. In some implementations, the user can navigate or filter to the three suggested rows by selecting the element for quantity 318-2 (e.g., clicking on the "Suggested for review" element or the number "3").

Figure 4A:
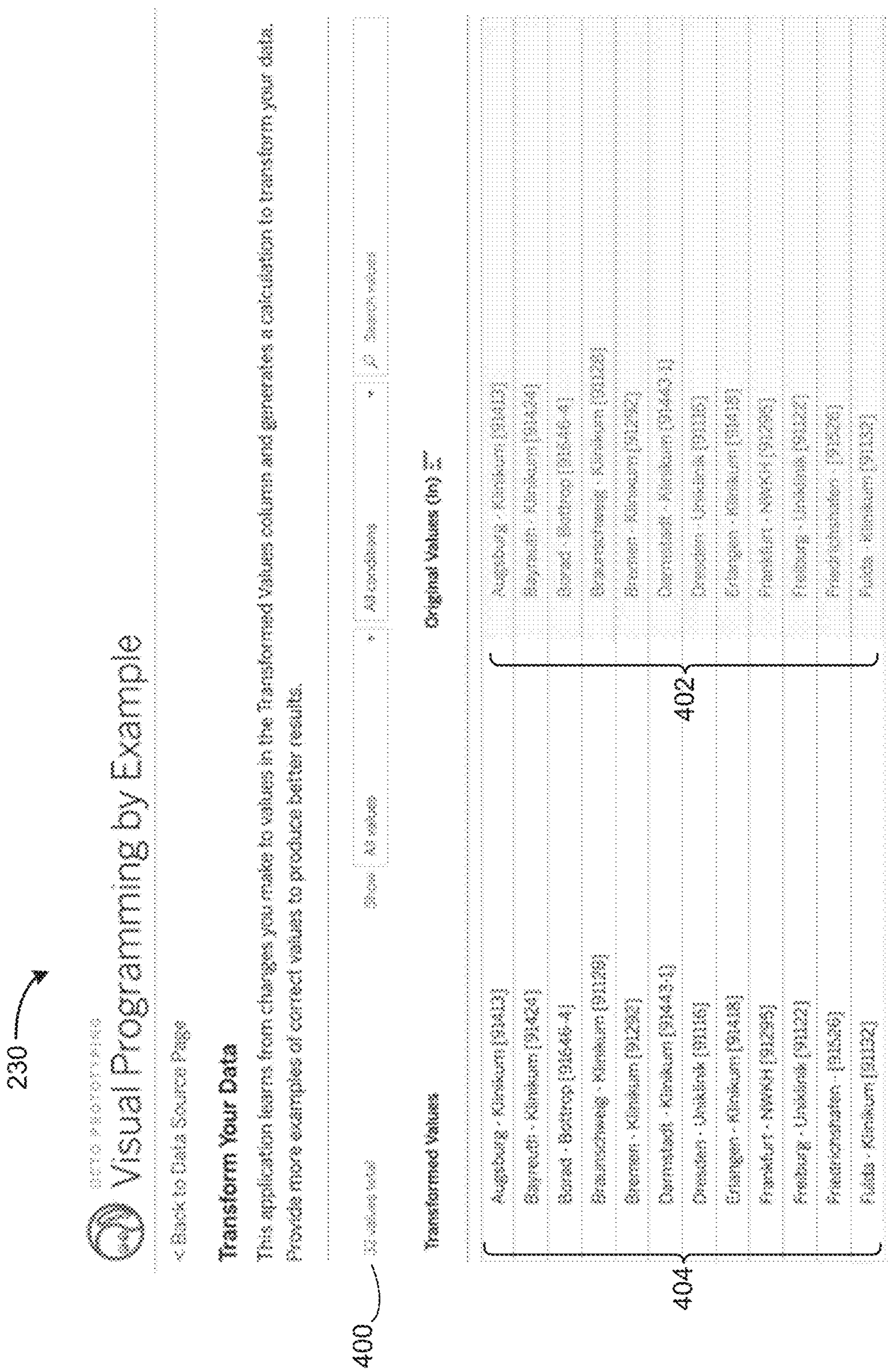
FIGS. 4A-4I illustrate example graphical user interfaces in accordance with some implementations.

FIGS. 4A-4I provide a graphical user interface 230 used in some implementations. These figures show user-provided examples to transform the data values, and user-provided hints for some of the examples. The user interface 230 in FIGS. 4A-4I shows data from a different data source than shown in FIGS. 3A-3C. FIG. 4A shows the data values are arranged in a first column 402 representing the original values, which are not editable, and a second column 404, representing the transformed values, which are editable, and are initially a copy of the original values. The user interface 230 provides an indicator 400 that there are 32 rows in the data source.

Figure 4B:
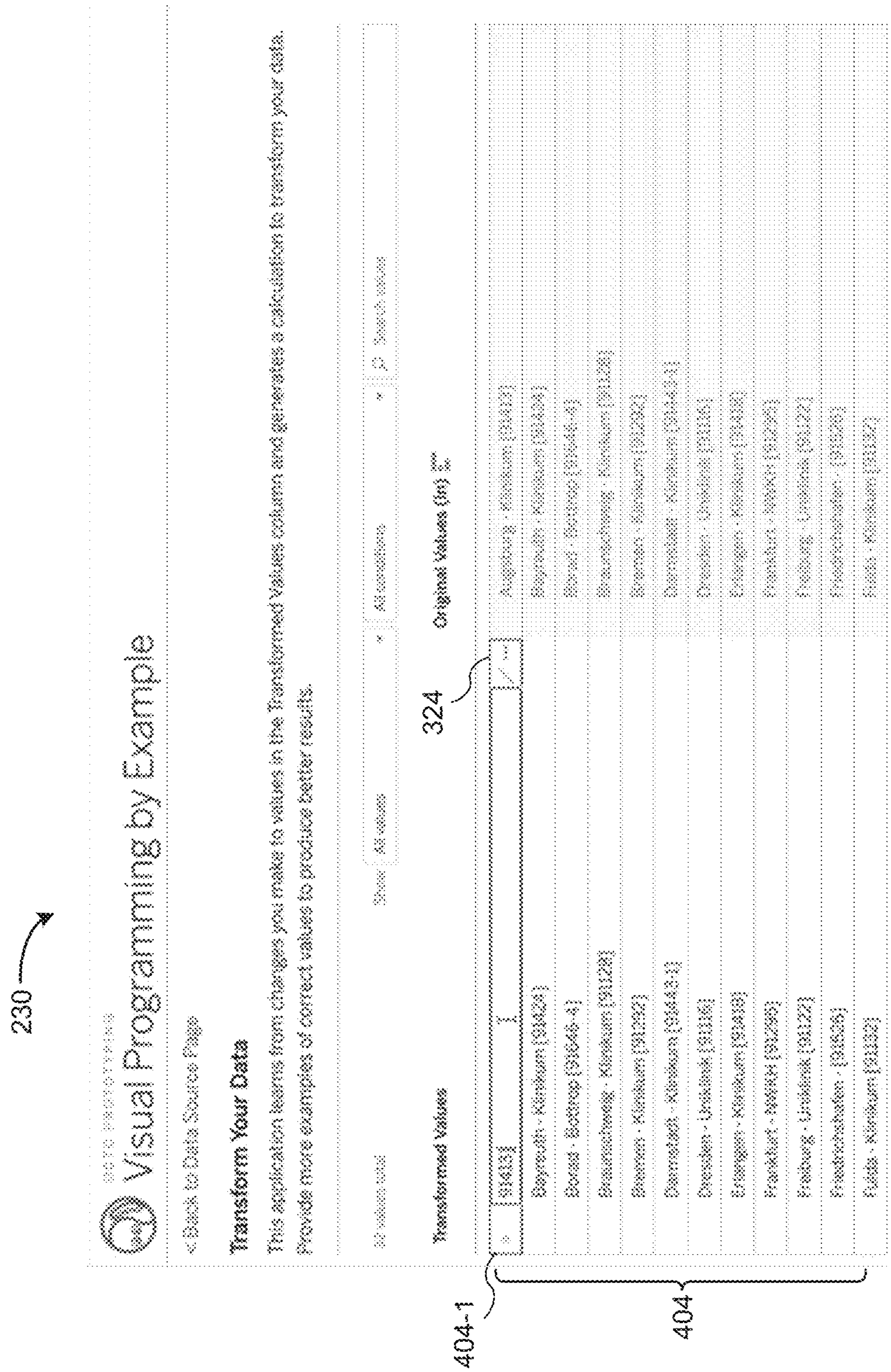

FIG. 4B illustrates user entry of a first example in which the first data value 404-1 is selected. The user is able to change any part of the data values in the second column 404. In this example, the user removes all of the characters except the numeric digits "91413". In other words, the user keeps only the numerical string present between the brackets.

Figure 4C:
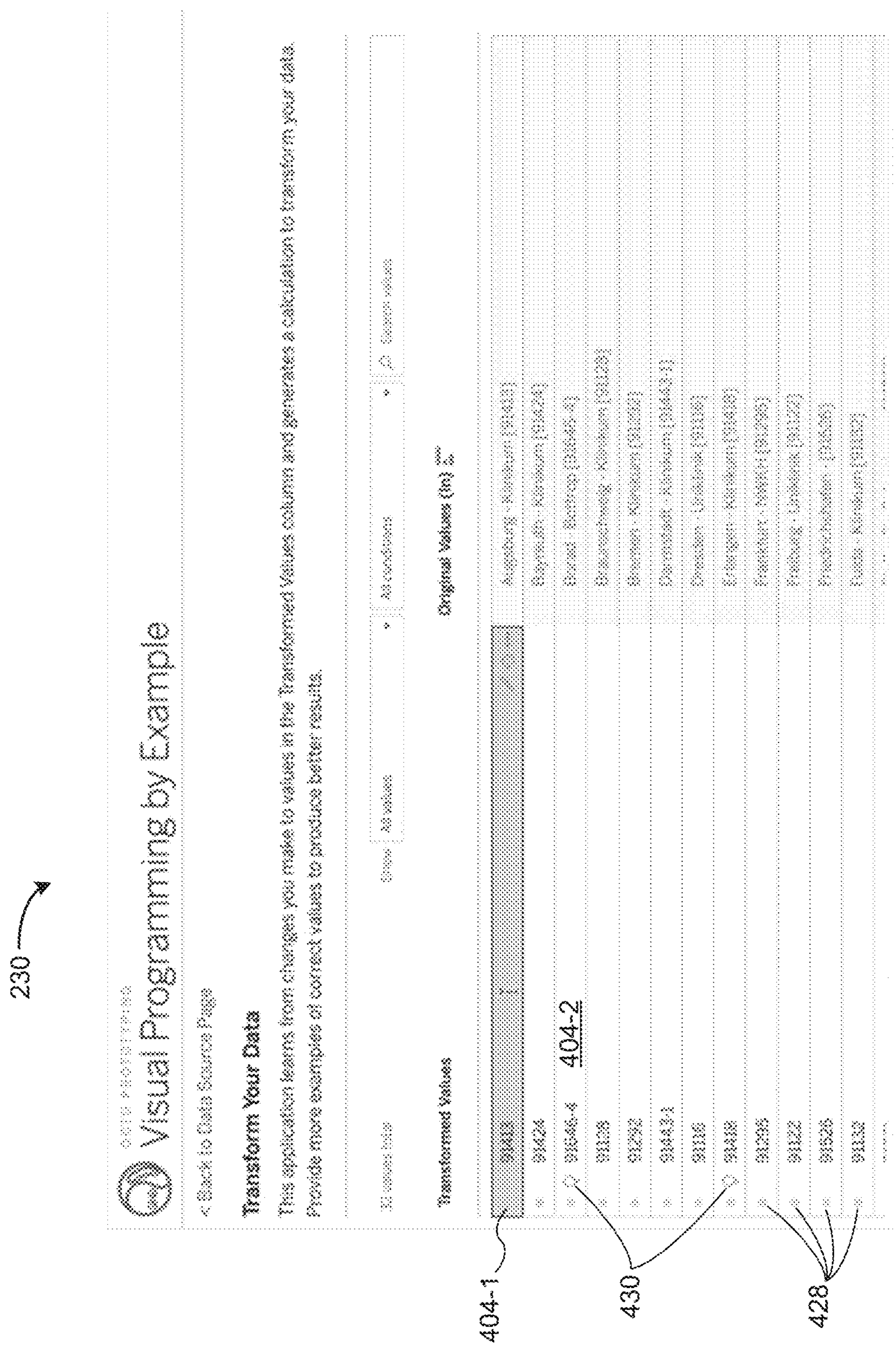

FIG. 4C shows an example transformation result from the user entering the example in FIG. 4B. The expression generator 228 infers a transformation function ƒ 240 (not shown), and applies the function ƒ to all 32 rows. Some implementations include a change indicator 428 for the rows what have been changed by the transformation function 240. In some implementations, the rows with the change indicator 428 are the rows indicated by a Changed values quantity (e.g., the quantity 318-3 of FIG. 3C). In this case, all of the displayed values in the output column 404 show that the transformation has modified the data. In some implementations, the provided example is highlighted, as shown in FIG. 4C. In some implementations, the modified data value 404-1 is highlighted by being bolded, italicized, underlined, and/or changed in color. In some implementations, the user interface 230 displays a suggested review indicator 430 to designate some of the rows for user review. In some implementations, the rows with the suggested review indicator 430 are the rows indicated by a "Suggested for review" quantity (e.g., the quantity 318-2 of FIG. 3C). For example, the user interface has designated the string "91646-4" 404-2 for review. It is different from most of the other data values by having a hyphen and an additional digit. In some implementations, if the data value has been transformed correctly, the user can remove the review indicator flag 430. Alternatively, the user may provide another example by modifying the data value 404-2 to create another user transformation example.

Figure 4D:
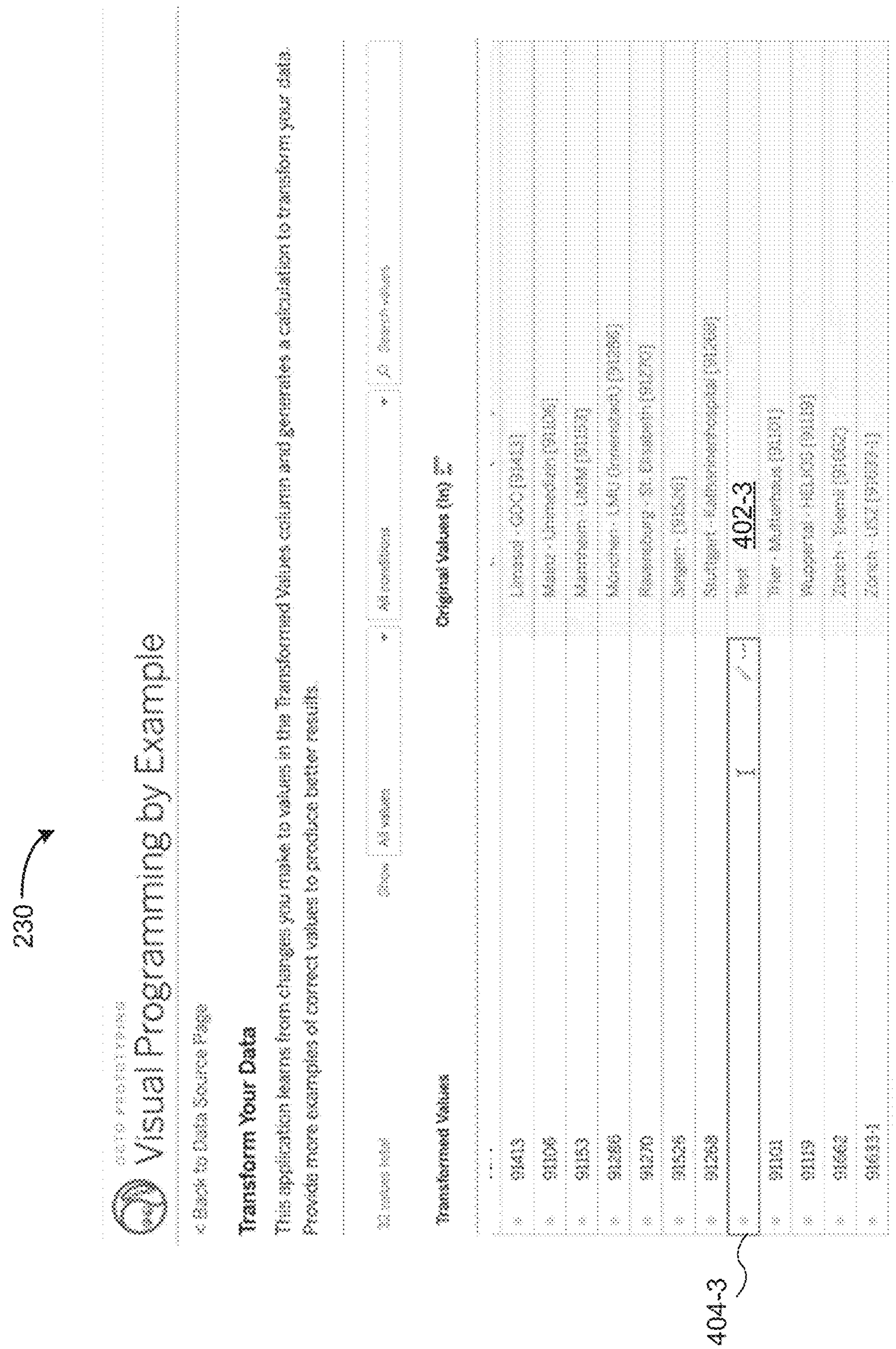

In FIG. 4D, the data value 404-3 is selected. The data value 404-3 has been converted to being blank. In this example, the input string 402-3 did not have any characters between square brackets and so application of the formula 240 resulted in the data value 404-3 being blank. In some implementations, the data value 404-3 is included in a count indicated by a "Changed to blank" quantity (e.g., the quantity 318-4 of FIG. 3C).

Figure 4E:
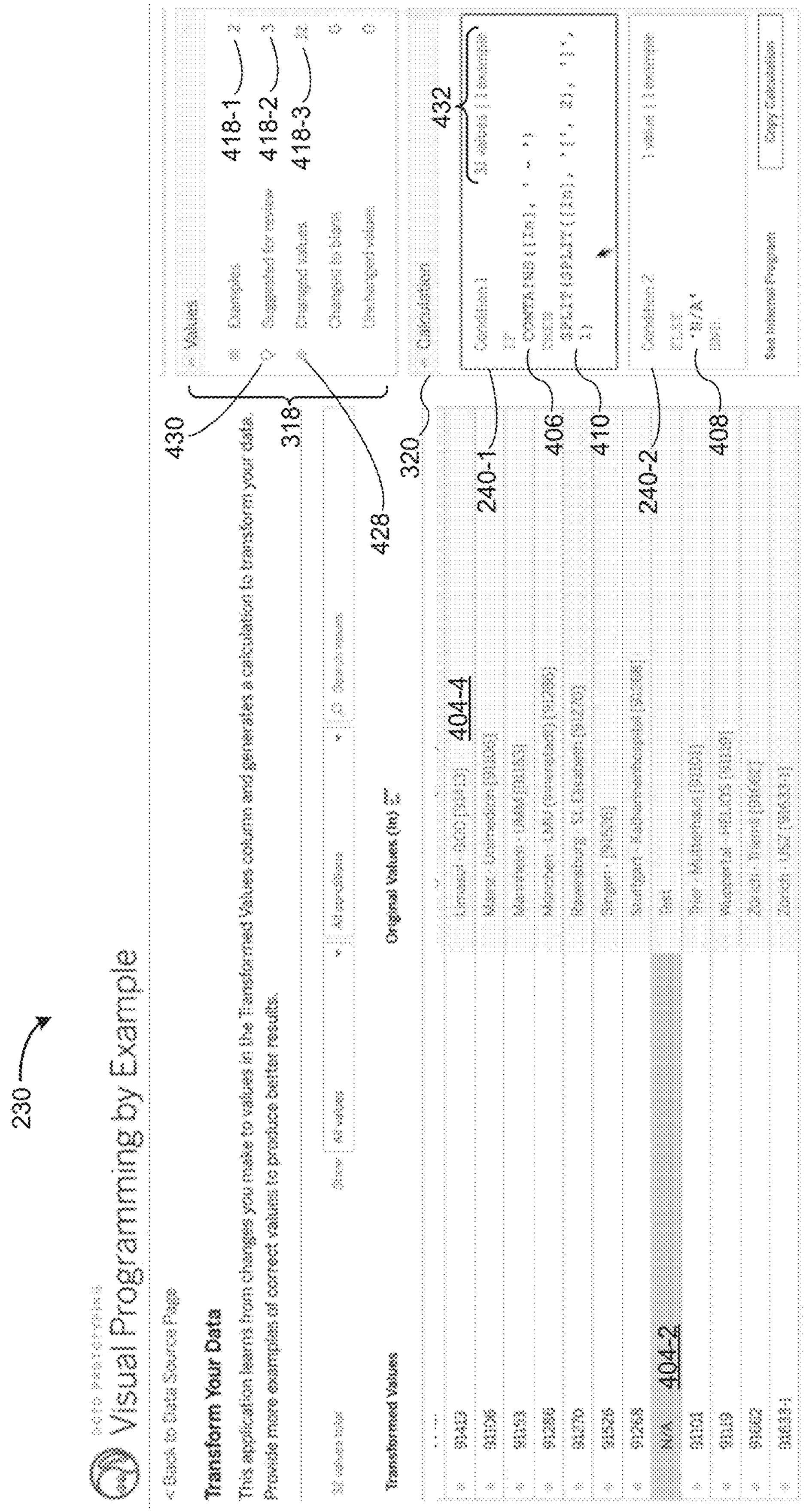

FIG. 4E illustrates an example in which the user updates the blank value 404-3 from FIG. 4D to 'N/A'. At this point, the user has provided two examples to the computing system to create the function ƒ 240 in the expression window 320. In some implementations, the transformation function ƒ 240 includes a sequence of IF statements. Each IF statement evaluates a respective Boolean expression and includes an output expression to use when the Boolean condition evaluates to TRUE. In some instances, at least one Boolean expression for an IF statement specifies a hint entered by the user (see FIGS. 4F-4I below). In some instances, at least one Boolean expression for an IF statement uses a string position of a hint provided by the user.

In the example of FIG. 4E, the function ƒ 240 has two portions 240-1 and 240-2 in the expression window 320. In some instances, the first portion is an IF statement and the second portion is the ELSE statement. In FIG. 4E, the first portion 240-1 of the function ƒ 240 transforms the data values based on whether the input contains '–', in which case it selects the characters within the two square brackets. The second portion 240-2 of the function ƒ 240 includes the ELSE statement 'N/A', which transforms any other values to "N/A."

As shown here, the function ƒ 240 has minimal branching among all possible transformation functions that perform according to the user provided examples. There are only two branches, and there are no transform functions that could achieve the desired results with a single branch. In some implementations, minimal branching means having the fewest number of IF statements.

The first portion 240-1 includes a Boolean condition 406, which determines whether the input string [In] includes the string '–', which is a space, a hyphen, and another space. If the Boolean condition evaluates to TRUE, the output value is specified by the corresponding function 410. In this case, the function 410 applies the SPLIT( ) operator twice to extract the string between the brackets '[' and ']'. The innermost SPLIT( ) operator divides the expression into two pieces at the left bracket '[', and returns the second split (specified by the parameter "2"). The outermost SPLIT( ) operator uses the output of the first SPLIT( ) operator, and performs a second split at the right bracket ']'. In this case, it uses the first split, as specified by the parameter value "1". The expression generator 228 created this expression automatically based on the two examples provided by the user. For this particular data set, the function 410 achieves the desired transformation. However, if any of the input data values had extra square brackets or lacked the '–' connector, the output would be incorrect. For example, if the original data value 404-4 was "Limasol-GOC [91413]" rather than "Limasol—GOC [91413]" the result of applying the function ƒ 240 would be "N/A" rather than the desired "91413."

The expression window 320 also provides feedback to the user about how the formula has been applied to the input data values. For example, for the first formula portion 240-1, the user interface provides usage data 432, which indicates how many of the user examples were taken into account to generate the formula portion as well as how many of the data values satisfy the Boolean condition 406. The second portion 240-2 represents the ELSE clause 408 with a return value of "N/A" and indicates that 1 user example and 1 value resolve to that clause.

The values window 318 indicates the value results based on the application of the function ƒ 240. The quantity of examples 418-1 is 2, the quantity of rows suggested for review 418-2 is 3, and the quantity of rows that have changed 418-3 is 32 (all rows in the data set). Next to the descriptive labels are the review indicator icon 430 and the changed indicator icon 428, which are the same indicators as displayed in the output rows 404.

While checking for '–' results in the desired transformation in this case, it may not be the most intuitive or robust function. Looking at the Boolean condition 406 for the formula, the user may wonder why the generator is looking for '–' rather than the square brackets. In this scenario, the user believes that the brackets are a better indicator. The user interface enables the user to give the system a "hint" about the importance of the brackets. FIGS. 4F-4I illustrate receiving a hint and generating an updated formula 240 that uses the hint.

Figure 4F:
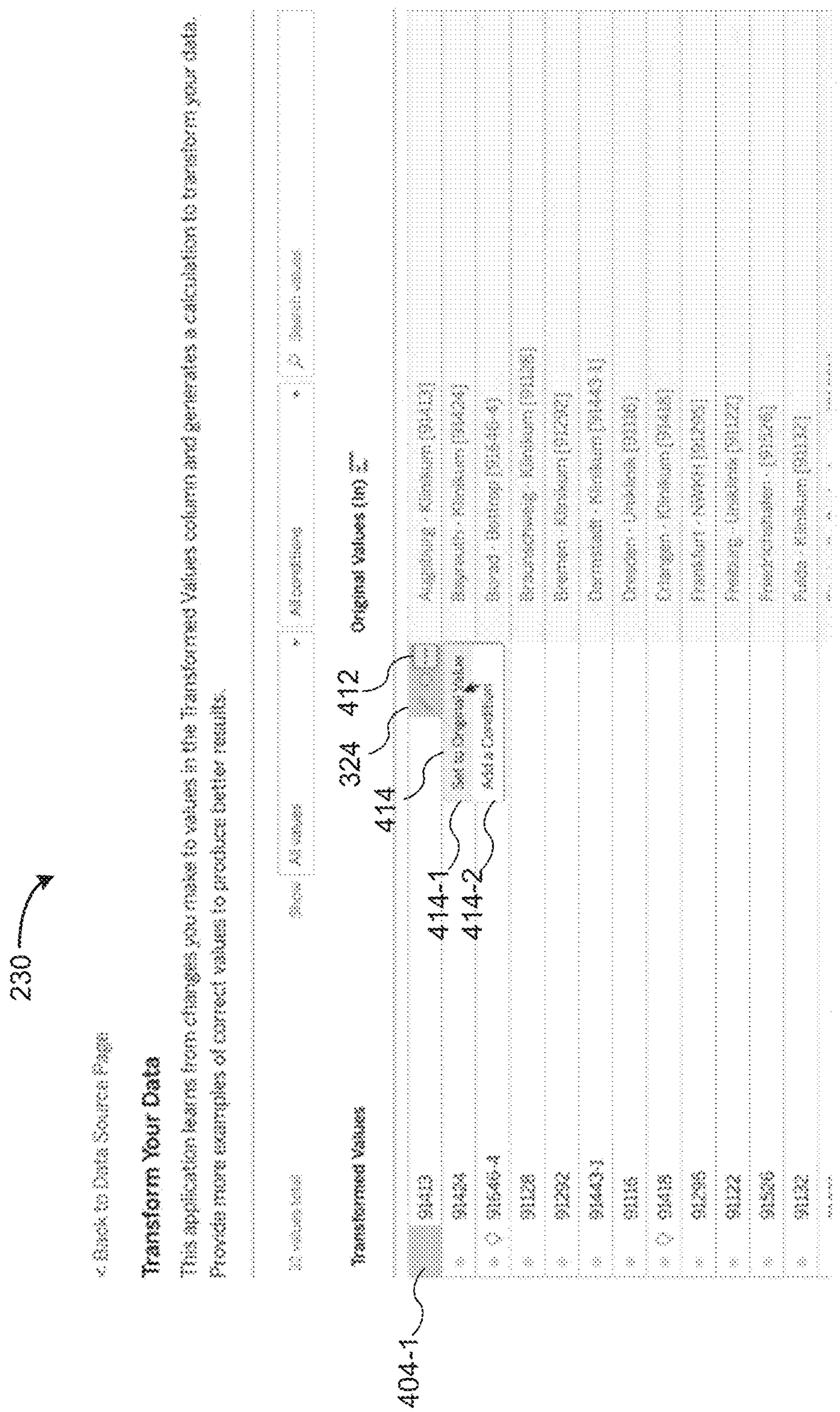

FIG. 4F illustrates selection of the action icon 412 within the action menu 324 (e . . . , initiating a process to enter a hint). Upon selection of the action icon 412, a dropdown menu 414 presents a "Set to Original Value" option 414-1 and an "Add a Condition" option 414-2. In some implementations, there are more or less options in the menu 414. For example, the menu 414 may include a clear option to set the data value 414-2 to blank. As another example, the menu 414 may include only the "Add a Condition" option 414-2. Upon selection, the "Set to Original Value" option resets the data value 402-1 to the original data value. The "Add a Condition" option 414-2 allows the user to provide a hint for the transformation of data value 404-1.

Figure 4G:
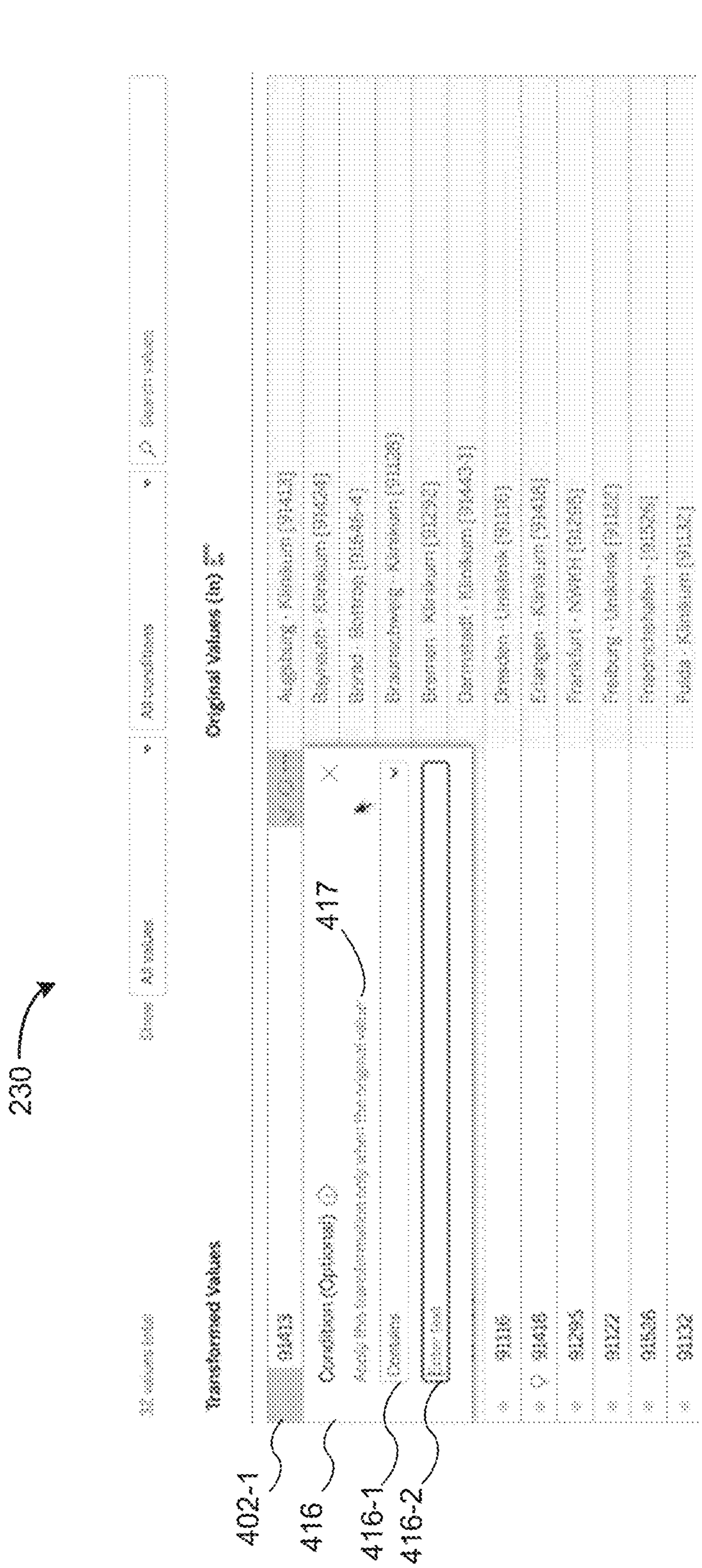

FIG. 4G illustrates the hint window 416 (also sometimes called a condition window), which displays in response to the user selecting the "Add a Condition" option 414-2 from the dropdown menu 414. In some implementations, the hint window 416 is a pop-up window. In some implementations, the hint window 416 is a dropdown menu. The hint window 416 allows the user to provide a hint for the user transformation example.

The hint window 416 allows a user to provide a hint in a variety of ways, including (i) specifying what text to look for in the input or (ii) specifying a position to look at in the input string. The hint window 416 allows a user to enter text in the entry box 416-2 and, optionally, select an operator 416-1 for the text (e.g., Contains, StartsWith, and the like). In some implementations, a user can specify a hint that uses both specific text and position. In accordance with some implementations, the hint window includes instructions and information for the user, such as the alert (417) which notifies the user that when a hint is supplied, the expression generator will apply the transform indicated by the example only to other input values that satisfy the hint.

Figure 4H:
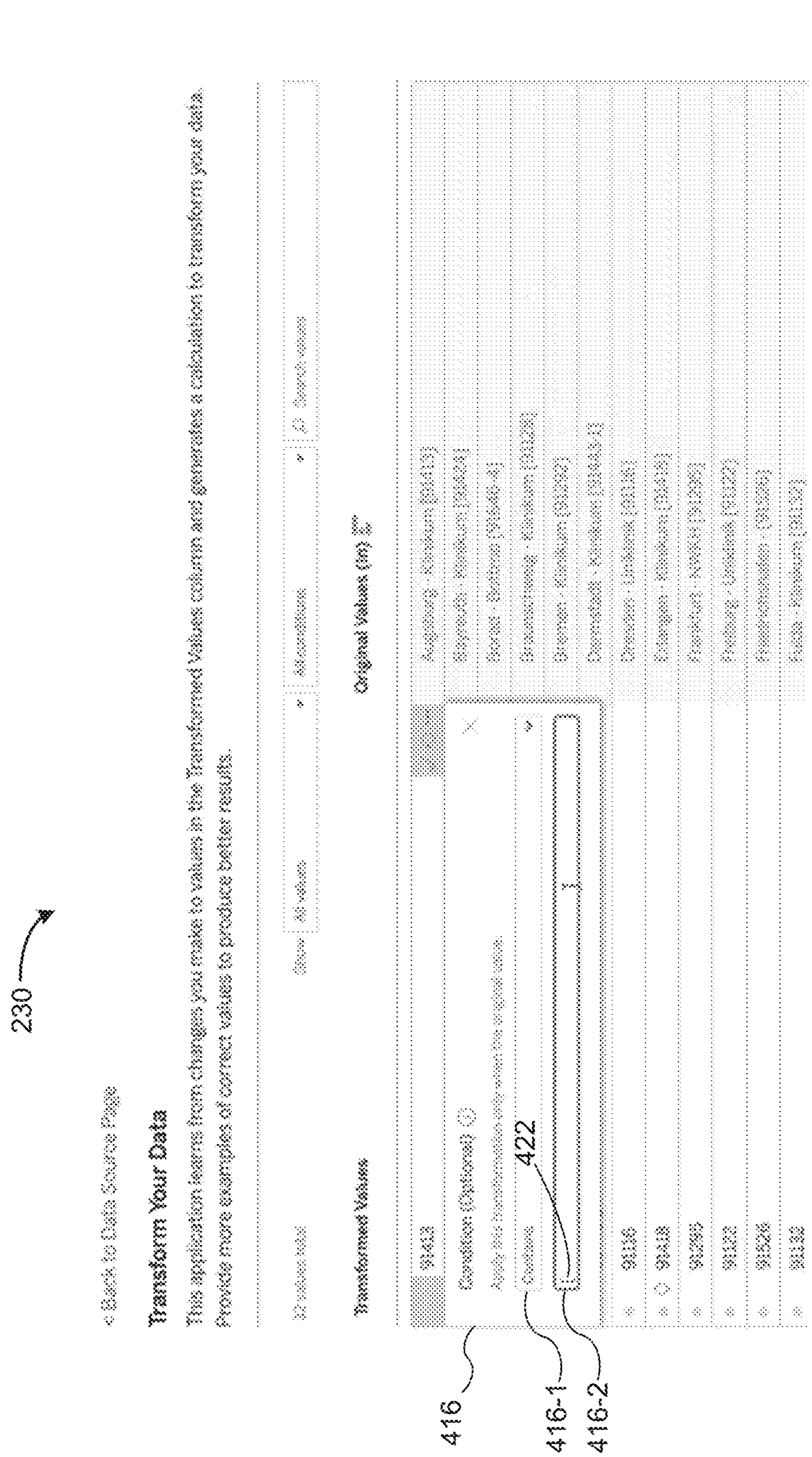

FIG. 4H illustrates user input of r 422 in the entry box 416-2. In this example, the hint provided by the user is that the transformation applied to the data value 404-1 should be applied to any original data values that contain a left bracket. In some implementations, providing a hint to the computing system allows for the computing system to generate a function ƒ 240 more quickly and with fewer examples provided by the user (e.g., because the hints enable greater accuracy about what to look for in the input string).

As an alternative to a sequence of menu selections to designate a hint, some implementations enable a user to directly select/highlight a portion of an input string to designate it as a hint.

Figure 4I:
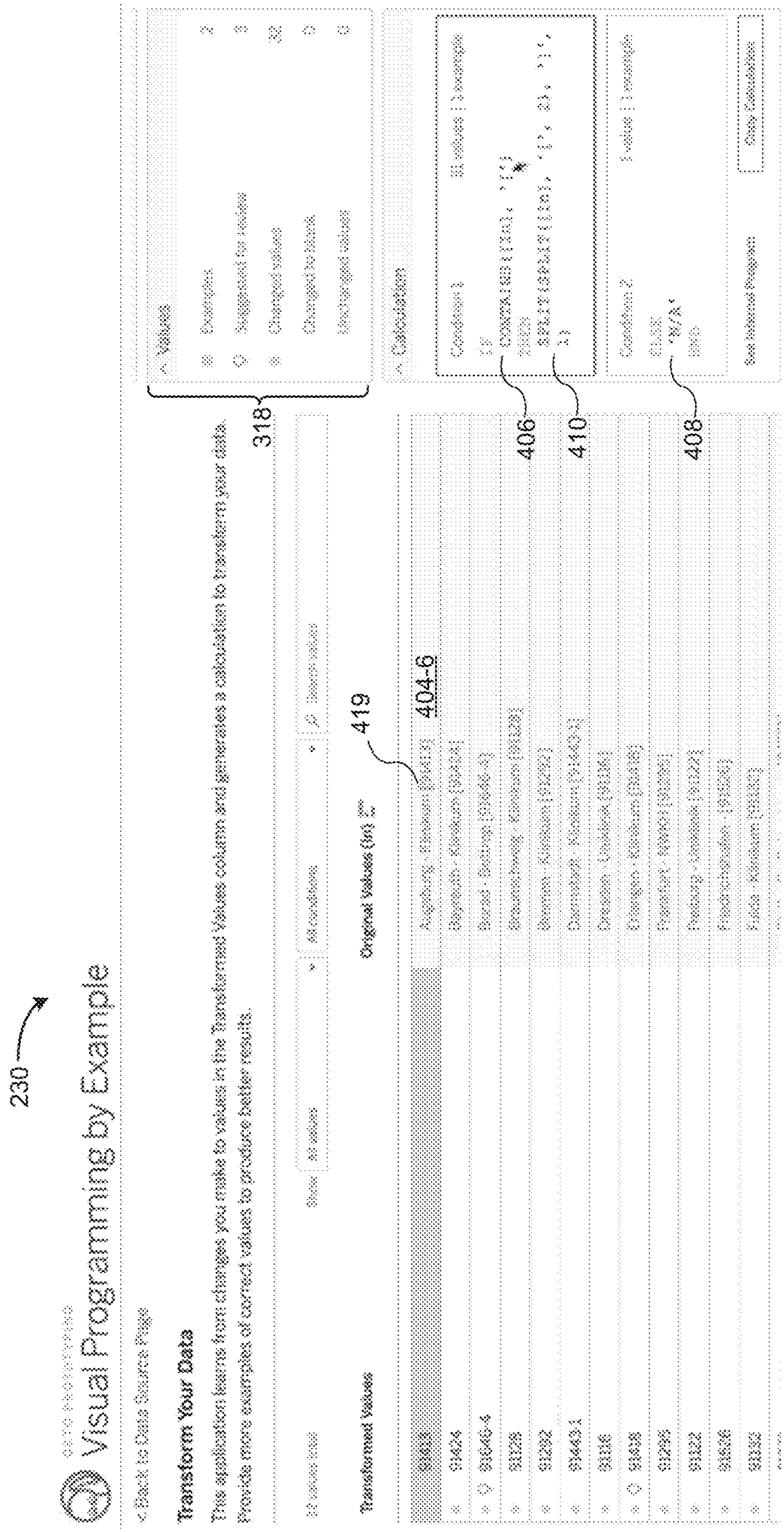

Based on this hint, FIG. 4I shows that the expression generator 228 updates the Boolean condition 406 for the first IF statement. FIG. 4I further shows highlighting 419 of the left bracket in the original data value 404-6 indicating that the left bracket is being used as a hint. In this example, the output function 410 is correct in light of the hint, so it remains unchanged.

FIGS. 5A-5H provide a graphical user interface 230 used in some implementations. The user interface 230 in FIGS. 5A-5H shows data from a different data source than shown in FIGS. 3A-3C and FIGS. 4A-4I. In FIGS. 5A-5H, the data values are arranged in a first column 502 representing original data values from the data source, and an editable second column 504 with editable data values of the original values (which can be transformed). A first data value 504-1 is selected for the user to update. Because the user has not yet provided any transformation examples, the calculation 320 shows [Job], which is the name of the original data field to be transformed. The calculation of [Job] indicates that the output value is currently the same as the input value (both the input and output are "[Job]"). The values region 318 also indicates that no output values have been transformed in FIG. 5A.

Figure 5A:
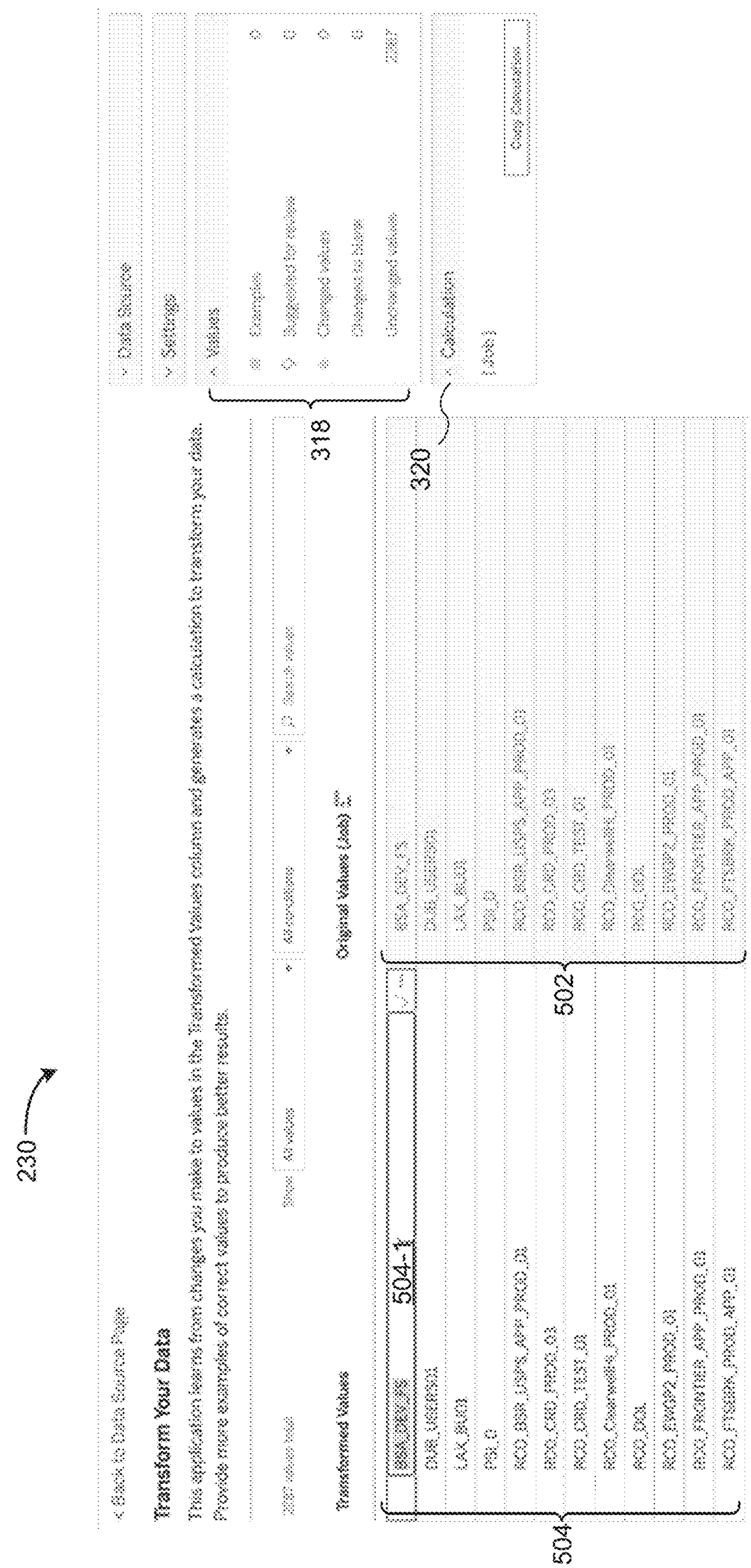
FIGS. 5A-5H illustrate example graphical user interfaces in accordance with some implementations.
Figure 5B:
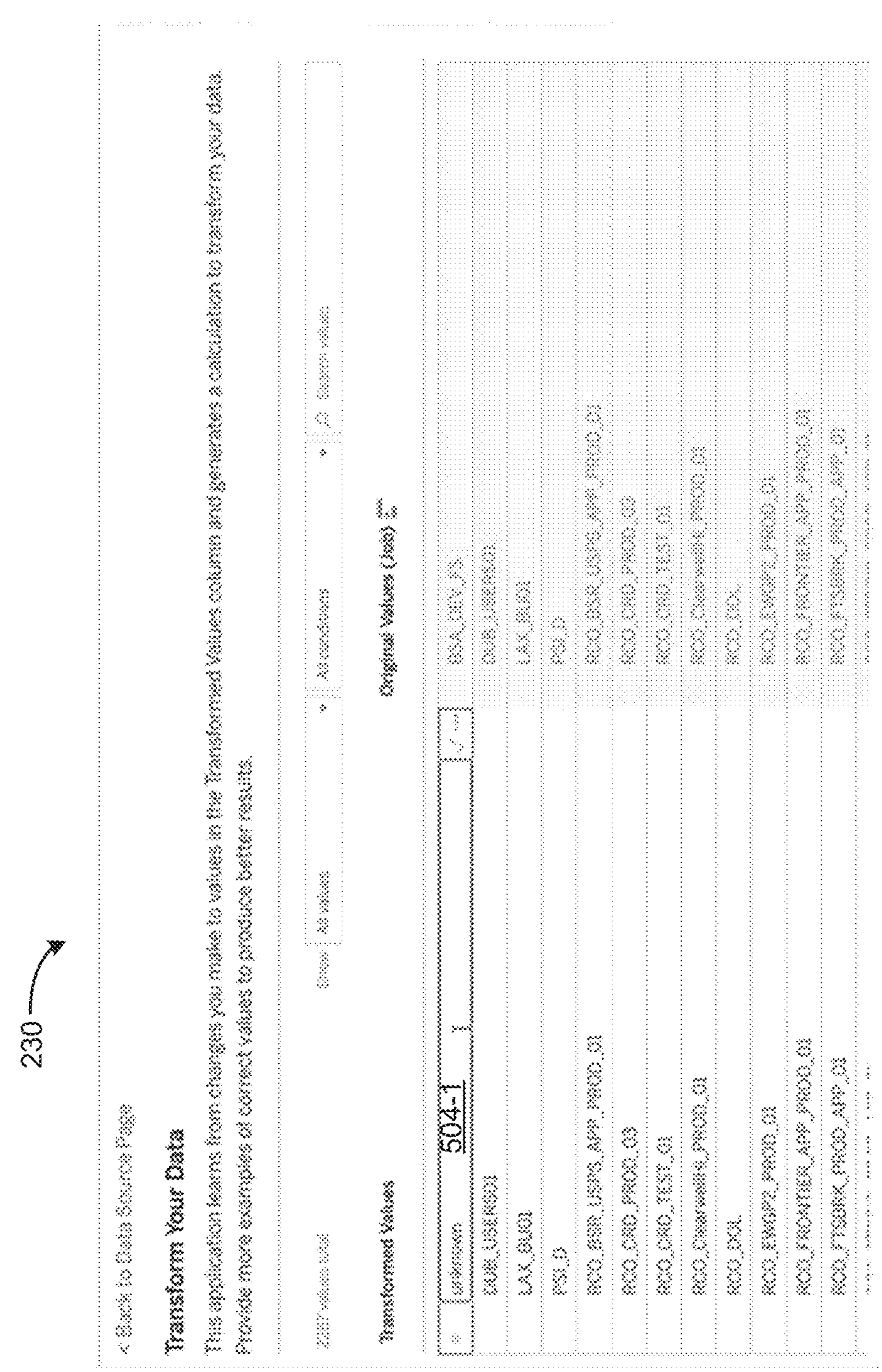
Figure 5C:
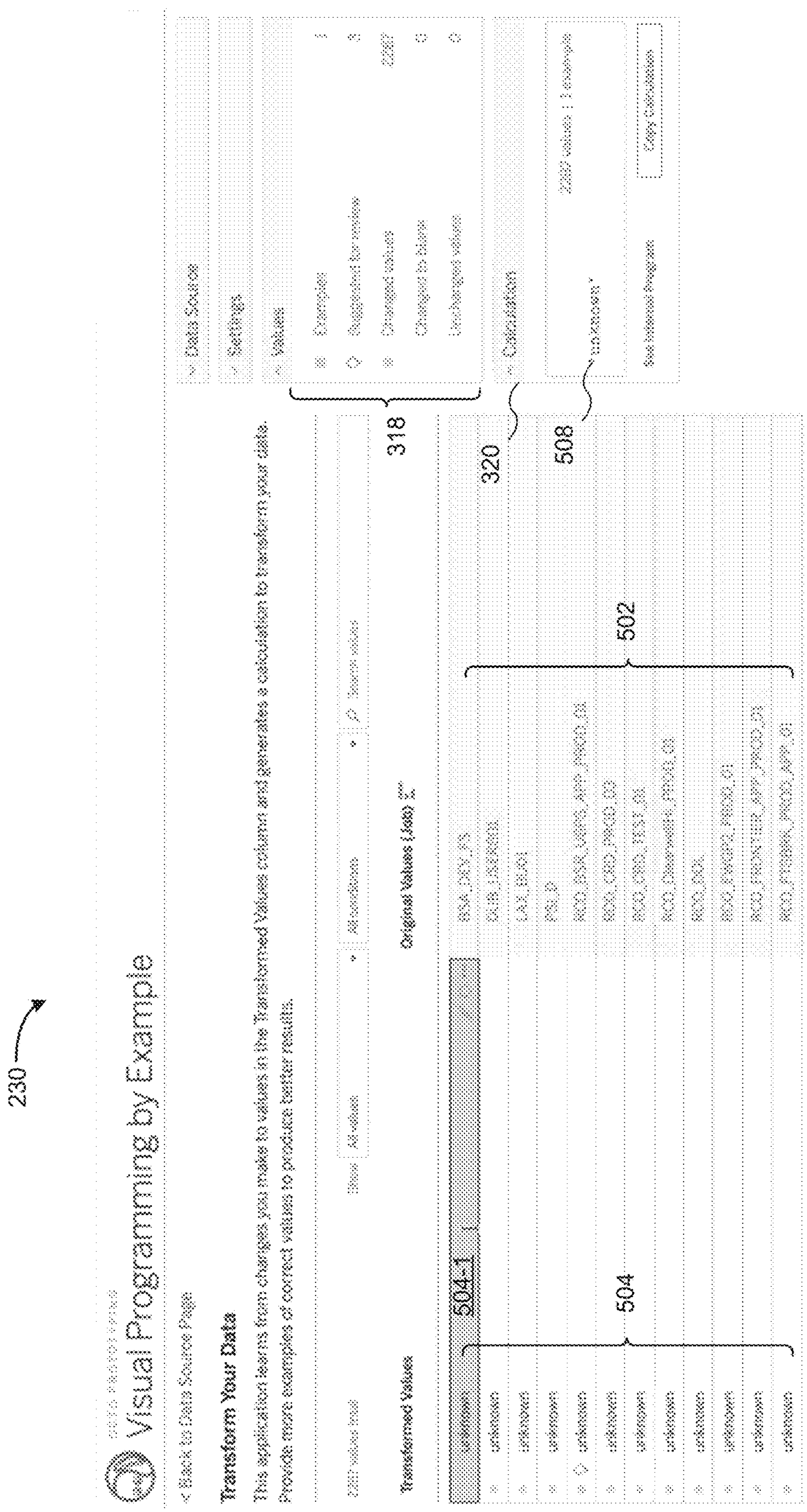

FIG. 5B illustrates a user update to the first data value 504-1. In this example, the user replaces the original value "BSA_DEV_FS" with the term "unknown." FIG. 5C shows the results of entering the single example "unknown." In this example, the expression generator 228 infers a transformation function ƒ 508 and applies the function ƒ 508 to all 2287 rows. In this case, all of the displayed rows are updated to "unknown" for all data values in the second column 504. In most cases, providing only one example is not enough to infer the desired function ƒ, so the user may have to provide more examples and/or hints for the function ƒ 508 to represent the user's desired transformation.

Figure 5D:
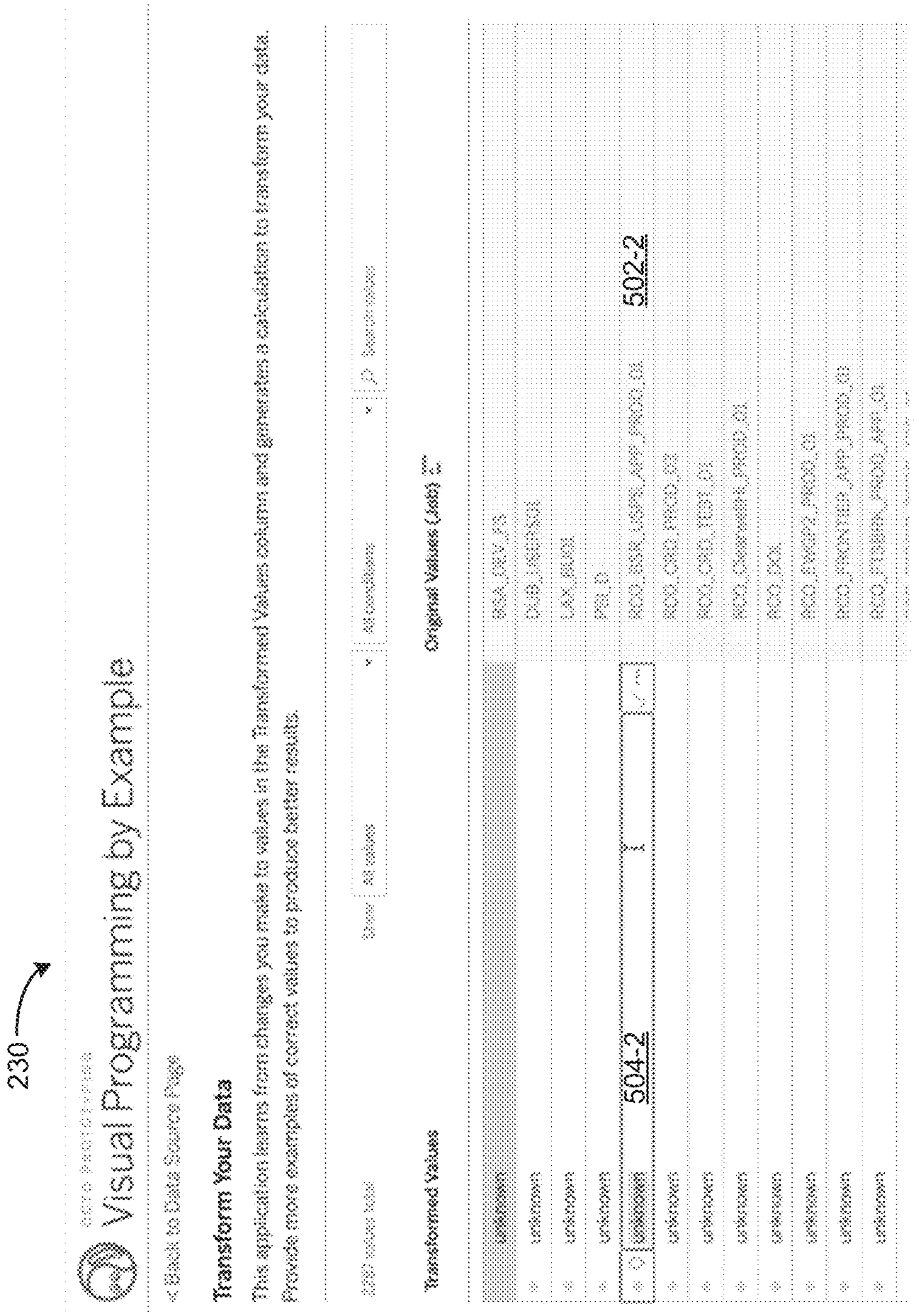
Figure 5E:
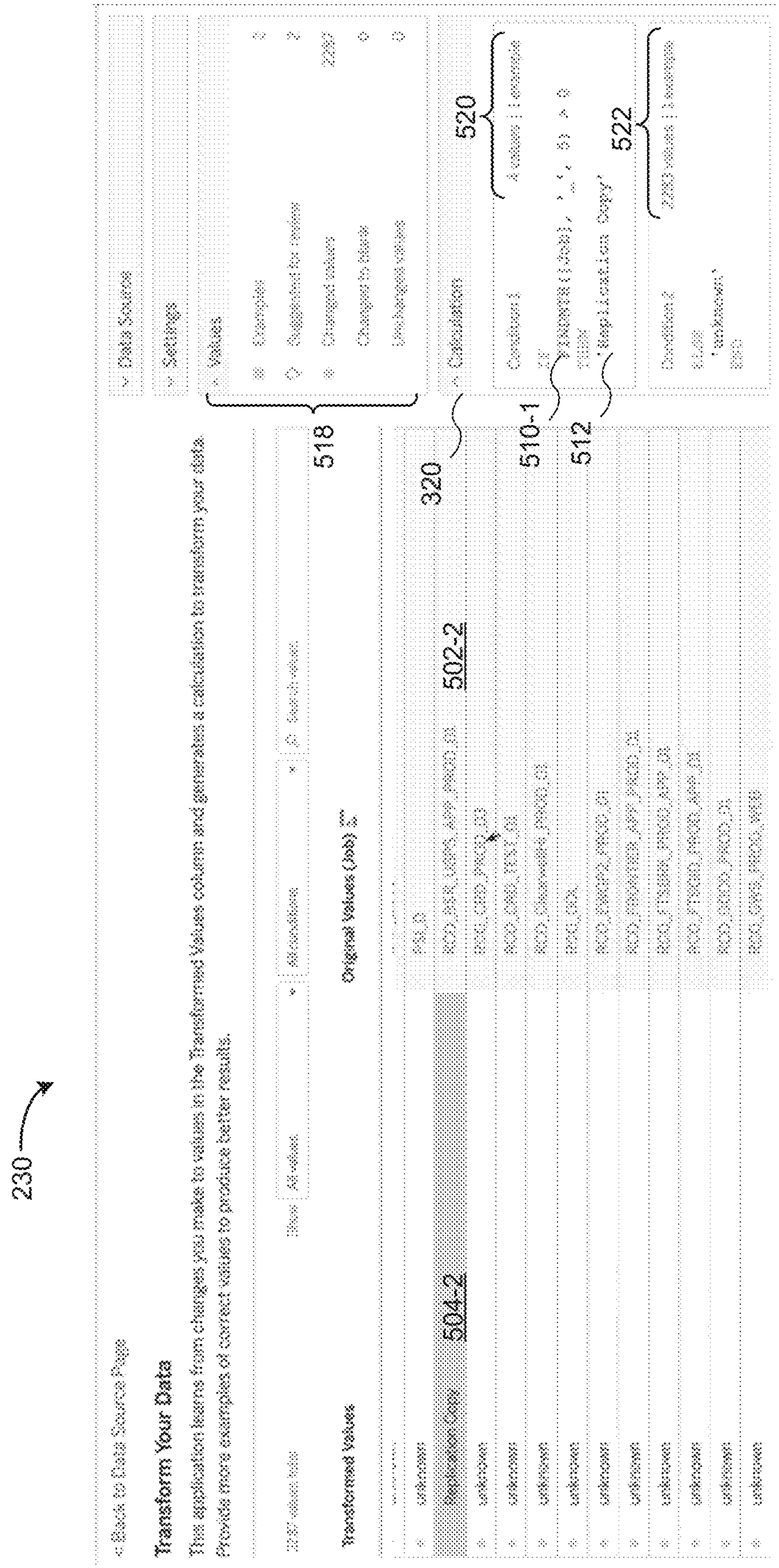

FIG. 5D illustrates another user selection of an output data value 504-2, which corresponds to the input data value 502-2. FIG. 5E illustrates the user providing a second transformation example. In FIG. 5E, the user knows, for example, that "RCO" in "RCO_BSR_USPS_APP-PROD_01" of the input data value 502-2 represents a "Replication Copy" operation and that therefore the input data value 502-2 should transform to "Replication Copy" in the data value 504-2. Therefore, the user modifies the output data value 504-2 of the second column 504 to provide a second example to the computing system. Based on the two user examples, the computing system infers that the relevant factor in the data values was the number of underscore characters '–' in the original data values. The Boolean condition 510-1 determines whether the input string includes five underscores (is the position of the fifth underscore greater than 0). When the Boolean condition evaluates to TRUE, the output value is specified by the corresponding function 512. In this case, the function 512 is the string "Replication Copy." As shown by the usage indicator 520, this Boolean condition applies to only four rows. The other 2283 rows return an output of "unknown," as shown by the usage indicator 522 for the ELSE condition.

Figure 5F:
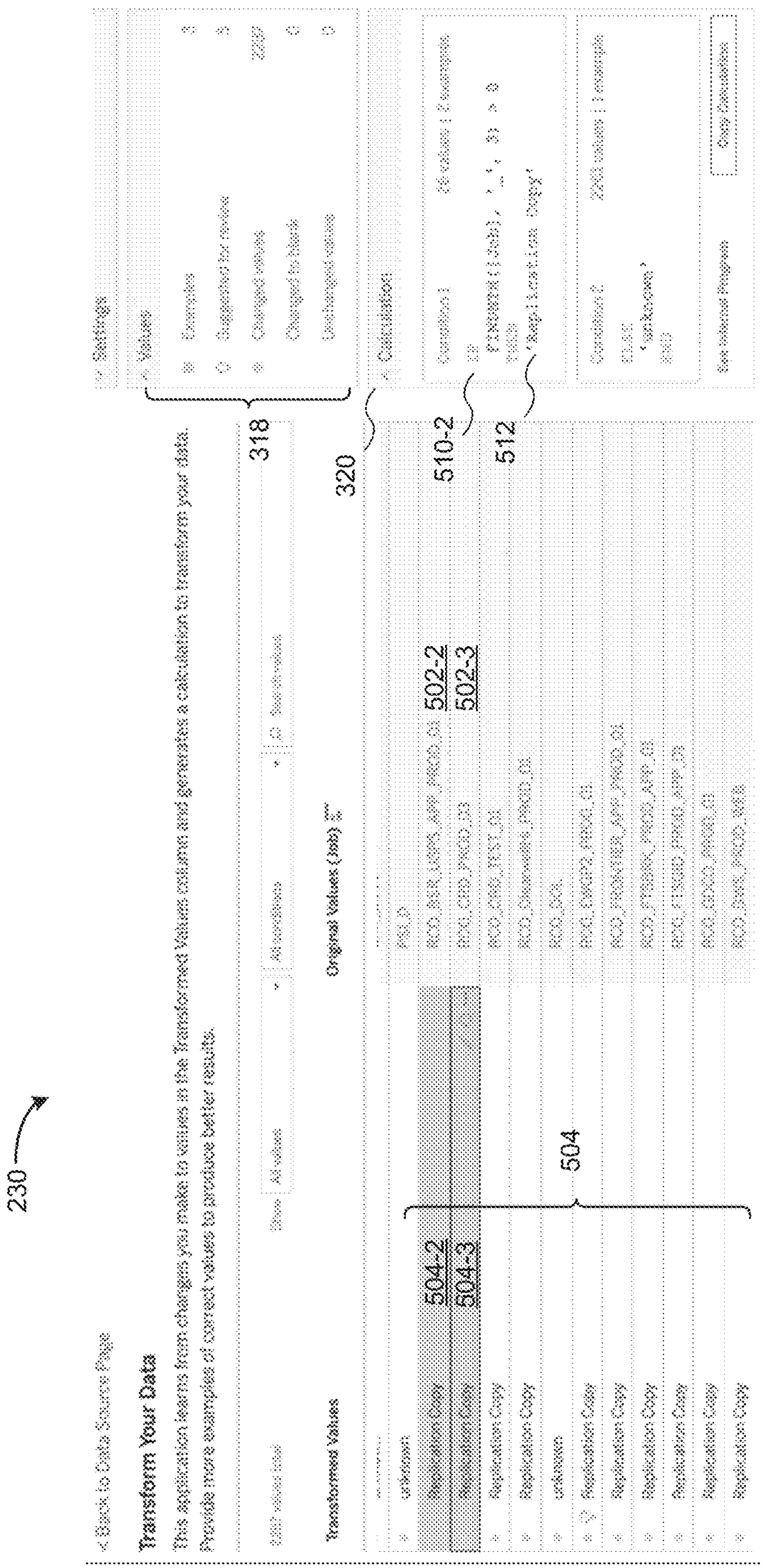

FIG. 5F illustrates a user providing a third transformation example, in which the user provides an example output 504-3 for the data value 502-3. In this example, although the data value 502-3 only has three underscores, the characters "RCO" are present and thus the user sets the output data value 504-3 to "Replication Copy." In this example, the third user example is not sufficient to get the desired transformation function ƒ. In some situations, more than three examples are needed for the computing system to output the user's desired function ƒ. Here, the Boolean condition 510-2 determines whether the input string [Job] includes three or more underscores '_'. If the Boolean condition evaluates to TRUE, the output value is specified by the corresponding function 512. In this case, the function 512 represents replacing the original value with the "Replication Copy" string.

Figure 5G:
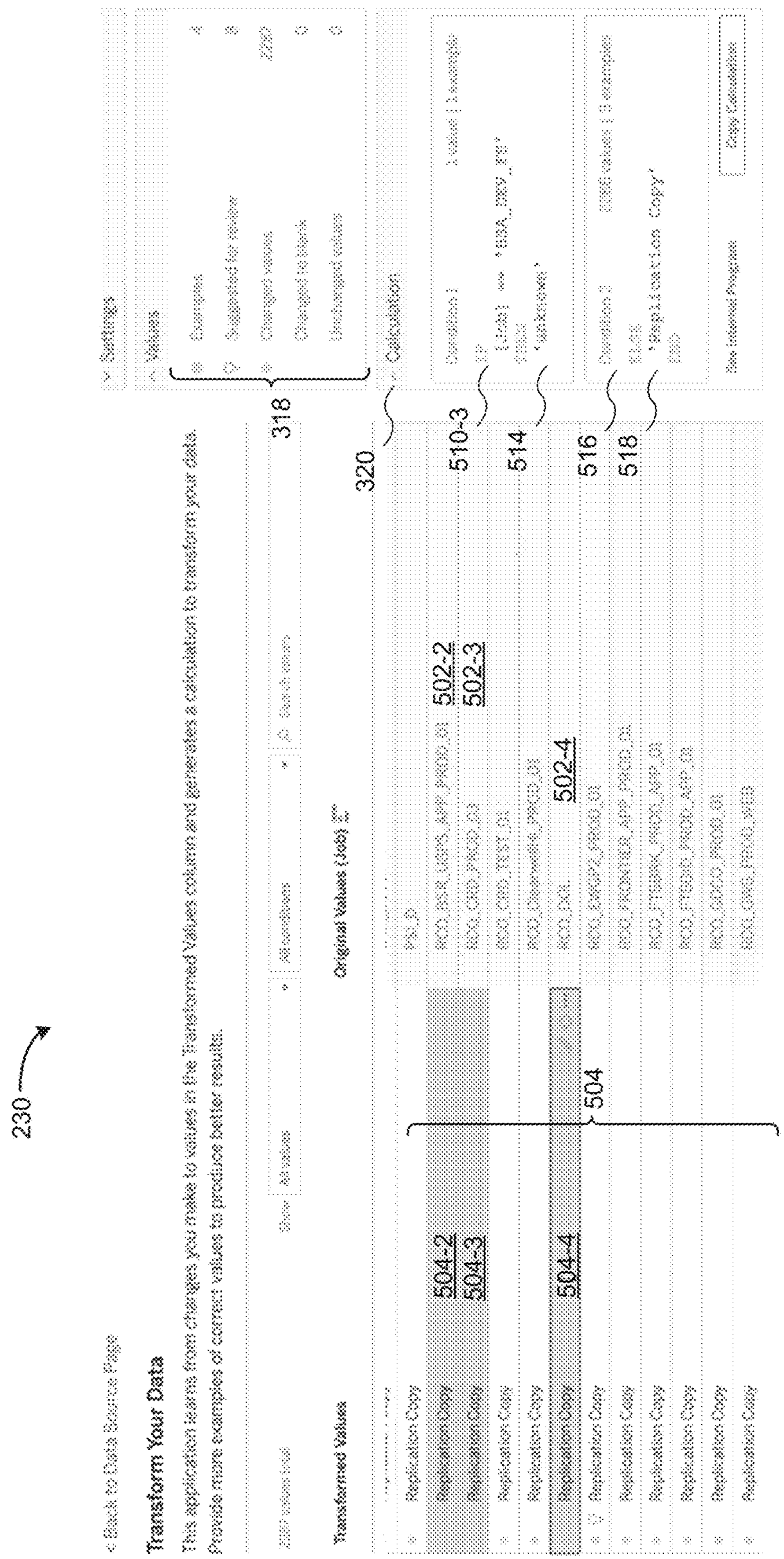

FIG. 5G illustrates a user providing a fourth transformation example, in which the user provides an example output 504-4 for the data value 502-4. The data value 502-4 only has a single underscore, but includes the characters "RCO." Based on the user updating the data value 504-4 to "Replication Copy," the computing system updates the Boolean condition 510-3 in expression window 320 to present the function ƒ 514 to reflect the fourth example. In this example, the Boolean condition determines whether the input string [Job] includes "BSA_DEV_FS" in the original data value. If the Boolean condition evaluates to TRUE, the output value is specified by the corresponding function 514 "unknown." In this example, a second Boolean condition 516 is presented such that if the Boolean condition 510-3 evaluates to FALSE, the output value is specified by the corresponding function 518 which is "Replication Copy." Thus, in this example, one value (the data value 504-1) is transformed to "unknown" and the remainder transform to "Replication Copy," which has become a catch all.

Figure 5H:
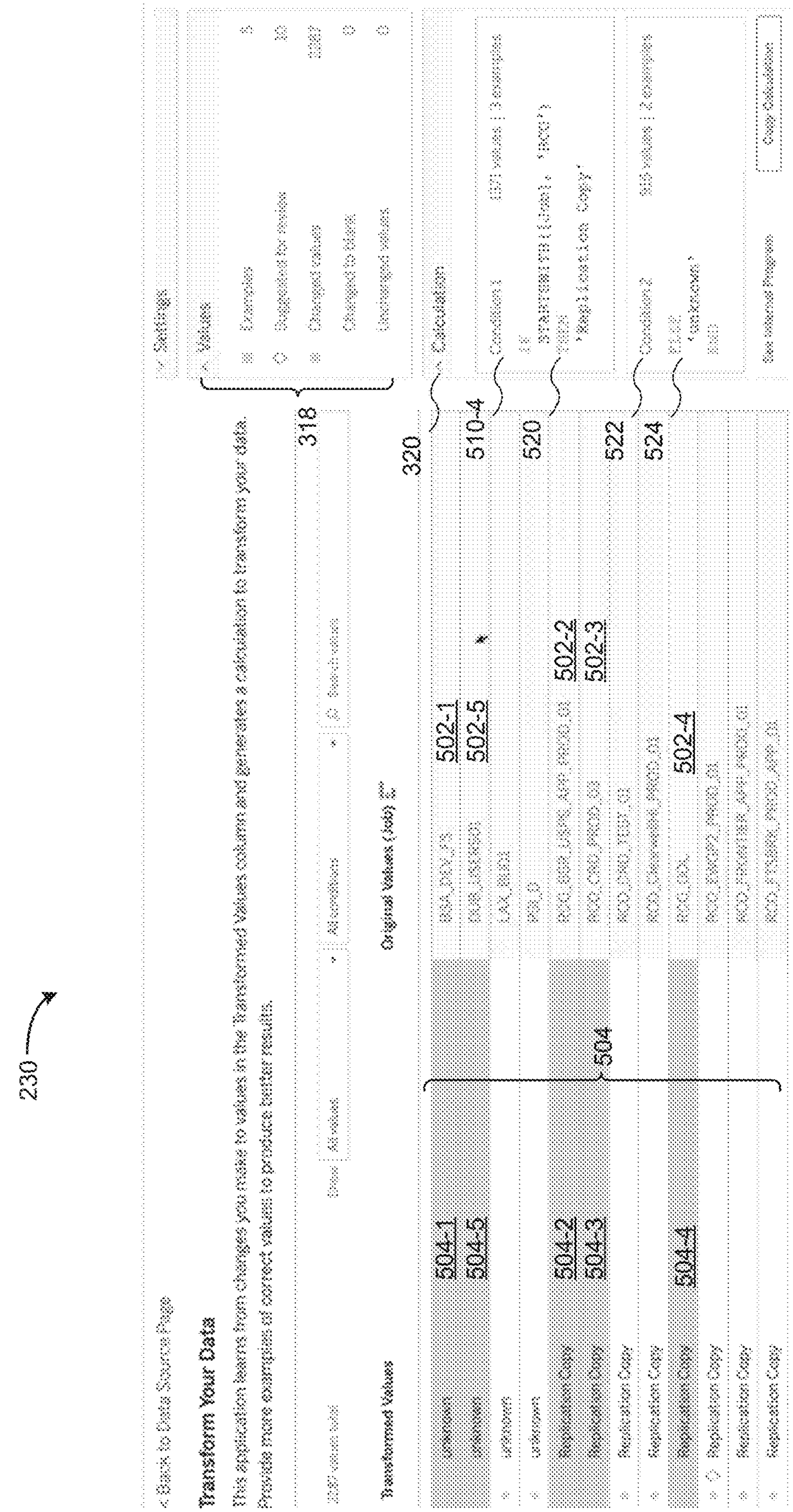

FIG. 5H illustrates a user providing a fifth transformation example, in which the user provides an example output 504-5 for the data value 502-5. The data value 502-5 "DUB_USER01" does not include the characters "RCO," so the user sets the output 504-5 to be "unknown". In this example, the fifth user example is sufficient to get the desired transformation function ƒ. Here, the Boolean condition 510-4 determines whether the input string [Job] starts with the characters "RCO." If the Boolean condition evaluates to TRUE, the output value is specified by the corresponding function 520. In this case, the function 520 represents replacing the original value with the "Replication Copy" string. If the Boolean condition evaluates to FALSE, the output value is specified by the corresponding function 424. In this case, the remainder of the inputs transform to "unknown," which is the user-intended catch all.

FIGS. 6A-6L provide a graphical user interface 230 used in some implementations. The user interface 230 in FIGS. 6A-6G shows data from the same data source as shown in FIGS. 5A-5H. However, instead of providing only user examples to the computing device, FIGS. 6A-6G illustrate the user providing hints to streamline generation of the desired transformation function.

Figure 6A:
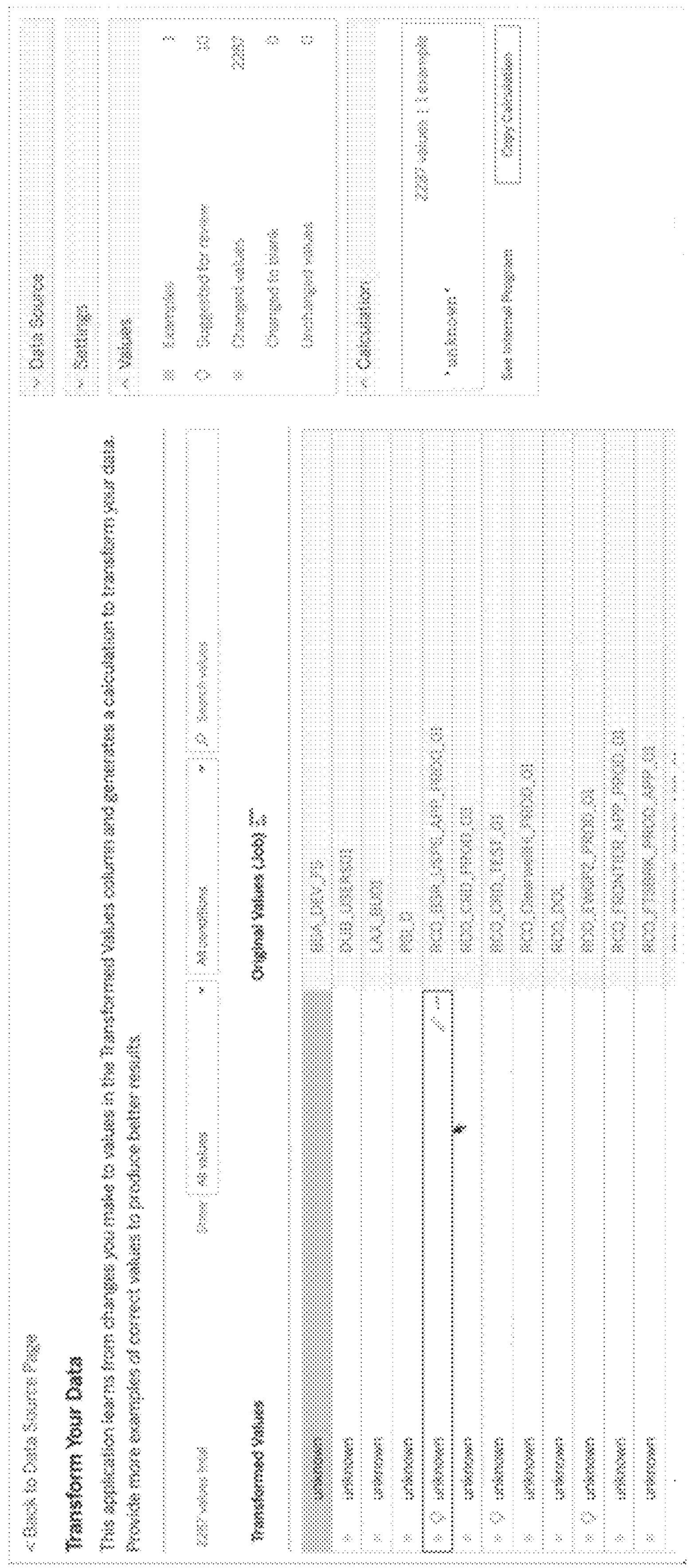
FIGS. 6A-6L illustrate example graphical user interfaces in accordance with some implementations.
Figure 6B:
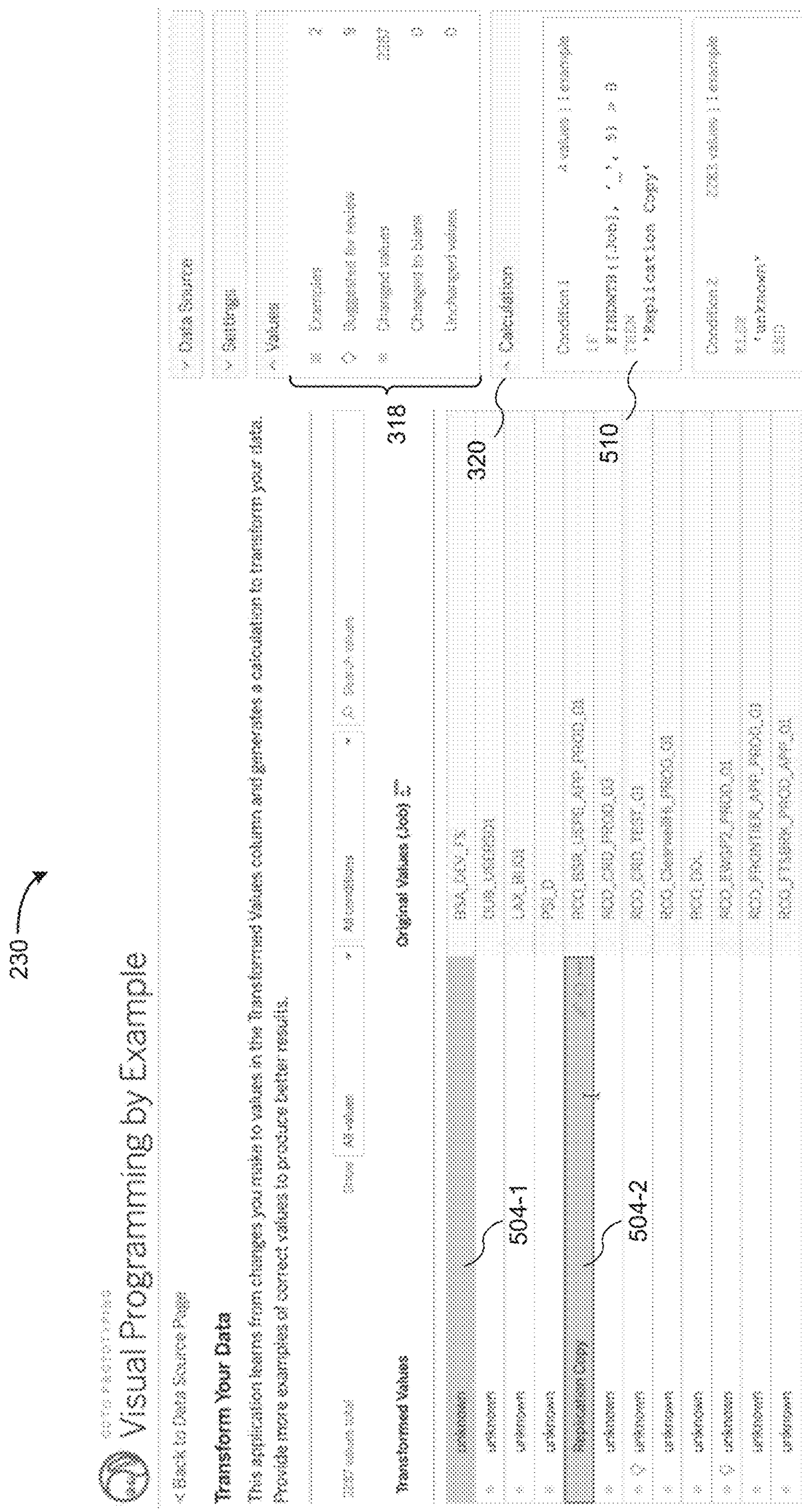

FIG. 6A illustrates the same state as FIG. 5C, where the user has provided a first example to the computing device (as shown in FIGS. 5A-5B). Similarly, FIG. 6B illustrates the same state as FIG. 5E, where the user has provided a second example to the computing device (as shown in FIGS. 5D-5E). Thus, FIG. 6B illustrates the user example of "unknown" for the data value 504-1 and the user example of "Replication Copy" for the data value 504-2.

Figure 6C:
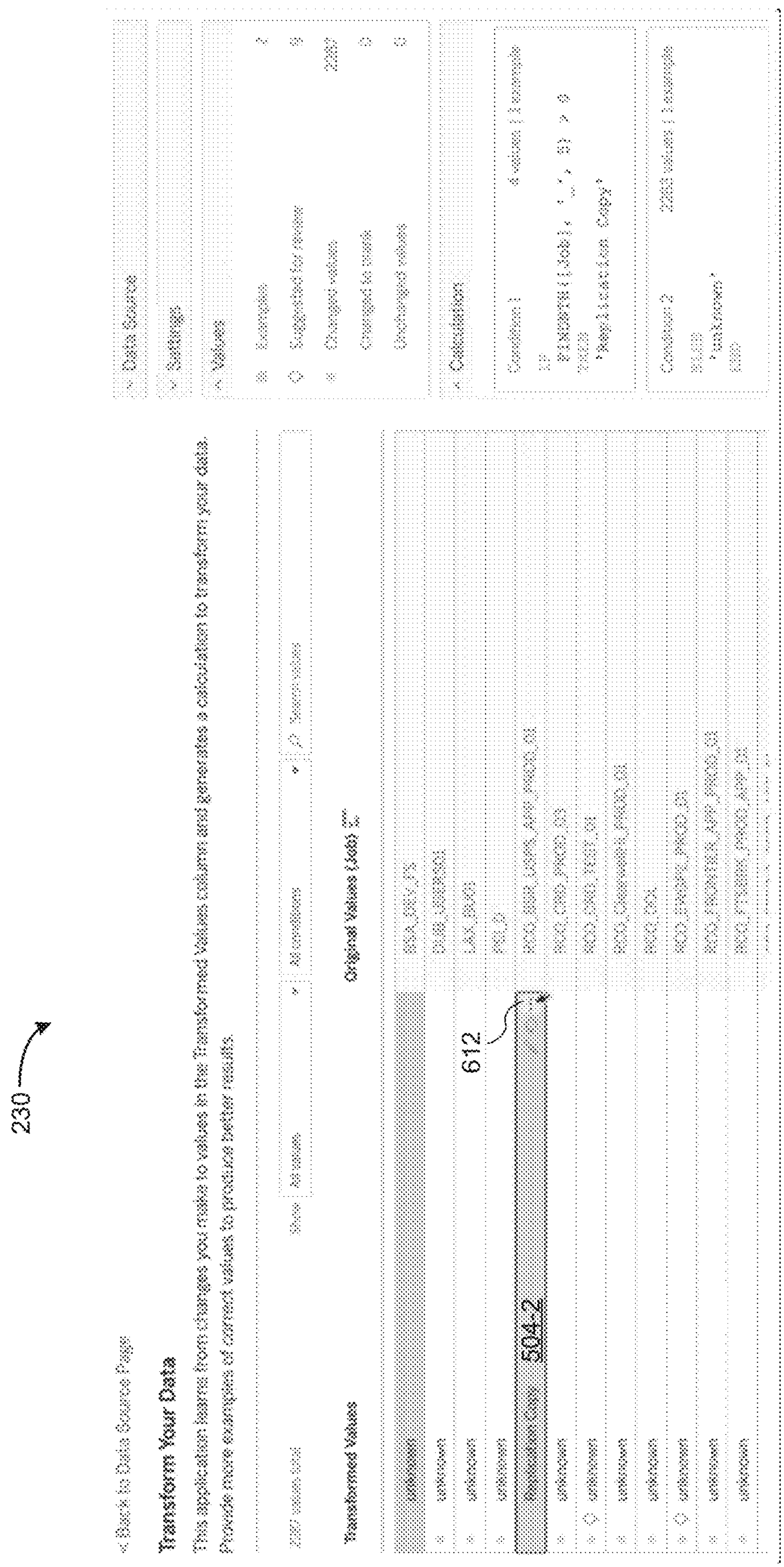
Figure 6D:
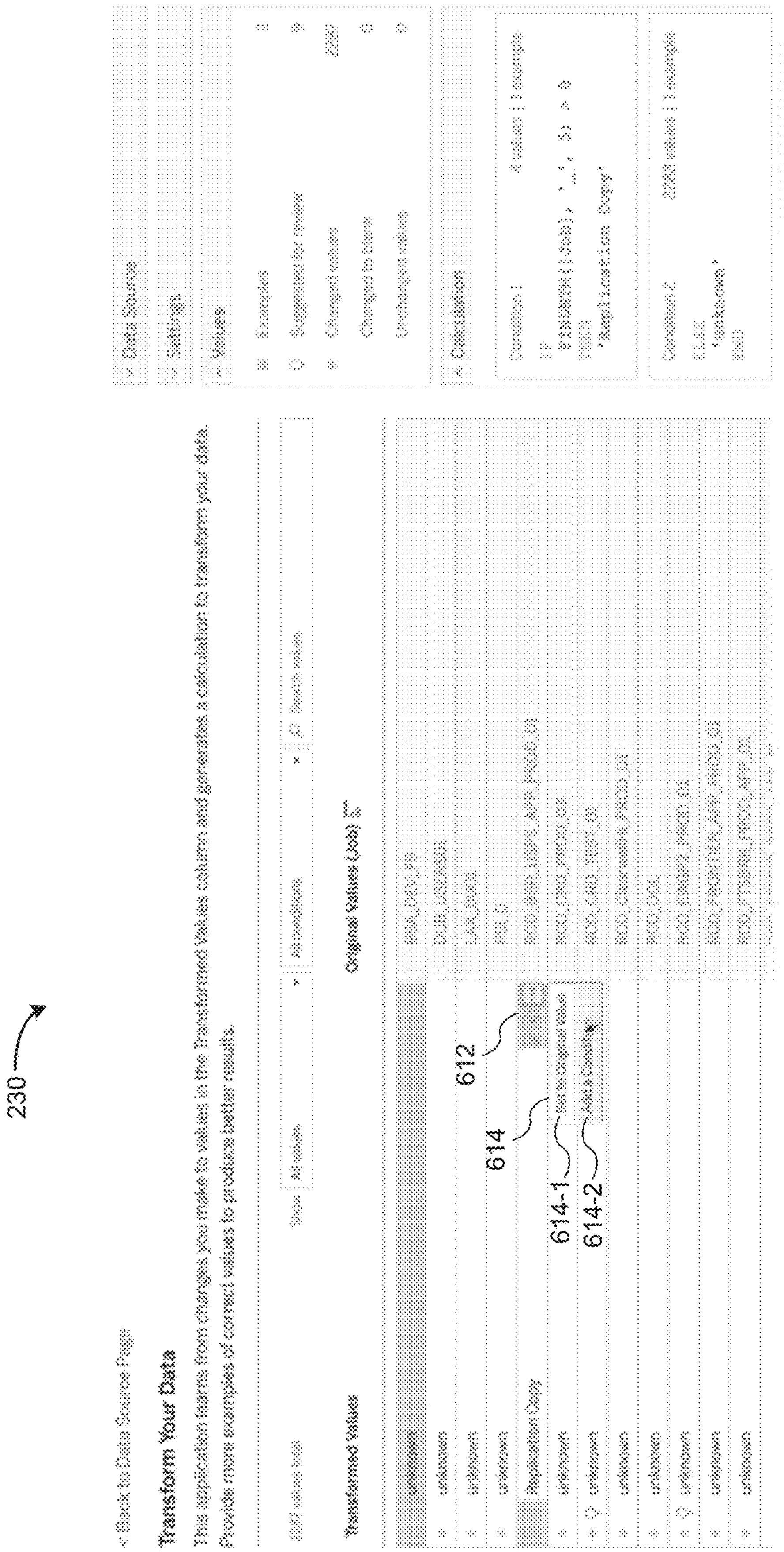
Figure 6E:
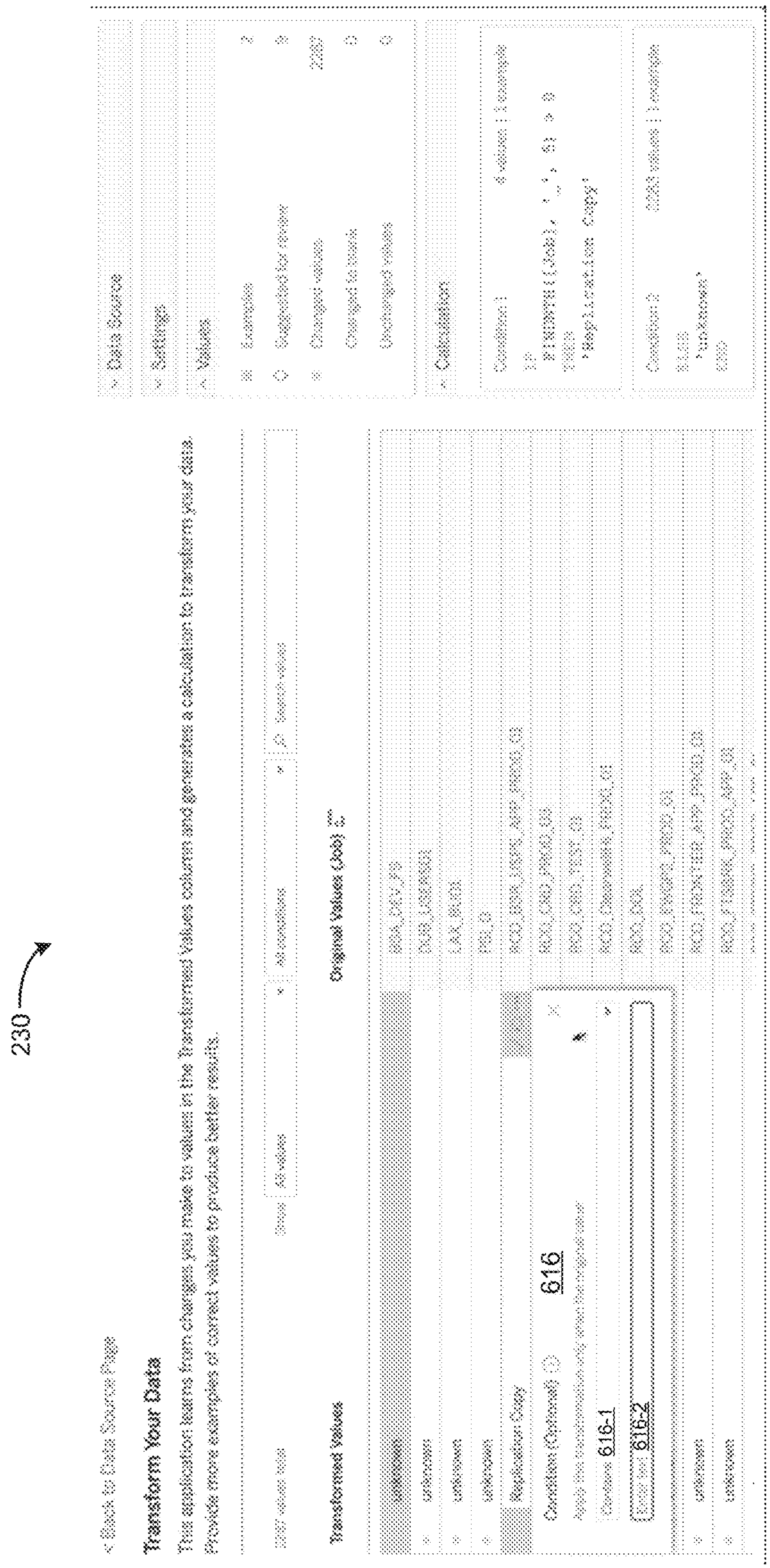

FIGS. 6C-6G illustrate an alternative to the sequence illustrated in FIGS. 5F-5H. In FIGS. 6C-6G the user provides a hint for the user example data value 504-2. In some implementations, the user is able to provide one or more hints to the computing device during or after each user example. In some implementations, the user is able to provide one or more hints after a specified number of examples (e.g., 3user examples). FIG. 6C shows selection of the action menu 612 for the user example data value 504-2. FIG. 6D shows display of the dropdown menu 614 with the "Set to Original Value" option 614-1 and the "Add a Condition" option 614-2. FIG. 6E shows display of the hint window 616 in response to selection of the "Add a Condition" option 614-2. The hint window is further described with reference to FIG. 4G above. The hint window 616 includes two user input regions 616-1 and 616-2. The first input region 616-1 allows the user to select an operator for the hint. The second user input region 616-2 allows the user to identify text that is important to the transformation (e.g., text to be used in the condition statement of the transformation function). For example, the user may select "Starts-With" in the dropdown list of the first user input region 616-1 and input "RCO" in the second input region 616-2. In this example, the user informs the computing device that the transformation of the data value 502-2 to "Replication Copy" in the data value 504-2 is due to the data value 502-2 starting with the characters "RCO." In some implementations, the first user input region 616-1 is static and does not change. In some implementations, the first user input 616-1 is automatically generated based on operators most commonly selected by the user.

Figure 6F:
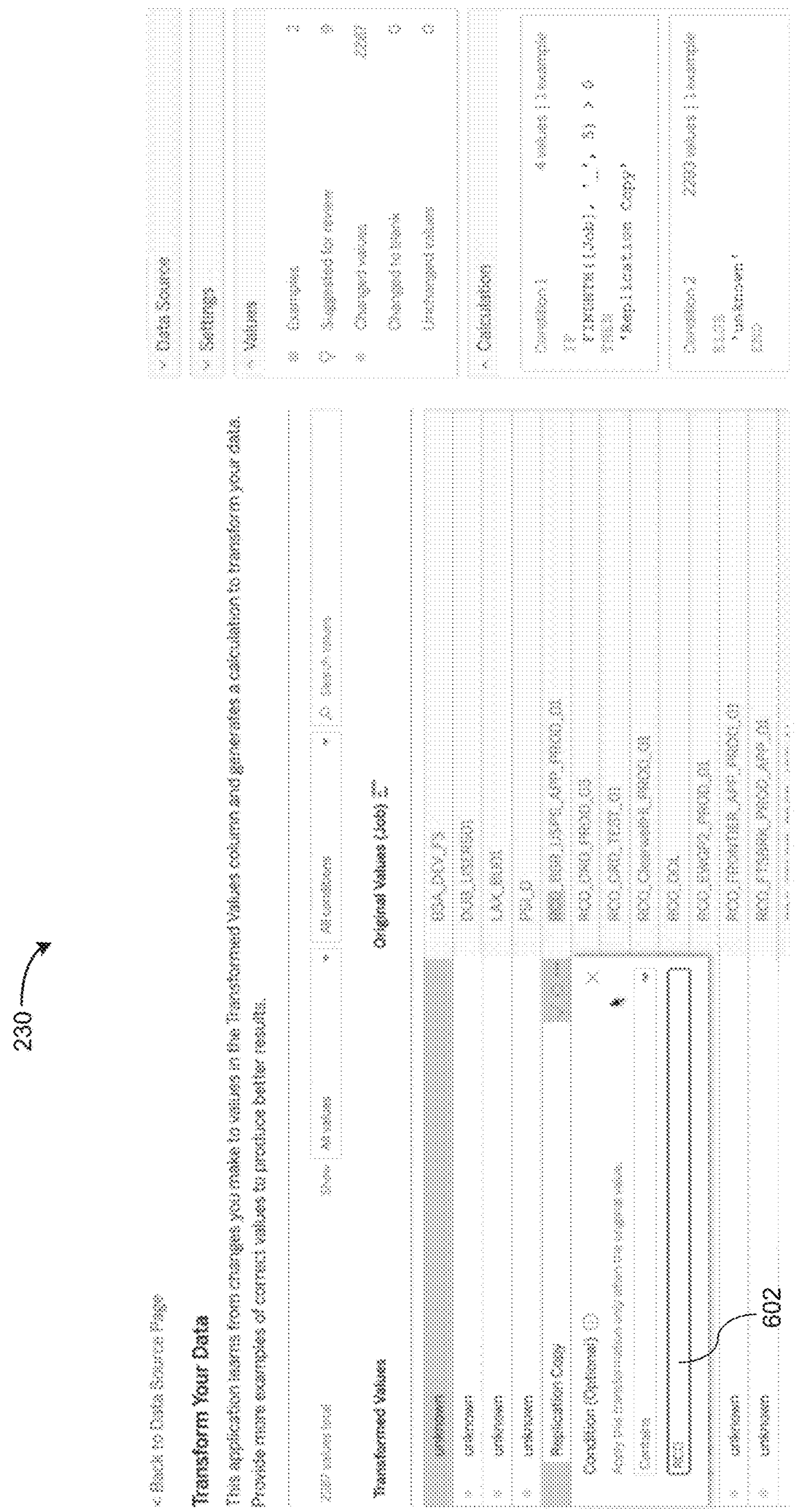

FIG. 6F illustrates the user providing a hint for the data value 504-2 to the computing device. In this example, the user specifies that the transformation for data value 504-2 occurs due to the original data value 502-2 containing the characters "RCO" 602. This hint provided to the computing device indicates that the transformation is dependent on the presence of "RCO" rather than the number of underscores.

Figure 6G:
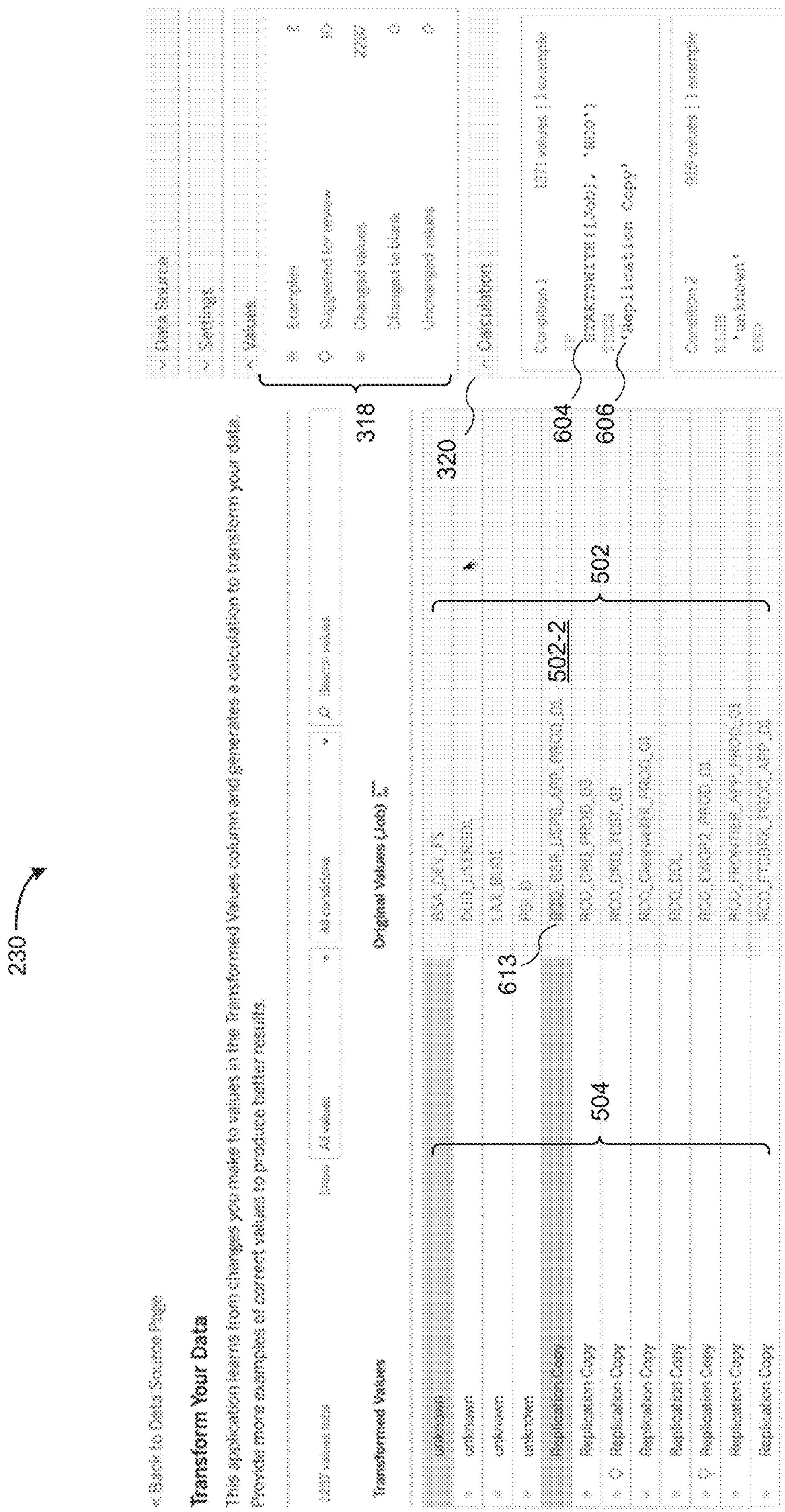

FIG. 6G illustrates an updated user interface 230 based on the hint provided in FIG. 6F. In FIG. 6G, display of the data item 502-2 has been updated to include highlighting for the characters "RCO" to indicate that those characters are being used in a user hint. FIG. 6G also shows the updated function ƒ 604 of the expression window 320 based on the hint provided to the computing system in FIG. 6F. In this example, the computing device used the user hint to update the function ƒ to determine whether a data value in column 502 starts with the characters "RCO". For any value that meets this condition, the transformed data value will be updated to "Replication Copy" 606. The ELSE condition in FIG. 6G transforms any data value that does not begin with "RCO" to "unknown." Thus, the system in the examples of FIGS. 6A-6G is able to generate the desired user transformation with 2user examples and 1 user hint, whereas the system in the examples of FIGS. 5A-5H required 5 user examples to generate the same desired user transformation.

Figure 6H:
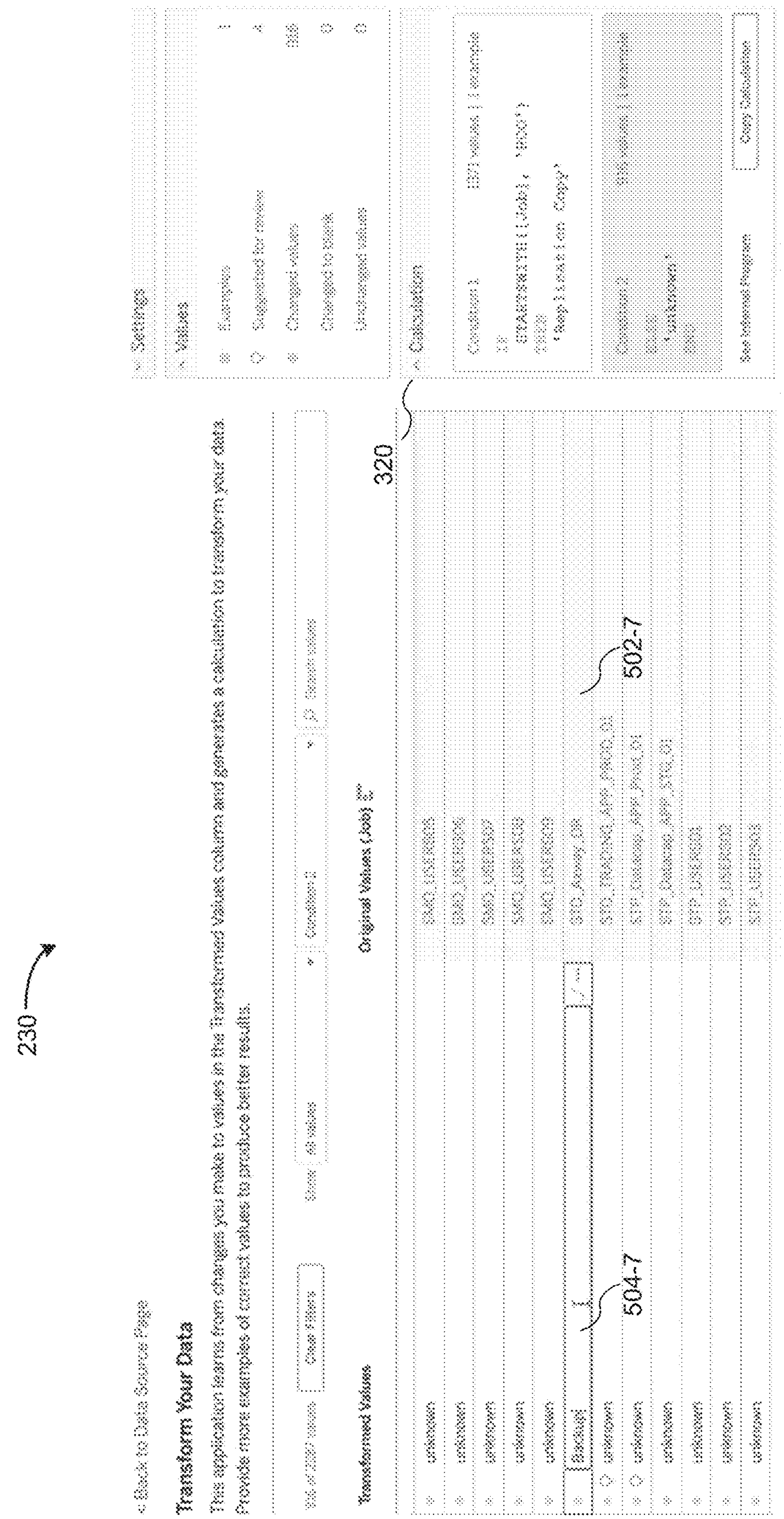
Figure 6I:
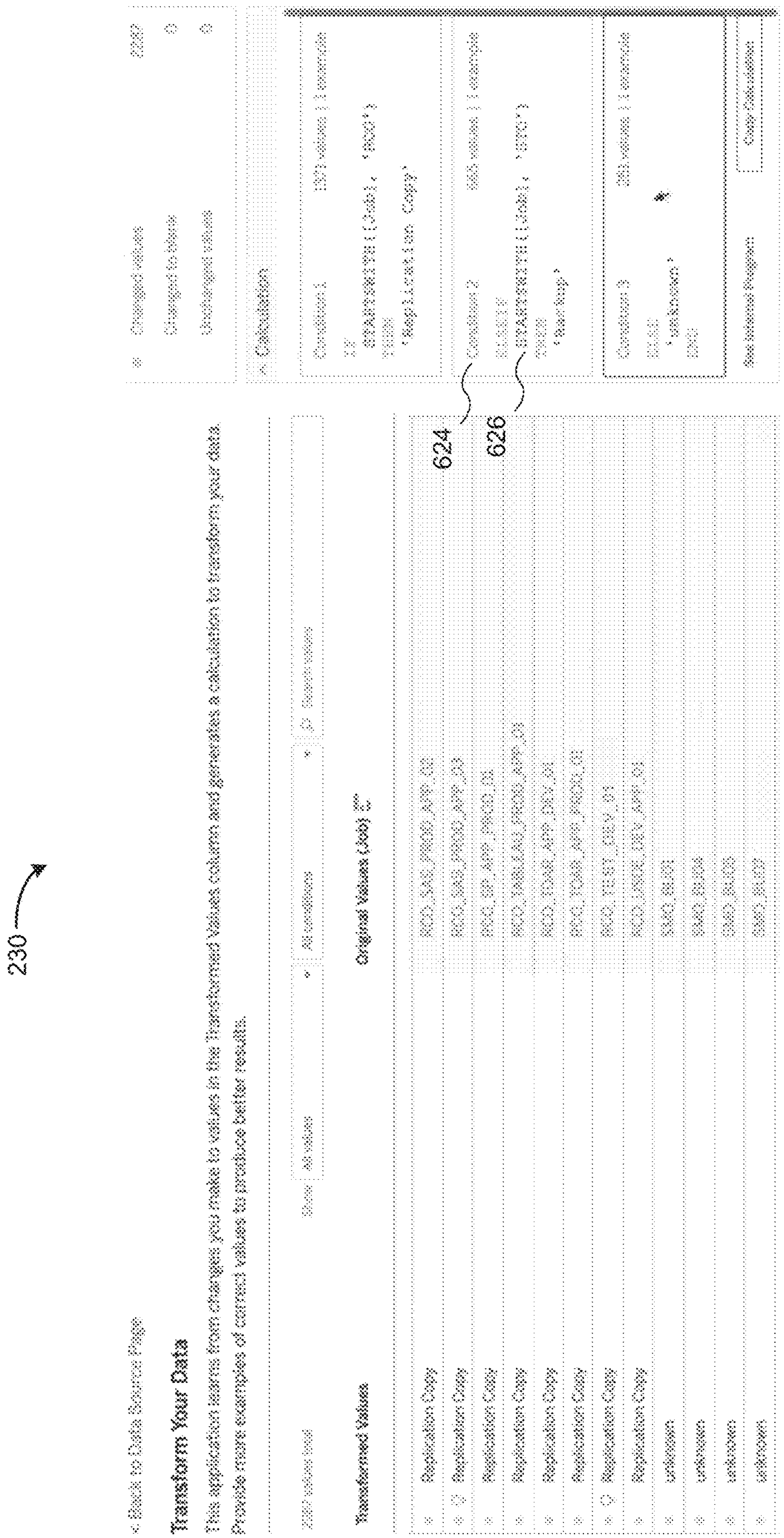

FIGS. 6H-6L illustrate a continuation of the example of FIGS. 6A-6G. FIGS. 6H-6I illustrate a user providing a third transformation example, in which the user provides an example output 504-7 for the data value 502-7 STO-Axway_DR". In this example, the user sets the output data value 504-7 to "Backup" based on the data value 502-7 starting with the characters "STO." In this example, the expression generator 228 adds a second condition 624 that has a second function 626 in response to the third user example. In this example, the second function 626 correctly applies the desired condition of checking whether the data value starts with the characters "STO" and transforms the data value to "Backup" if the condition is TRUE.

Figure 6J:
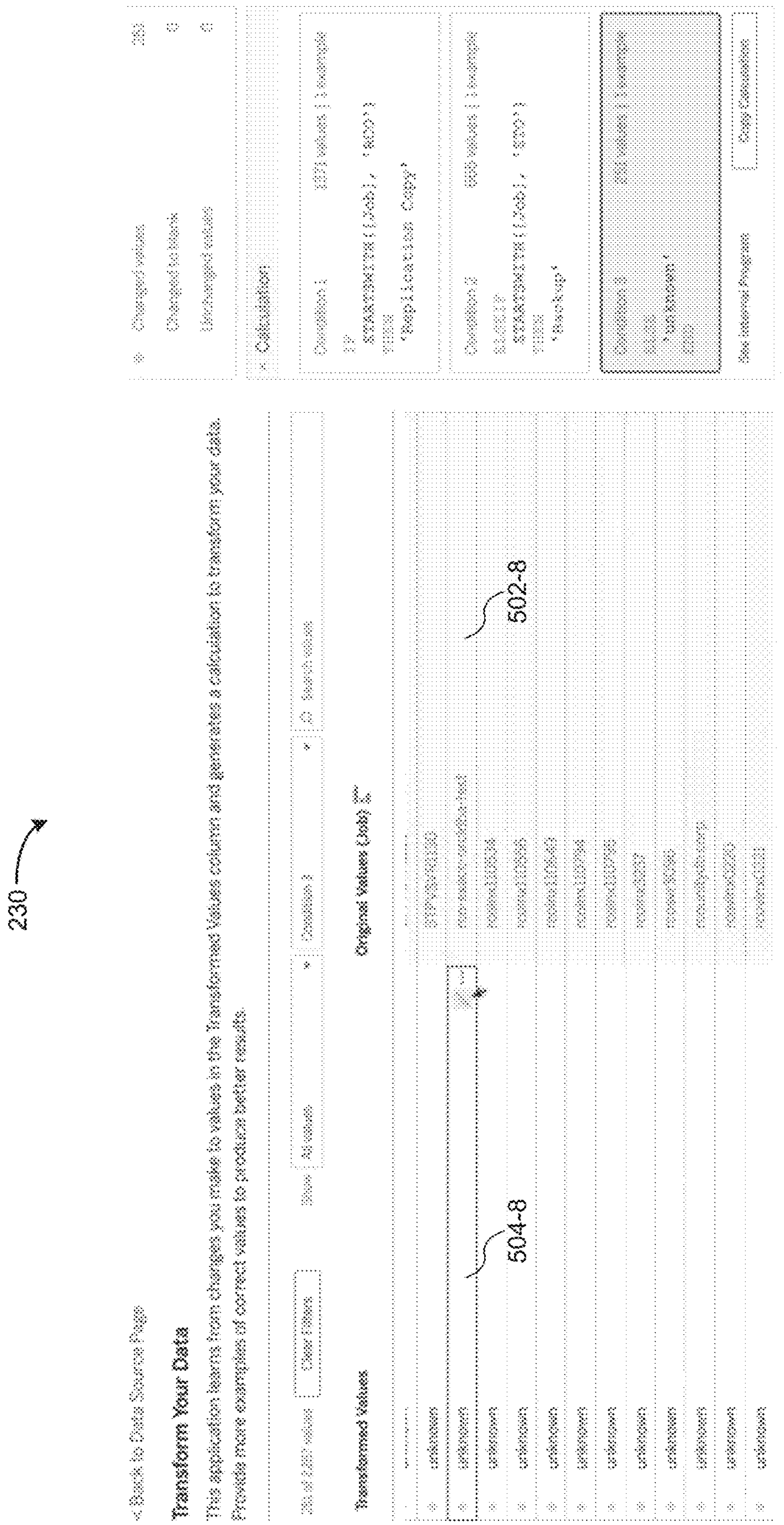
Figure 6K:
Figure 6L:

FIGS. 6J-6L illustrate a user providing a fourth transformation example, in which the user provides an example output 504-8 for the data value 502-8 "rco-exacc-orcidba-test". In this example, the user notes that the data value 502-8, which begins with a lowercase "rco" string, has been transformed to "unknown" rather than "Replication Copy." In FIG. 6K, the user sets the output data value 504-8 to "Replication Copy." In FIG. 6L, the expression generator 228 updates the function ƒ so that the expression 628 is case independent. In this example, the function ƒ obtains a lowercase version of the data value in column 502 to determine whether it starts with the characters "rco" and transforms the data value to "Replication Copy" if the condition is TRUE.

Figure 7A:
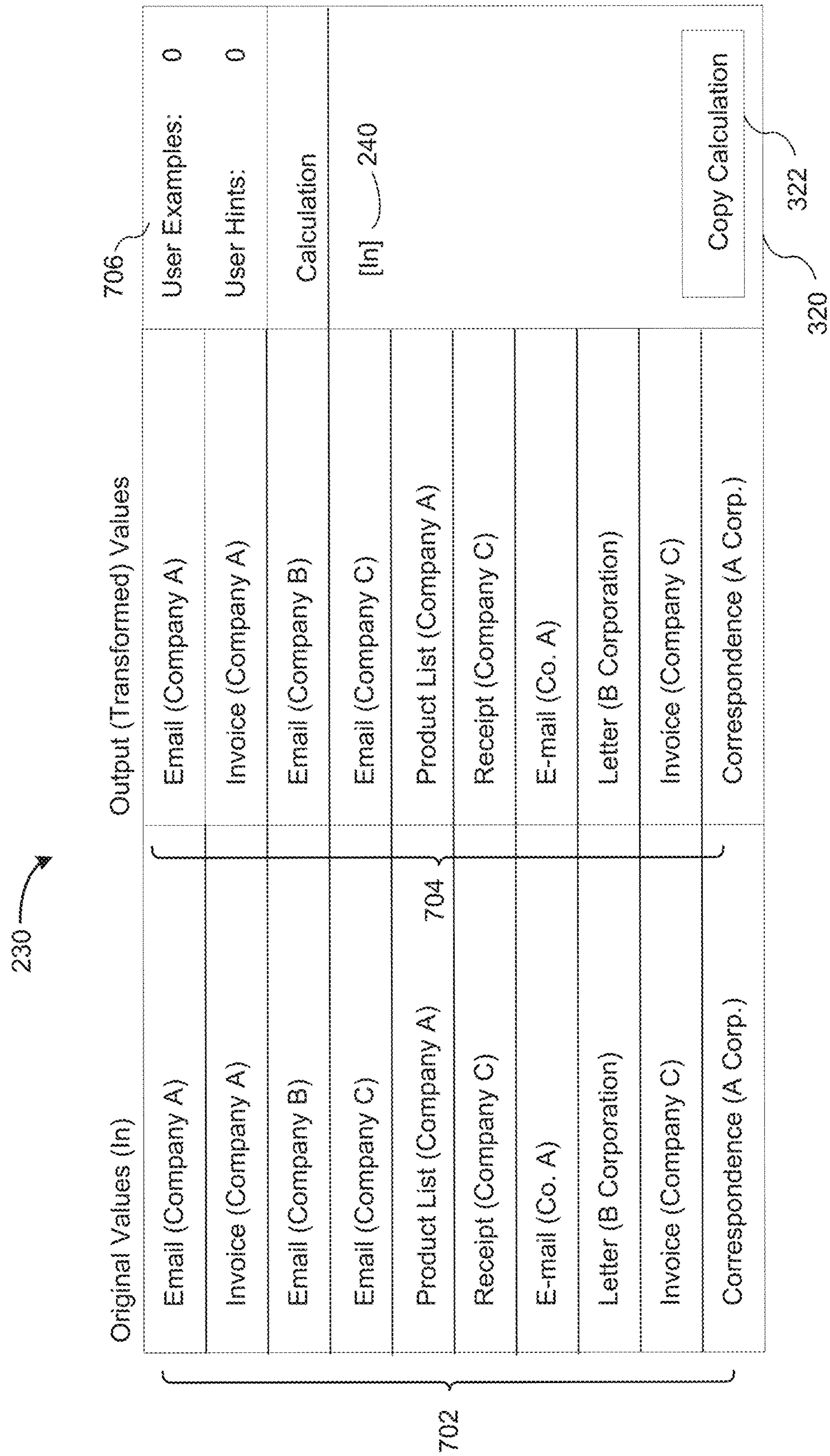

FIGS. 7A-7E provide a graphical user interface 230 used in some implementations. In FIGS. 7A-7E, the data values are arranged in a first column 702 representing original data values from the data source, and a second column 704 with output data values representing transformations of the original data values in the first column 702. In FIG. 7A, because the user has not yet provided any transformation examples, the calculation 320 shows [In], which is a label for the original data input. The calculation of [In] indicates that the output value is currently the same as the input value. FIG. 7A also shows a user input section 706 indicating that the user has provided zero examples and zero hints in the example of FIG. 7A.

Figure 7C:
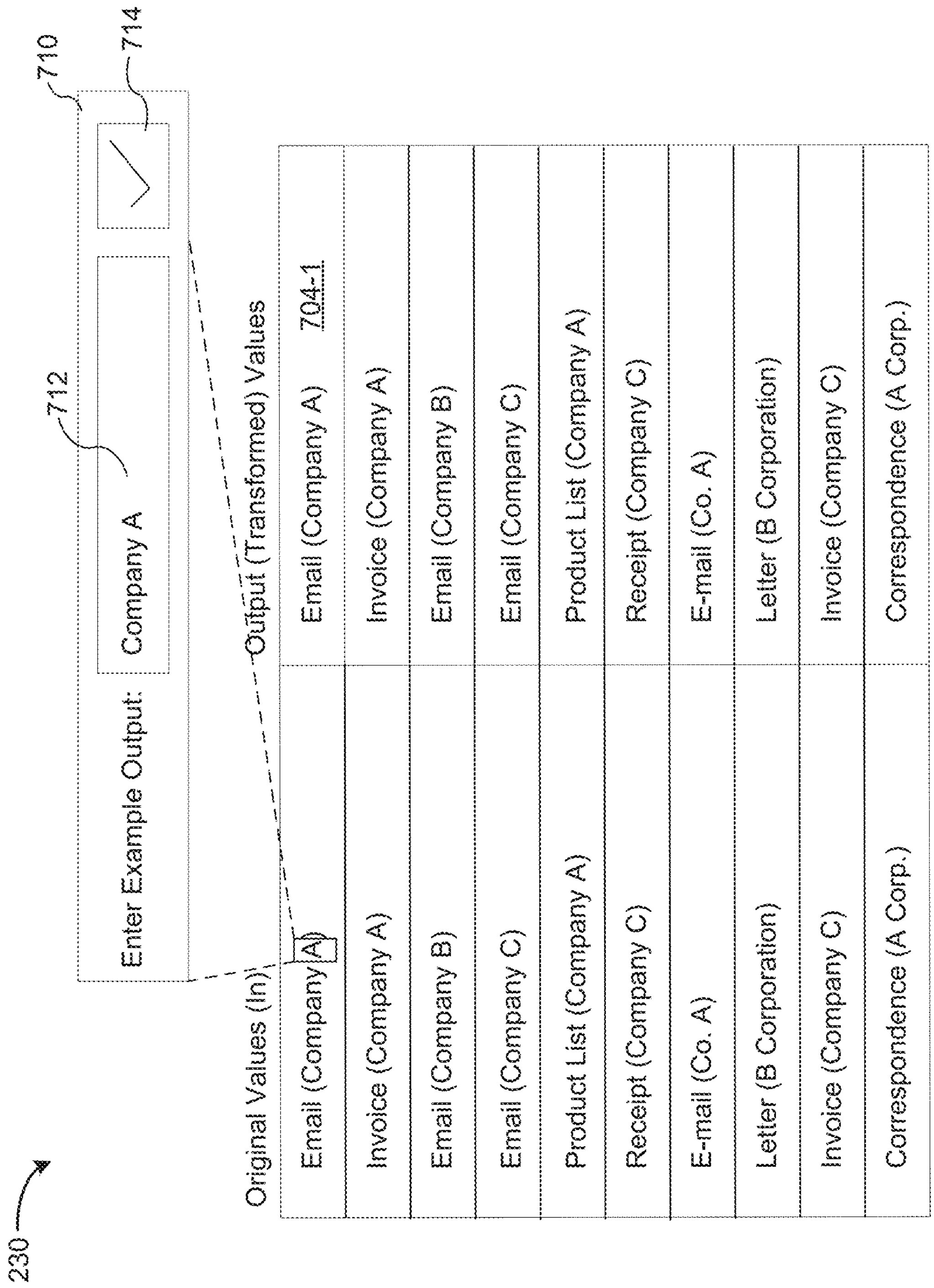

The user in this example wishes to transform the original data set based on which company is associated with each data value. In FIG. 7B, the user has selected a portion 708 (the character "A") of data value 702-1 as a hint for a subsequent transformation of the output value 704-1. FIG. 7C shows an example transformation window 710 displayed in response to the user selection of the portion 708 in FIG. 7B. The example transformation window 710 includes a data entry box 712 and a confirmation button 714. In the example of FIG. 7C, the user has entered "Company A" as the desired output value.

Figure 7D:
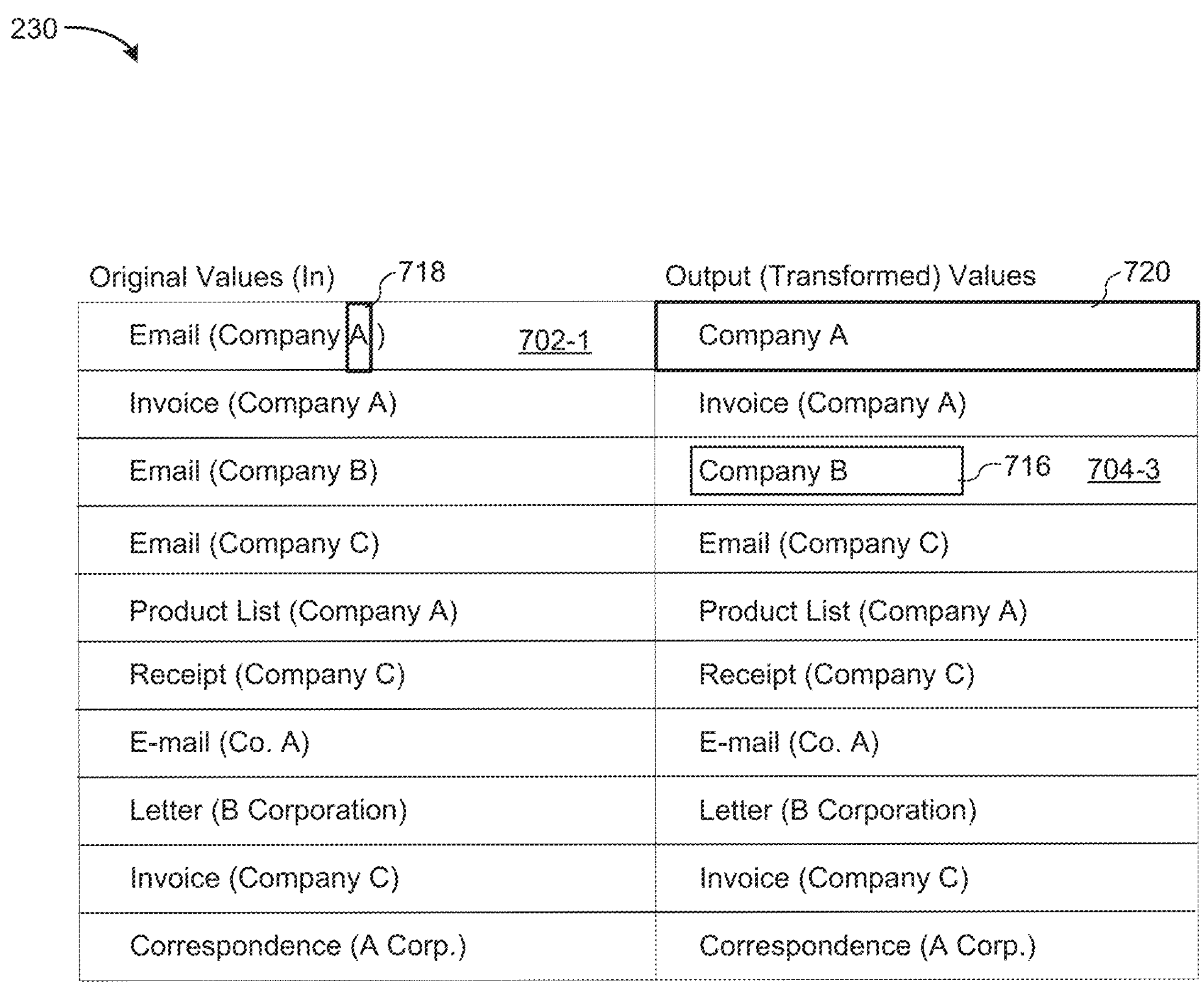

FIG. 7D shows that the output value 704-1 has been transformed. FIG. 7D also shows a data entry box 716 displayed in response to a user selecting the output value 704-3. In accordance with some implementations, the data entry box 716 allows the user to edit or replace the initial output value, which in this case was the string "Email (Company B)." In the example of FIG. 7D, the user has entered "Company B" as the desired output value 704-3. FIG. 7D further shows emphasis 718 denoting the "A" in data value 702-1 as a user hint and emphasis 720 denoting output value 704-1 as a user transformation example (e.g., in response to user selection of the confirmation button 714 in FIG. 7C).

Figure 7E:
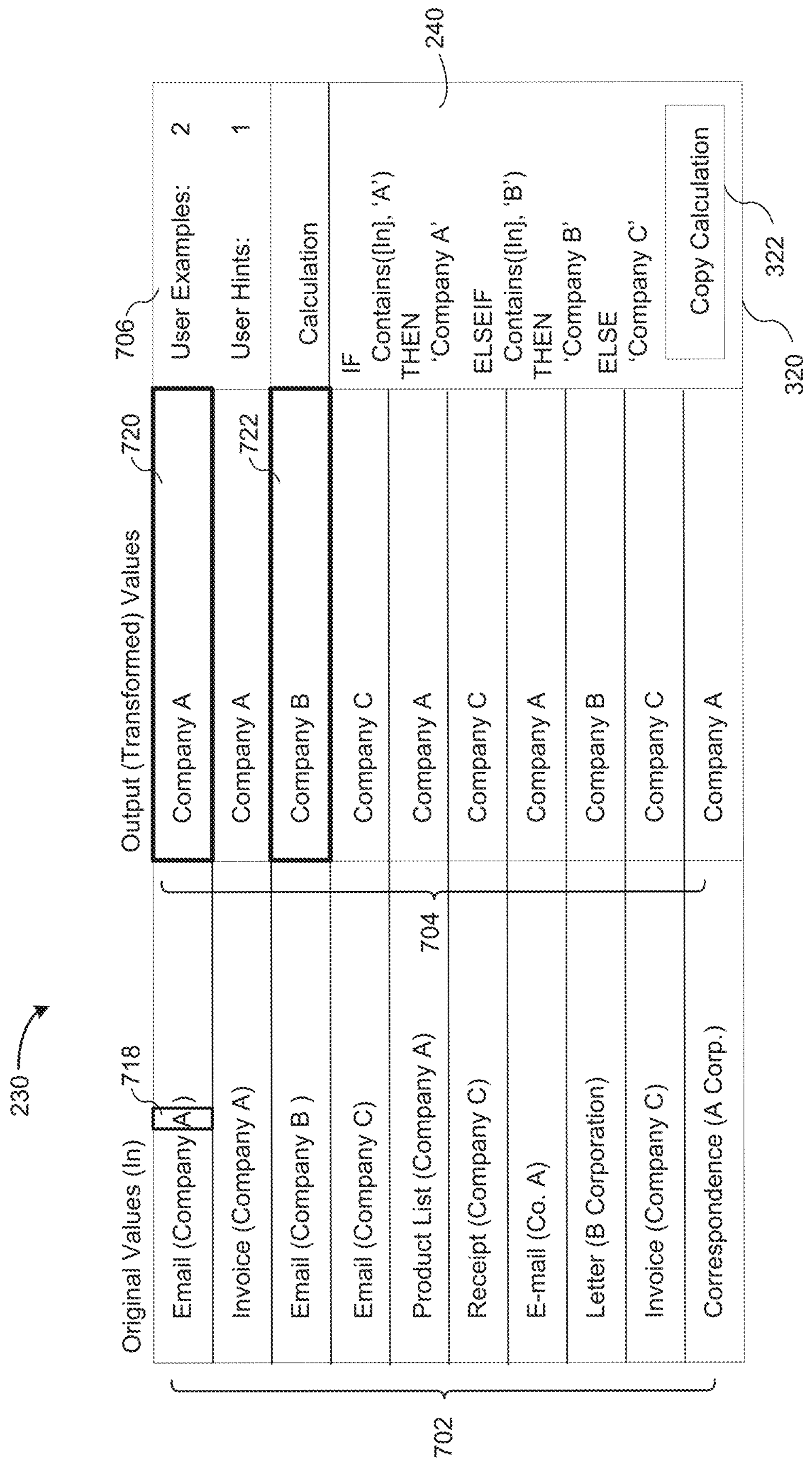

FIG. 7E shows a transformation applied to the output values in the second column 704. The transformation is set by the function 240 in accordance with the two user examples and one user hint described in FIGS. 7B-7D. In the example of FIG. 7E, the transformation function 240 transforms the original data value to the string "Company A" if it contains a capital "A", transforms the original data value to the string "Company B" if it contains a capital "B," and transforms the original data value to the string "Company C" otherwise. Thus, the transformation function 240 in this example achieves the user's desired result by correctly transforming each value based on the associated company. Although the transformation function 240 is correct for the data set shown in FIGS. 7A-7E, the addition of more data into the set may require an update to the function. For example, addition of a data value associated with a Company D, or addition of a data value having a capital "A" that does not denote the company (e.g., "Address (Company B)"). FIG. 7E also shows emphasis 718 for the user's hint and emphasis 720 and 722 for the user's examples. The user input section 706 in FIG. 7E has been updated to show that the transformation function 240 is based on two user examples and one user hint.

Figure 8A:
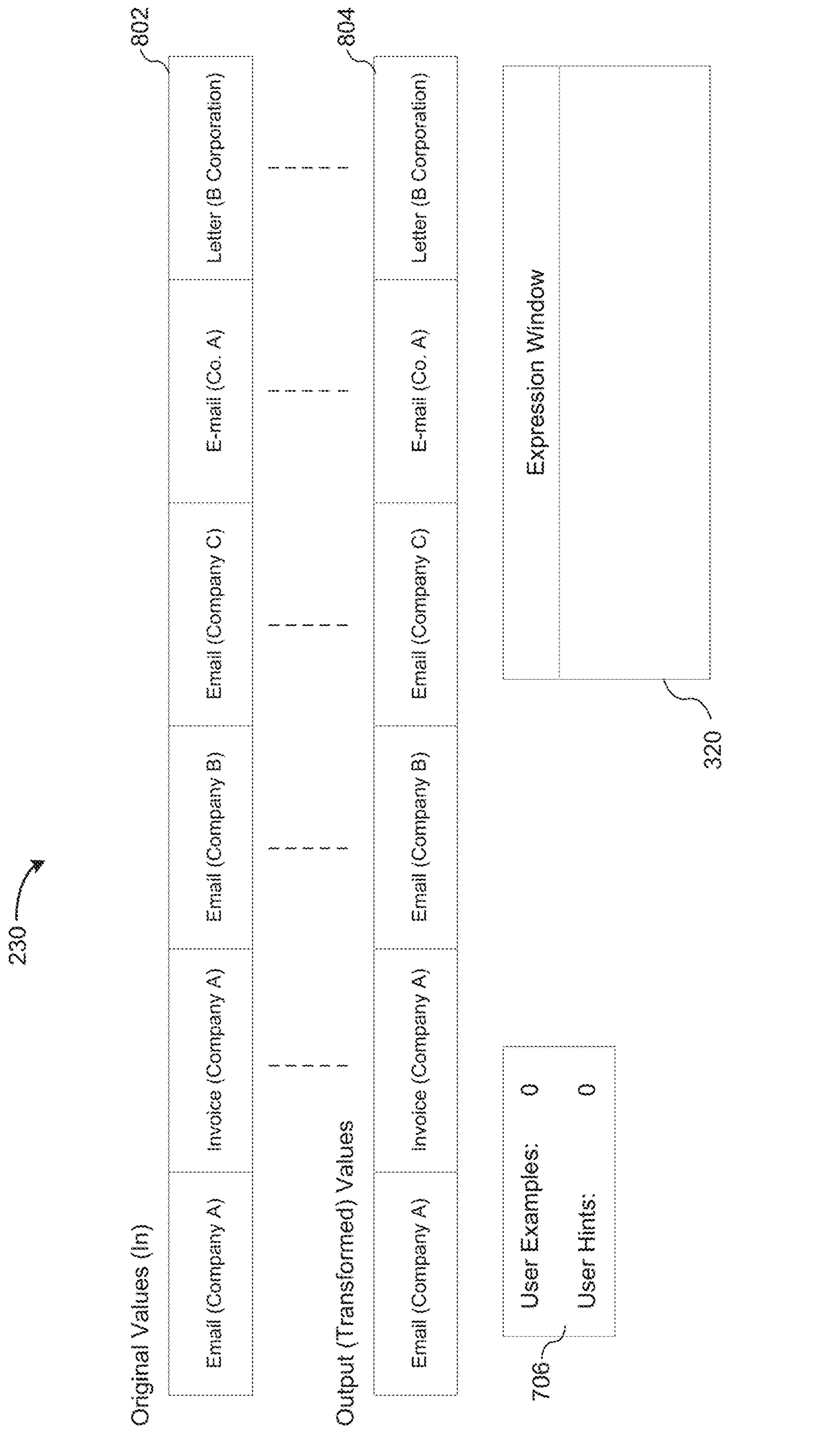
FIGS. 8A-8C illustrate example graphical user interfaces in accordance with some implementations.
Figure 8B:
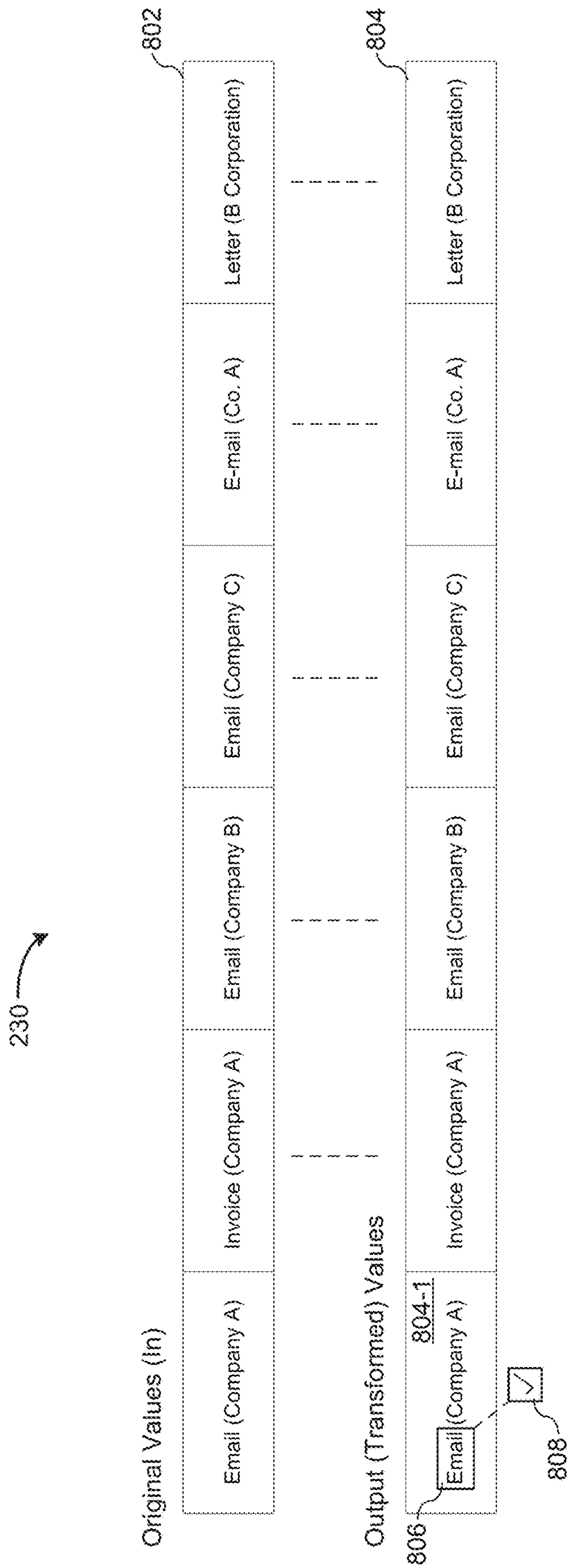
Figure 8C:
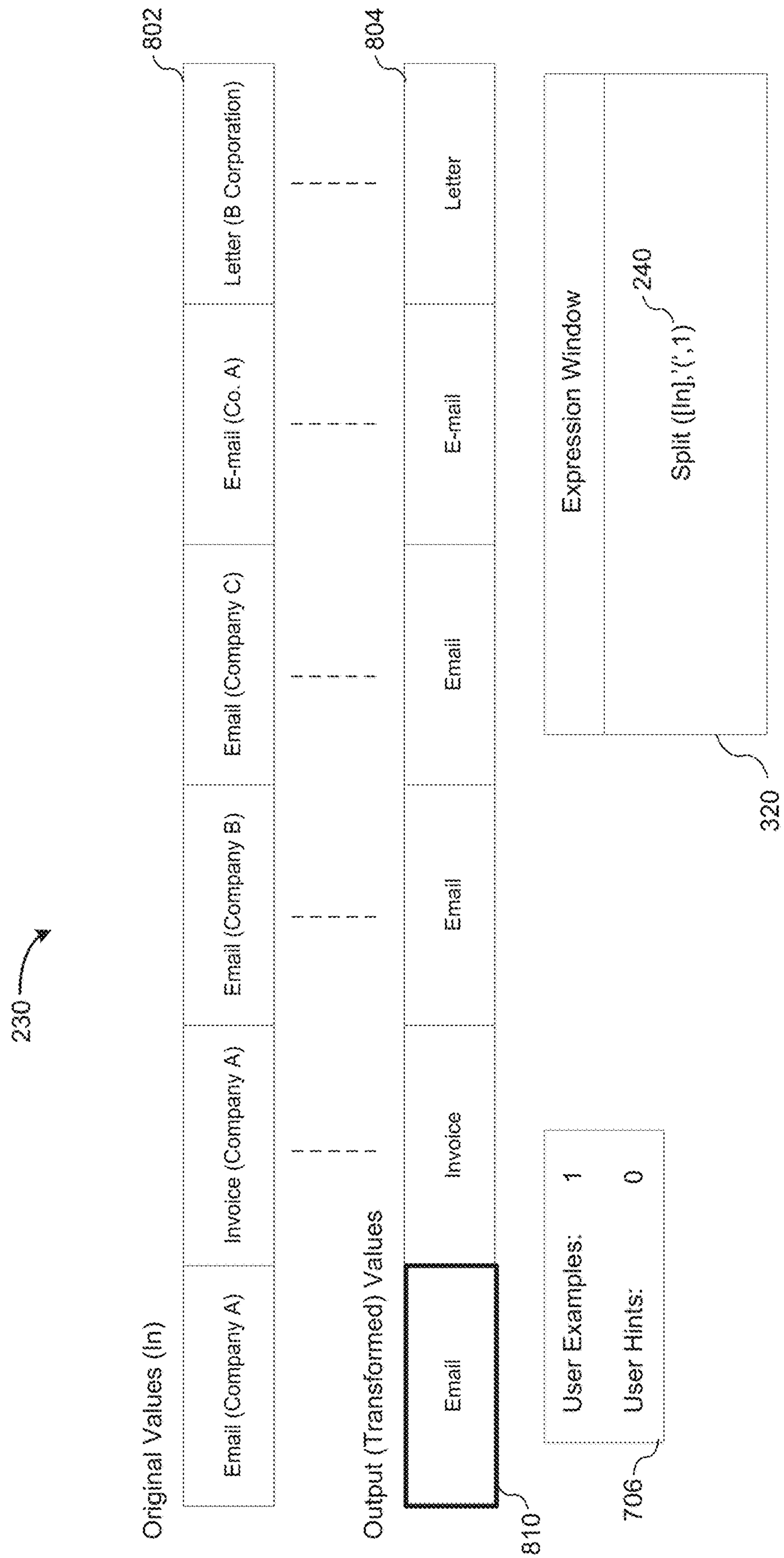

FIGS. 8A-8C provide a graphical user interface 230 used in some implementations. In FIGS. 8A-8C, the data values are arranged in a first row 802 representing original data values from the data source, and a second row 804 with output data values representing transformations of the original data values in the first row 802. In FIG. 8A, because the user has not yet provided any transformation examples, the calculation 320 is blank, indicating that the output values are currently the same as the input values. FIG. 8A also shows a user input section 706 indicating that the user has provided zero examples and zero hints in the example of FIG. 8A.

The user in this example wishes to transform the original data set to remove the company references. In FIG. 8B, the user has selected a portion 806 (the characters "Email") of the output data value 804-1 as the desired output. FIG. 8B shows confirmation button 808 displayed in response to the user selection of the portion 806.

FIG. 8C shows a transformation applied to the output values in the second row 804 (e.g., in response to selection of the confirmation button 808 in FIG. 8B). The transformation is set by function 240 in accordance with the user example of FIG. 8B. In the example of FIG. 8C, the transformation function 240 transforms the original data value by splitting the data value at the left parenthesis and retaining only the characters that come before it. Thus, the transformation function 240 in this example achieves the user's desired result by correctly transforming each value to remove the company references. FIG. 8C also shows emphasis 810 on output value 804-1 to indicate it is a user example. The user input section 706 in FIG. 8C has been updated to show that the transformation function 240 is based on one user example and no hints.

Figure 9A:
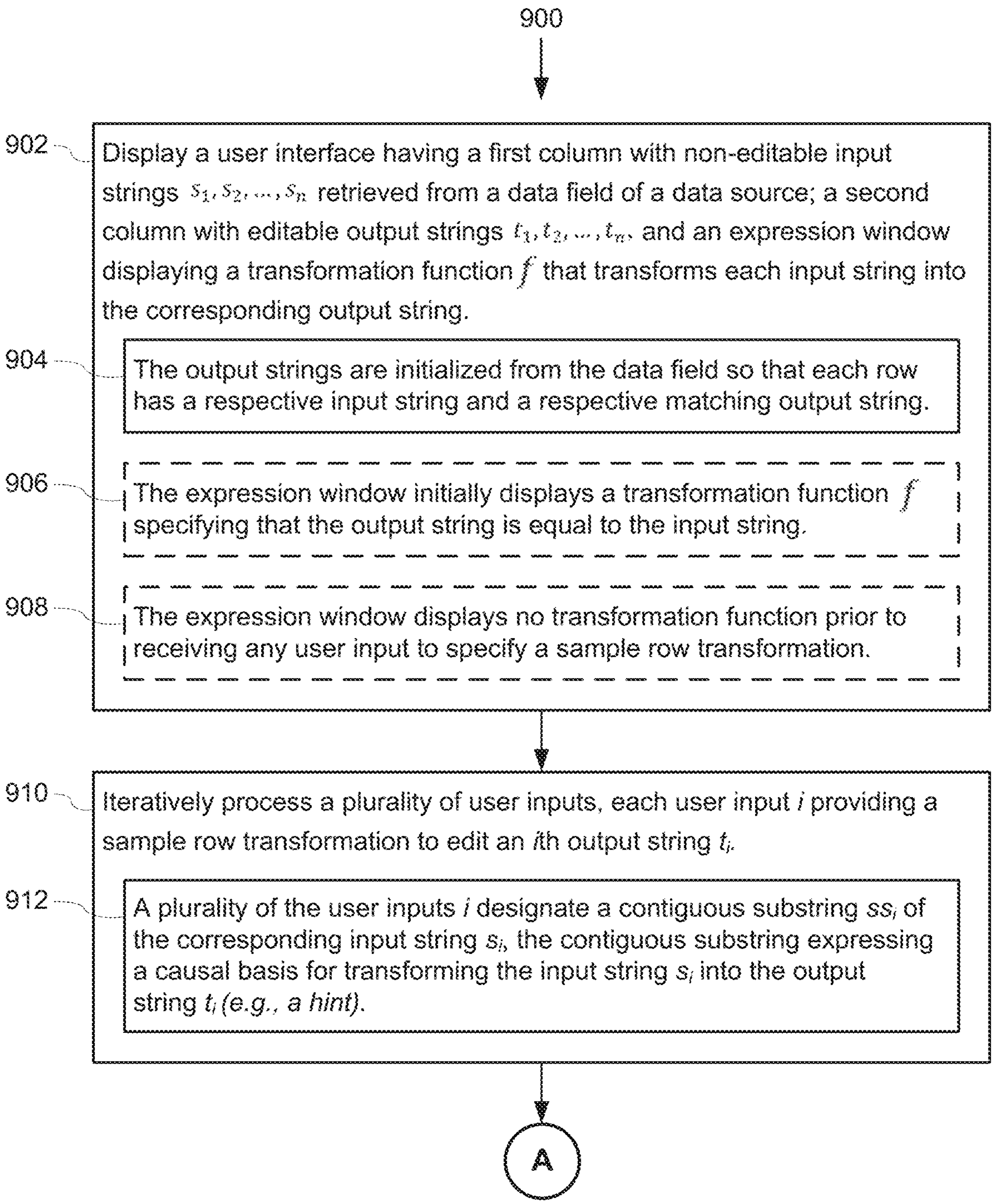
FIGS. 9A-9C provide a flowchart of an example process for data transformations in accordance with some implementations.
Figure 9B:
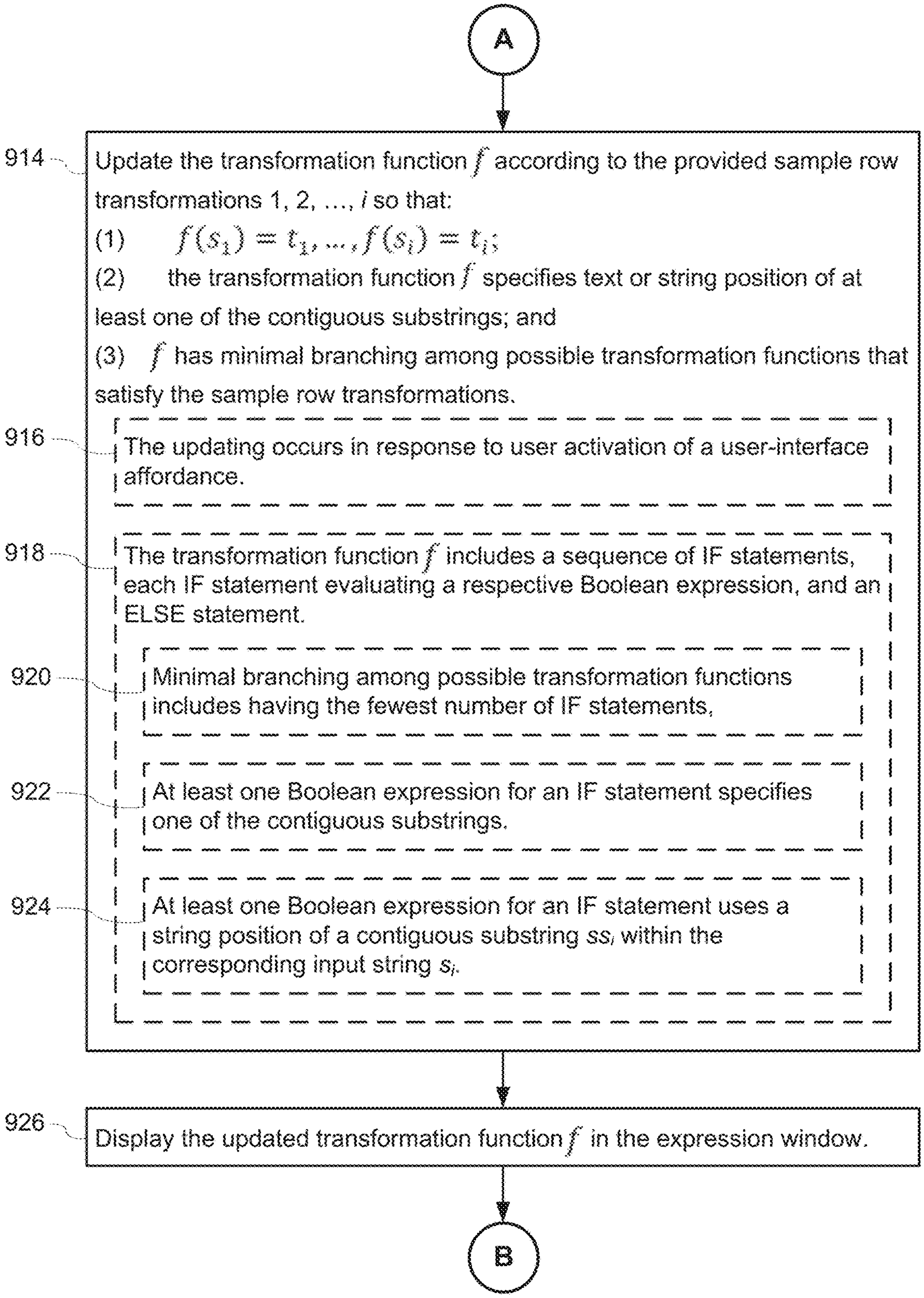
Figure 9C:
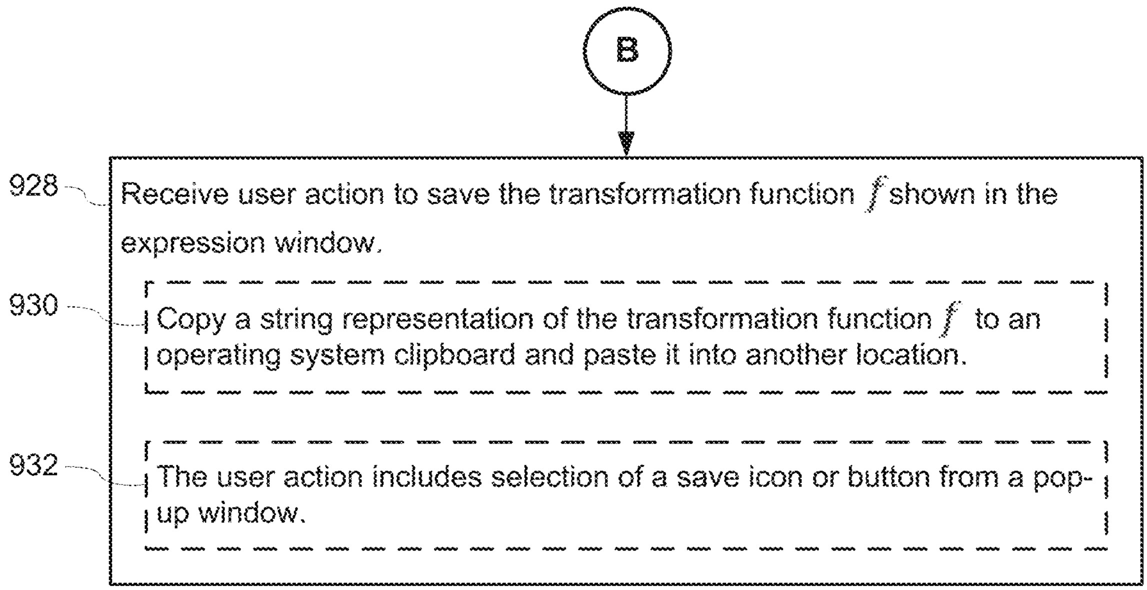

FIGS. 9A-9C provide a flowchart of a method 900 for transforming data. The method 900 is performed at a computing system (e.g., computing device 200) having a display, one or more processors, and memory. In some implementations, the memory stores one or more programs configured for execution by the one or more processors. In some implementations the computing system is, or includes, a programming by example (PBE) system. In accordance with some implementations, the memory stores a PBE program that performs the method 900.

The method includes displaying (902) a user interface having a first column with non-editable input strings $s_1$, $s_2$, . . . , $s_n$ retrieved from a data field of a data source, a second column with editable output strings $t_1$, $t_2$, . . . , $t_n$, and an expression window displaying a transformation function ƒ that transforms each input string into the corresponding output string. The output strings are initialized (904) from the data field so that each row has a respective input string and a respective matching output string. In some implementations, the output strings are blank prior to receiving any user transformation examples.

In some implementations, the expression window initially displays (906) a transformation function specifying that the output string is equal to the input string. In some implementations, the expression window displays (908) no transformation function prior to receiving any user input to specify a sample row transformation. In some implementations, the expression window is hidden or minimized prior to receiving any user transformation examples.

The method 900 further includes iteratively processing (910) a plurality of user inputs, each user input i providing a sample row transformation to edit an ith output string t. As an example scenario, a user provides a first example that "input 'Apple' outputs '1';" and a second example that "input 'Lemon' outputs '2'."

A plurality of the user inputs i designate (912) a contiguous substring $ss_i$ of the corresponding input string $s_i$. The contiguous substring expresses a causal basis for transforming the input string $s_i$ into the output string t. Continuing the scenario above, using the "input 'Apple' outputs '1'" example from above, the user could highlight the 'A' in Apple as the causal basis (e.g., a hint) for transforming the term 'Apple' into the output '1'.

Turning to FIG. 9B, the method 900 includes updating (914) the transformation function $f$ according to the provided sample row transformations 1, 2, . . . , i so that:

(1) $f(s_1)=t_1, \ldots, f(s_i)=t_i$;

(2) the transformation function $f$ specifies text or string position of at least one of the contiguous sub strings; and (3) $f$ has minimal branching among possible transformation functions that satisfy the sample row transformations.

Continuing the example scenario above, each of the two user examples is analyzed to generate a transformation function $f$ that satisfies (1)-(3). A generated transformation function $f$ for this example scenario could be: if the input begins with an 'A' then output '1,' otherwise output '2.'

In some implementations, the input strings are tokenized. In some implementations, the transformation function is updated based on the tokenized input strings. In some implementations, the contiguous substrings (hints) are used by the computing system to score predicates chosen by input classifiers for their corresponding subprogram or domain. In this way, if a given predicate's token corresponds to a contiguous substring, its score is increased. In some implementations, predicates that have regular expression (regex) tokens are deprioritized with respect to predicates with non-regex tokens. In some implementations, a predicate corresponds to a contiguous substring if, for any input, the span of its token match is an exact match (e.g., same start and end indices) for the contiguous substring. In some implementations, predicates that match the contiguous substring are prioritized over predicates that match more inputs.

In some implementations, the contiguous substrings are also used to group inputs to generate better domains. In some implementations, the computing system linearly intersects transform graphs to form program domains (e.g., rather than attempt to validate every possible intersection). As such, in some circumstances, grouping inputs before they are mapped to transform graphs and intersected has a significant impact on the correctness of domains and how quickly the PBE system is able converge on the best transformation function.

In some implementations, the computing system groups inputs based on their character patterns and/or significant constants. In some implementations, the contiguous sub strings are used to extract sub strings in input values that correspond to the contiguous substring spans and use those as constants in clustering inputs. In some circumstances, this approach allows for converging faster as users tend to provide hints about important constants.

In some implementations, a materialized union of token matches is used to update the transformation function (e.g., instead of using an input graph). In some circumstances, using the materialized union of token matches improves stability over an approach that uses an input graph. For example, an input graph approach based on intersecting the various patterns keeps only those token matches that are present in all inputs. However, when the data has some noise in it, or when some inputs simply are lacking a particular token match, the input graph approach drops these tokens even though they may be key information. For example, if the input values are a set of URLs, some of which have a '?', a materialized union approach may take everything up to the '?' or to the end if it's not present. Conversely, an input graph approach may drop the "?" and result in an overly complicated transformation function (or no valid transformation function).

In some implementations, a token match set is obtained, the token match set being a set that represents the union of all token matches identified in the input values. In some implementations, the set of token matches includes occurrences of each token match and the corresponding spans in each input. In some circumstances, this approach is faster and requires less computing power than finding the intersection of input graphs. These advantages stem from the approach being linear, while generating an intersected input graph is quadratic in the number of inputs. For example, in terms of the length of the longest input, the time needed is $O(n^2)$ to detect the different spans, whereas intersecting input graphs is $O(n^4)$. Moreover, the token match set approach does not incur a performance cost in transform graph computations.

In some implementations, an empty intersection of all transform graphs is used as a signal that the transformation is a multi-domain case. In some implementations, instead of clustering the transform graphs, the computing system intersects them one at a time. In some implementations, this approach results in a final transform graphs for each domain. In some implementations, a classifier is generated to identify which subprogram to apply for a given input. In some implementations, a decision tree is generated based on the existence or absence of token matches. In some implementations, one or more operators are used in the identification, such as STARTSWITH( ), ENDSWITH( ), and EQUALS( ).

In some implementations, one or more function preferences are used to rank valid transformation functions and updating the transformation function includes selecting the highest ranked valid transformation function. In some implementations, the function preferences include one or more of: a preference to anchor from the start or end of an input rather than on punctuation, a preference to use the first matching series of digits rather than a later occurring matching series, and a preference for shorter functions over longer functions.

In some implementations, the updating occurs (916) in response to user activation of a user-interface affordance. For example, the updating occurs in response to a user selection of confirmation 326 (FIG. 3B). As another example, the updating occurs in response to a user activation of an "Update Calculation" button. In some implementations, the updating occurs after the user inputs a preset number of user transformation examples and/or user hints (e.g., 1, 2, or 3). For example, the transformation function is updated after receiving at least two user examples and then is updated after each subsequent example or hint. In some implementations, the updating occurs a preset amount of time after the user's latest input. For example, the updating occurs 5, 10, or 20 seconds after the user's latest input. In some implementations, the updating occurs at periodic intervals during a user's entry of inputs.

In some implementations, the transformation function $f$ includes (918) a sequence of IF statements, each IF statement evaluating a respective Boolean expression, and an ELSE statement. For example, FIG. 6L shows an expression window 320 displaying a transformation function with a plurality of IF statements. In some implementations, minimal branching among possible transformation functions includes (920) having a fewest number of IF statements. In some implementations, at least one Boolean expression for an IF statement specifies (922) one of the contiguous substrings. For example, in FIG. 4I, a contiguous substring "[" has been identified by the user as a hint and the updated function $f$ 240 includes Boolean condition 406 specifying the "[".

In some implementations, at least one Boolean expression for an IF statement uses (924) a string position of a contiguous substring $ss_i$ within the corresponding input string For example, in FIG. 6G a contiguous substring "RCO" at the start of the original value "RCO_BSR_USPS_APP-_PROD_01" has been identified by the user as a hint and the updated function $f$ 604 includes a Boolean condition using the StartsWith operator (i.e., starting at string position 1, as specified in the hint).

The method 900 further includes displaying (926) the updated transformation function $f$ in the expression window. For example, FIG. 7E shows a user interface 230 displaying a transformation function $f$ 240 in the expression window 320, where the transformation function $f$ 240 has been updated based on user inputs shown in FIGS. 7B-7D.

Turning to FIG. 9C, the method 900 further includes receiving (928) user action to save the transformation $f$ shown in the expression window. In some implementations, saving the transformation function $f$ includes copying (930) a string representation of the transformation function $f$ to an operating system clipboard and pasting it into another location. In some implementations, saving the transformation function $f$ includes copying a string representation of the transformation function to an application clipboard. In some implementations, saving the transformation function $f$ includes saving the function to a data visualization database. In some implementations, saving the transformation function $f$ includes saving the function as metadata associated with the original dataset. In some implementations, the user action includes selection (932) of a save icon or button from a pop-up window.

Turning now to some example scenarios and implementations.

(A1) In one aspect, some implementations include a method (e.g., the method 900) for transforming data performed at a computer (e.g., the computing device 200) having a display, one or more processors, and memory storing one or more programs (e.g., the data visualization application 222 and the expression generator 228) configured for execution by the one or more processors. The method includes displaying (e.g., via the data visualization application 222) a user interface (e.g., the user interface 230) including: (i) a first column (e.g., the column 302) having non-editable input strings $s_1, s_2, \ldots, s_n$ retrieved from a data field from a data source (e.g., the first data source 250-1); (ii) a second column (e.g., the column 304) having editable output strings $t_1, t_2, \ldots, t_n$, initialized from the data field so that each row has a respective input string and a respective matching output string; (iii) an expression window (e.g., the window 320) displaying a transformation function $f$ (e.g., the transformation functions 240) that transforms each input string into the corresponding output string. The method further includes iteratively processing (e.g., via the expression generator 228) a plurality of user inputs, each user input i providing a sample row transformation to edit an ith output string $t_i$, where a plurality of the user inputs i designate a contiguous substring $ss_i$ of the corresponding input string $s_i$ (e.g., the portion 806), the contiguous substring expressing a causal basis for transforming the input string $s_i$ into the output string $t_i$. The method further includes updating (e.g., via the expression generator 228) the transformation function $f$ according to the provided sample row transformations 1, 2, . . . , i so that:

(1) $f(s_1)=t_1, \ldots, f(s_i)=t_i$;

(2) the transformation function $f$ specifies text or string position of at least one of the contiguous substrings; and (3) $f$ has minimal branching among possible transformation functions that satisfy the sample row transformations.

The method further includes displaying (e.g., via the expression generator 228 and/or the data visualization application 222) the updated transformation function $f$ in the expression window, and receiving (e.g., 928) a user action to save the transformation function $f$ shown in the expression window.

(A2) In some implementations of A2, the updating is periodic and occurs after each user input. In some implementations, the updating occurs after the user inputs a preset number of user transformation examples and/or user hints (e.g., 1, 2, or 3). For example, the transformation function is updated after receiving at least two user examples and is then updated after each subsequent example or hint. In some implementations, the updating occurs a preset amount of time after the user's latest input. For example, the updating occurs 5, 10, or 20 seconds after the user's latest input. In some implementations, the updating occurs at periodic intervals during a user's entry of inputs.

(A3) In some implementations of A1, the updating occurs in response to a user activation of a user-interface affordance. For example, the updating occurs in response to a user selection of confirmation 326 (FIG. 3B). As another example, the updating occurs in response to a user activation of a separate function updating affordance.

(A4) In some implementations of A1-A3, the transformation function $f$ includes a sequence of IF statements, each IF statement evaluating a respective Boolean expression, and an ELSE statement. For example, FIG. 6L shows an expression window 320 displaying a transformation function with a plurality of IF statements. As another example, FIG. 7E shows an expression window 320 displaying a transformation function 240 with a plurality of IF statements.

(A5) In some implementations of A4, minimal branching among possible transformation functions includes having a fewest number of IF statements. For example, FIG. 4E shows a function $f$ 240 with minimal branching among all possible transformation functions that perform according to the user provided examples. In the example of FIG. 4E, there are only two branches and there are no transform functions that could achieve the desired results with a single branch.

(A6) In some implementations of A4 or A5, at least one Boolean expression for an IF statement specifies one of the contiguous substrings. For example, in FIG. 4I, a contiguous substring "[" has been identified by the user as a hint and the updated function ƒ 240 includes Boolean condition 406 specifying the "[".

(A7) In some implementations of A4-A6, at least one Boolean expression for an IF statement uses a string position of a contiguous substring ss; within the corresponding input string For example, in FIG. 6G a contiguous substring "RCO" at the start of the original value "RCO_BSR_USP-S_APP_PROD_01" has been identified by the user as a hint and the updated function ƒ 604 includes a Boolean condition using the StartsWith operator.

(A8) In some implementations of A1-A7, the expression window initially displays a transformation function ƒ specifying that the output string is equal to the input string. For example, the expression window 320 in FIG. 5A shows a transformation function 240 specifying that the output (transformed) values in column 504 are equal to the original values (Job) in column 502.

(A9) In some implementations of A1-A7, the expression window displays no transformation function prior to receiving any user input to specify a sample row transformation. For example, in FIG. 8A the user interface 230 has no user examples or hints and the expression window 320 includes no transformation function.

(A10) In some implementations of A1-A9, saving the transformation function ƒ includes copying (930) a string representation of the transformation function ƒ to an operating system clipboard and pasting it into another location.

(A11) In some implementations of A1-A10, the user action includes selecting a save icon or button from a pop-up window. For example, the user action may include selecting the user-selectable icon 322.

(B1) In another aspect, some implementations include a method executing at a computing system (e.g., the computing device 200). For example, the computing system is optionally a smart phone, a tablet, a notebook computer, a desktop computer, a virtual machine, a cloud computing system, or a server system. In some implementations, the method is performed by a PBE program (e.g., the expression generator 228) executing on the computing system. The method includes displaying (e.g., via the data visualization application 222) a user interface (e.g., user interface 230) including: (i) a first set of input data (e.g., input data in the row 802, FIG. 8A) retrieved from a data field from a data source (e.g., the first data source 250-1); (ii) a second set of output data (e.g., output data in the row 804, FIG. 8A) initialized from the data field so that each input datum (string) has a respective matching output datum (string); and (iii) an expression window (e.g., an expression window 320) displaying a transformation function ƒ (e.g., a transformation function 240) that transforms each input datum into the corresponding output datum. The method further includes iteratively processing (e.g., via the expression generator 228) a plurality of user example transformations (e.g., the transformed data values 504-1 and 504-2, FIG. 6B) and a user hint corresponding to one of the example transformations (e.g., the user hint of characters "RCO" 602, FIG. 6F), the user hint expressing a causal basis for the corresponding example transformation. The method further includes updating (e.g., via the expression generator 228) the transformation function ƒ according to the provided plurality of user example transformations and the user hint. The method further includes displaying (e.g., via the expression generator 228) the updated transformation function ƒ in the expression window. For example, FIG. 6G shows the updated function 604 in the expression window 320, where the updated function 604 is based on the user examples and hint.

(B2) In some implementations of B1, the method further includes receiving a user action to save the transformation function ƒ shown in the expression window (e.g., selection of the user-selectable icon 322 in FIG. 3C); and storing the transformation function ƒ in accordance with the user action (e.g, storing the transformation function within the database 250).

(B3) In some implementations of B1 or B2, the method further includes transforming the second set of output data using the updated transformation function ƒ and storing the transformed second set of output data (e.g., storing the transformed second set within the database 250).

(B4) In some implementations B1-B3, the method further includes transforming the second set of output data using the updated transformation function ƒ and generating (e.g., via the data visualization application 222) a data visualization using the transformed second set of output data.

(B5) In some implementations of B1-B4, the method further includes receiving an additional hint from the user, where the additional hint includes a causal basis for transforming one of the plurality of user example transformations, and the hint includes one or more characters not in the corresponding input datum. For example, a user submits an example transformation of "input 'Apple' outputs 'string'" and the hint includes the NOTCONTAINS operator and one or more digit characters.

(B6) In some implementations of B1-B5, the updating occurs after each user input. In some implementations, the updating occurs after the user inputs a preset number of user transformation examples and/or user hints. In some implementations, the updating occurs a preset amount of time after the user's latest input. In some implementations, the updating occurs at periodic intervals during a user's entry of inputs.

(B7) In some implementations of B1-B5, the updating occurs in response to a user activation of a user-interface affordance.

(B8) In some implementations of B1-B7, the transformation function ƒ includes a sequence of conditional statements. In some implementations, the transformation function ƒ is updated to have a minimal amount of branching among possible transformation functions. In some implementations, the minimal branching includes having a fewest number of conditional statements. In some implementations, minimal branching means having the fewest number of IF statements. In some implementations, at least one conditional statement specifies the user hint. In some implementations, the at least one conditional state specifies a span of the user hint. In some implementations, the at least one conditional state specifies a character of the user hint.

(B9) In some implementations of B1-B8, the expression window initially displays a transformation function ƒ specifying that the output datum is equal to the input datum.

(B10) In some implementations of B1-B9, the expression window displays no transformation function prior to receiving any user input to specify a sample row transformation.

In another aspect, some implementations include a computing system including one or more processors and memory coupled to the one or more processors, the memory storing one or more programs configured to be executed by the one or more processors, the one or more programs including instructions for performing any of the methods described herein (e.g., A1-A11 and B1-B10 above).

In yet another aspect, some implementations include a non-transitory computer-readable storage medium storing one or more programs for execution by one or more processors of a computing system, the one or more programs including instructions for performing any of the methods described herein (e.g., A1-A11 and B1-B10 above).

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for transforming data, comprising:

at a computer having a display, one or more processors, and memory storing one or more programs configured for execution by the one or more processors:

displaying a user interface including:

a first column comprising non-editable input strings $s_1, s_2, \ldots, s_n$ retrieved from a data field from a data source;

a second column comprising editable output strings $t_1, t_2, \ldots, t_n$, initialized from the data field so that each row comprises a respective input string and a respective matching output string; and an expression window displaying a transformation function $f$ that transforms each input string into the corresponding output string;

iteratively processing a plurality of user inputs, each user input i providing a sample row transformation to edit an ith output string $t_i$, wherein a plurality of the user inputs i designate a contiguous substring hint $ss_i$ from the corresponding input string $s_i$, the contiguous substring hint expressing a causal basis for transforming the input string $s_i$ into the output string $t_i$;

updating the transformation function $f$ according to the provided sample row transformations 1, 2, . . . , i so that:

(1) $f(s_1)=t_1, \ldots, f(s_i)=t_i$;

(2) the transformation function $f$ specifies text or string position of at least one of the contiguous substring hints; and (3) $f$ has minimal branching among possible transformation functions that satisfy the sample row transformations; and displaying the updated transformation function $f$ in the expression window; and receiving a user action to save the transformation function $f$ shown in the expression window.

2. The method of claim 1, wherein the updating occurs after each user input.

3. The method of claim 1, wherein the updating occurs in response to user activation of a user-interface affordance.

4. The method of claim 1, wherein the transformation function $f$ comprises a sequence of IF statements, each IF statement evaluating a respective Boolean expression, and an ELSE statement.

5. The method of claim 4, wherein having minimal branching among possible transformation functions comprises having a fewest number of IF statements.

6. The method of claim 4, wherein at least one Boolean expression for an IF statement specifies one of the contiguous substring hints.

7. The method of claim 4, wherein at least one Boolean expression for an IF statement uses a string position of a contiguous substring hint $ss_i$ within the corresponding input string $s_i$.

8. The method of claim 1, wherein the expression window initially displays a transformation function $f$ specifying that the output string is equal to the input string.

9. The method of claim 1, wherein the expression window displays no transformation function prior to receiving any user input to specify a sample row transformation.

10. The method of claim 1, wherein saving the transformation function $f$ comprises copying a string representation of the transformation function $f$ to an operating system clipboard and pasting it into another location.

11. The method of claim 1, wherein the user action comprises selecting a save icon or button from a pop-up window.

12. A computing device, comprising:

one or more processors;

memory;

a display; and one or more programs stored in the memory and configured for execution by the one or more processors, the one or more programs comprising instructions for:

displaying a user interface including:

a first column comprising non-editable input strings $s_1, s_2, \ldots, s_n$ retrieved from a data field from a data source;

a second column comprising editable output strings $t_1, t_2, \ldots, t_n$, initialized from the data field so that each row comprises a respective input string and a respective matching output string; and an expression window displaying a transformation function $f$ that transforms each input string into the corresponding output string;

iteratively processing a plurality of user inputs, each user input i providing a sample row transformation to edit an ith output string $t_i$, wherein a plurality of the user inputs i designate a contiguous substring hint $ss_i$ from the corresponding input string $s_i$, the contiguous substring hint expressing a causal basis for transforming the input string $s_i$ into the output string $t_i$;

updating the transformation function $f$ according to the provided sample row transformations 1, 2, . . . , i so that:

(1) $f(s_1)=t_1, \ldots, f(s_i)=t_i$;

(2) the transformation function $f$ specifies text or string position of at least one of the contiguous substring hints; and (3) $f$ has minimal branching among possible transformation functions that satisfy the sample row transformations; and displaying the updated transformation function $f$ in the expression window; and receiving a user action to save the transformation function $f$ shown in the expression window.

13. The computing device of claim 12, wherein the updating occurs after each user input.

14. The computing device of claim 12, wherein the updating occurs in response to user activation of a user-interface affordance.

15. The computing device of claim 12, wherein the transformation function $f$ comprises a sequence of IF statements, each IF statement evaluating a respective Boolean expression, and an ELSE statement.

16. The computing device of claim 15, wherein having minimal branching among possible transformation functions comprises having a fewest number of IF statements.

17. The computing device of claim 12, wherein at least one Boolean expression for an IF statement specifies one of the contiguous substring hints.

18. The computing device of claim 12, wherein at least one Boolean expression for an IF statement uses a string position of a contiguous substring hint $ss_i$ within the corresponding input string $s_i$.

19. A non-transitory computer-readable storage medium storing one or more programs configured for execution by a computing device having one or more processors, memory, and a display, the one or more programs comprising instructions for:

displaying a user interface including:

a first column comprising non-editable input strings $s_i$, $s_2$, . . . , $S_n$ retrieved from a data field from a data source;

a second column comprising editable output strings $t_1$, $t_2$, . . . , $t_n$, initialized from the data field so that each row comprises a respective input string and a respective matching output string; and an expression window displaying a transformation function $f$ that transforms each input string into the corresponding output string;

iteratively processing a plurality of user inputs, each user input i providing a sample row transformation to edit an ith output string $t_i$, wherein a plurality of the user inputs i designate a contiguous substring hint $ss_i$ from the corresponding input string $s_i$, the contiguous substring hint expressing a causal basis for transforming the input string $s_i$ into the output string $t_i$;

updating the transformation function $f$ according to the provided sample row transformations 1, 2, . . . , i so that:

(1) $f(s_1)=t_1, \ldots, f(s_i)=t_i$;

(2) the transformation function $f$ specifies text or string position of at least one of the contiguous substring hints; and (3) $f$ has minimal branching among possible transformation functions that satisfy the sample row transformations; and displaying the updated transformation function $f$ in the expression window; and receiving a user action to save the transformation function $f$ shown in the expression window.

20. The computer-readable storage medium of claim 19, wherein the transformation function $f$ comprises a sequence of IF statements, each IF statement evaluating a respective Boolean expression, and an ELSE statement.

* * * * *